(12) United States Patent
Yamagishi et al.

(10) Patent No.: US 12,045,325 B2
(45) Date of Patent: *Jul. 23, 2024

(54) RECEPTION DEVICE, TRANSMISSION DEVICE, AND DATA PROCESSING METHOD

(71) Applicant: SATURN LICENSING LLC, New York, NY (US)

(72) Inventors: Yasuaki Yamagishi, Kanagawa (JP); Tatsuya Igarashi, Tokyo (JP); Kazuhiko Takabayashi, Tokyo (JP); Jun Kitahara, Shizuoka (JP)

(73) Assignee: SATURN LICENSING LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/898,531

(22) Filed: Aug. 30, 2022

(65) Prior Publication Data

US 2023/0099480 A1    Mar. 30, 2023

Related U.S. Application Data

(63) Continuation of application No. 16/067,388, filed as application No. PCT/JP2017/000012 on Jan. 4, 2017, now Pat. No. 11,449,583.

(30) Foreign Application Priority Data

Jan. 15, 2016    (JP) .................. 2016-006375

(51) Int. Cl.
*G06F 21/16* (2013.01)
*G06F 21/10* (2013.01)
(Continued)

(52) U.S. Cl.
CPC .............. *G06F 21/16* (2013.01); *G06F 21/10* (2013.01); *H04H 20/91* (2013.01); *H04H 20/93* (2013.01);
(Continued)

(58) Field of Classification Search
CPC ......... G06F 21/16; G06F 21/10; H04H 20/91; H04H 20/93; H04H 60/13; H04H 60/14;
(Continued)

(56) References Cited

U.S. PATENT DOCUMENTS 6,243,480 B1    6/2001    Zhao
2002/0122568 A1    9/2002    Zhao
(Continued)

FOREIGN PATENT DOCUMENTS

JP    2012516643    7/2012
JP    2013009360    1/2013
(Continued)

OTHER PUBLICATIONS

International Search Report issued Mar. 14, 2017 in PCT/JP2017/000012, 2 pages.

*Primary Examiner* — Cheng-Feng Huang
(74) *Attorney, Agent, or Firm* — Chris Kolefas

(57) ABSTRACT

The present technology relates to a reception device, a transmission device, and a data processing method that enable a flexible operation of a service using an application that accompanies content.
A reception device includes: a reception unit that receives content; an acquisition unit that acquires an application in accordance with acquisition source information indicating an acquisition source of the application accompanying the content, the acquisition source information being included in control information transmitted together with the content; and a control unit that instantly starts the acquired application. The present technology can be applied to a television set capable of receiving digital broadcasts, for example.

18 Claims, 42 Drawing Sheets

(51) Int. Cl.
*H04H 20/91* (2008.01)
*H04H 20/93* (2008.01)
*H04H 60/13* (2008.01)
*H04H 60/14* (2008.01)
*H04H 60/23* (2008.01)
*H04L 67/02* (2022.01)
*H04N 21/235* (2011.01)
*H04N 21/435* (2011.01)
*H04N 21/81* (2011.01)
*H04N 21/8358* (2011.01)
*H04N 21/858* (2011.01)
*H04H 60/82* (2008.01)

(52) U.S. Cl.
CPC ............ *H04H 60/13* (2013.01); *H04H 60/14* (2013.01); *H04H 60/23* (2013.01); *H04L 67/02* (2013.01); *H04N 21/235* (2013.01); *H04N 21/435* (2013.01); *H04N 21/4353* (2013.01); *H04N 21/8173* (2013.01); *H04N 21/8358* (2013.01); *H04N 21/8586* (2013.01); *H04H 60/82* (2013.01)

(58) Field of Classification Search
CPC ........ H04H 60/23; H04H 60/82; H04L 67/02; H04N 21/235; H04N 21/435; H04N 21/4353; H04N 21/8173; H04N 21/8358; H04N 21/8586; H04N 21/44236; H04N 21/4725

See application file for complete search history.

(56) References Cited

U.S. PATENT DOCUMENTS

| | | |
|---|---|---|
| 2003/0217369 A1 | 11/2003 | Heredia |
| 2010/0191974 A1 | 7/2010 | Dubhashi et al. |
| 2013/0042100 A1* | 2/2013 | Bouazizi ............ H04N 21/8456 713/151 |
| 2013/0215327 A1 | 8/2013 | Kitazato et al. |
| 2013/0290698 A1* | 10/2013 | Giladi .................... H04L 67/02 713/150 |
| 2014/0043540 A1 | 2/2014 | Kitazato et al. |
| 2014/0250479 A1 | 9/2014 | Lee et al. |
| 2014/0331250 A1* | 11/2014 | Kitahara ................. G06F 21/51 725/25 |
| 2015/0350205 A1 | 12/2015 | Oyman |

FOREIGN PATENT DOCUMENTS

| | | |
|---|---|---|
| WO | 2013094110 | 6/2013 |
| WO | 2014027563 | 2/2014 |
| WO | 2014080783 | 5/2014 |
| WO | 2015167177 | 11/2015 |
| WO | 2015182490 | 12/2015 |

* cited by examiner

FIG. 10

(A) MPD EVENT METHOD

```
<MPD availabilityStartTime="2011-12-25T12:30:00">      ---- INDICATING UTC TIME OF START OF FIRST Period
  <Period startTime='0'>                               ---- startTime ATTRIBUTE OF Period ELEMENT REPRESENTS OFFSET TIME
                                                            FROM availabilityStartTime of MPD ELEMENT
  ..<EventStream schemeIdUri='urn:xxx' timescale='1000'>    ---- DESIGNATING UNIT TIME OF presentationTime THEREAFTER AS 1/1000 SECOND
  ..<Event presentationTime='0' duration='1000'>EVENT-RELATED DATA-1</Event>      ---- CONTINUING FOR 1000 TIME UNITS SINCE IGNITION TIME 0
  ..<Event presentationTime='1000' duration='4000'>EVENT-RELATED DATA-2</Event>   ---- CONTINUING FOR 4000 TIME UNITS SINCE IGNITION TIME 1000
  ..
  </EventStream>
  ..
  ..<AdaptationSet>                                    ---- STREAM (VIDEO, AUDIO, AND OTHERS) ASSOCIATED WITH ABOVE EventStream
     ..<Representation/>                               ---- LOW-RATE SEGMENT
     ..<Representation/>                               ---- HIGH-RATE SEGMENT
  ..</AdaptationSet>
  ..
  </Period>
</MPD>
```

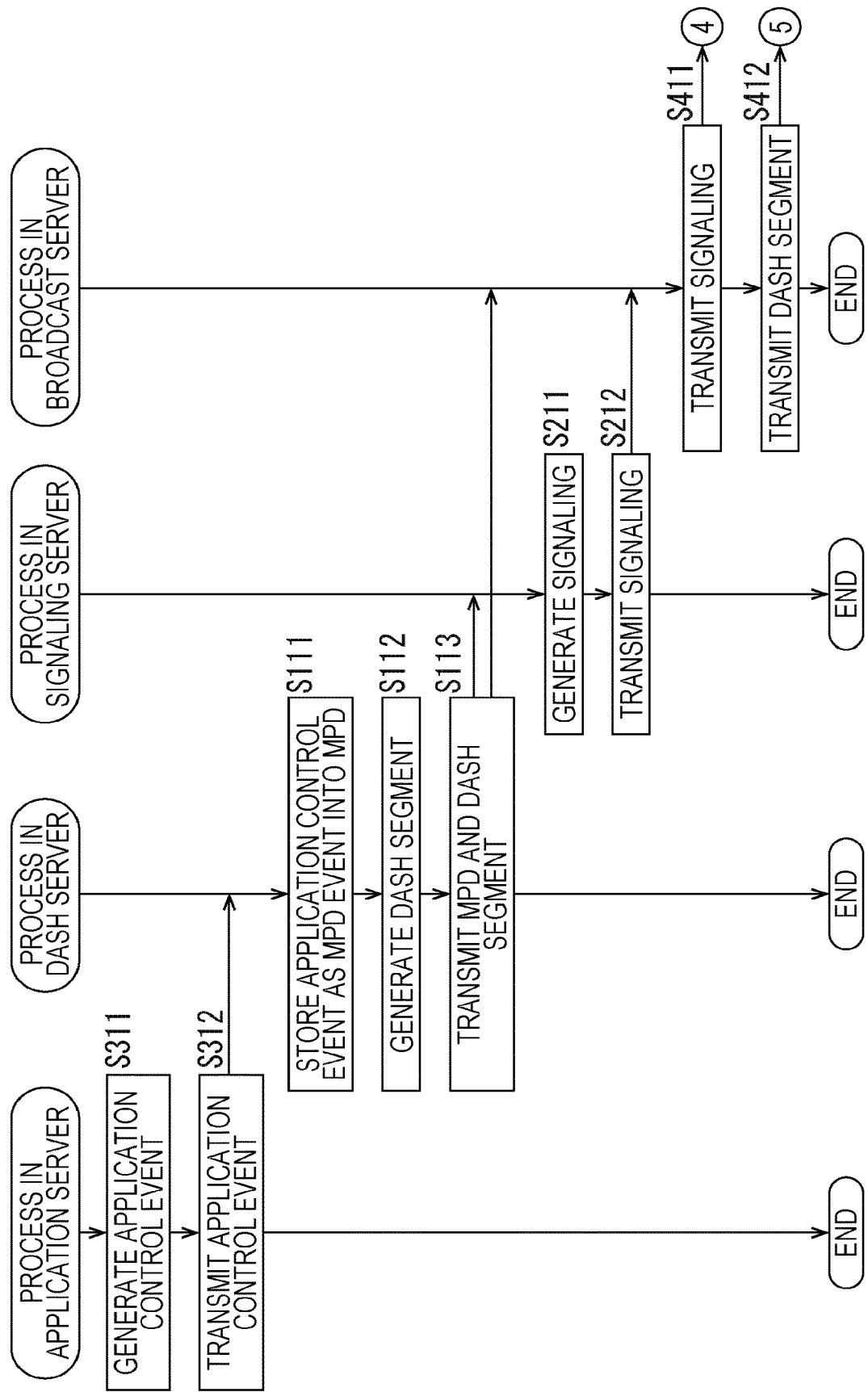

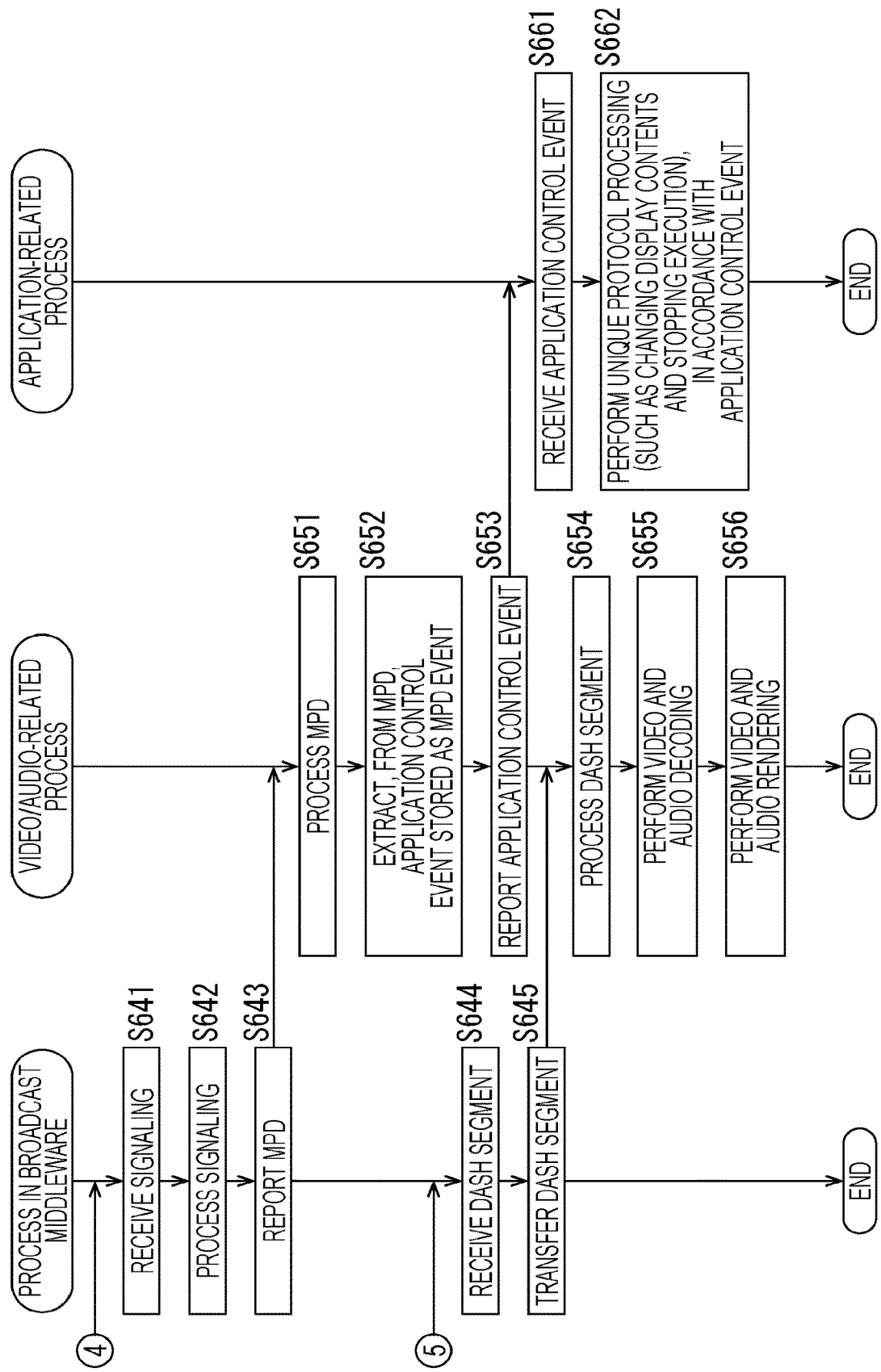

*FIG. 13*

(B) IN-BAND EVENT METHOD

A
```
box_type='emsg'
scheme_id_uri="urn:xxx"
value=0
timescale=1000
presentation_time_delta=0
event_duration=0xFFFF
id=1
message_data[]= EVENT-RELATED DATA -1
```

B
```
box_type='emsg'
scheme_id_uri="urn:xxx"
value=0
timescale=1000
presentation_time_delta=0
event_duration=0xFFFF
id=2
message_data[]= EVENT-RELATED DATA -2
```

FIG. 22

| Syntax | No. of Bits | Format |
|---|---|---|
| app_digest_message() { | | |
|     uri_strlen | 8 | uimsbf |
|     uri_string() | 8*uri_strlen | |
|     digest_type | 8 | uimsbf |
|     digest_len | 8 | uimsbf |
|     digest_value | 8*digest_len | |
| } | | |

FIG. 23

| digest type value | Meaning |
|---|---|
| 0x00 | Reserved |
| 0x01 | MD5 |
| 0x02 | SHA-1 |
| 0x03 | SHA-256 |
| 0x04-0xFF | Reserved |

FIG. 27

| Syntax | No. of Bits | Format |
|---|---|---|
| watermark_payload() { | | |
|   run_in_pattern | 16 | 0xEB52 |
|   for(i=0;i<N;i++) { | | |
|     wm_message_block() | var | uimsbf |
|   } | | |
|   for(i=0;i<M;i++) { | | |
|     zero_pad | 8 | 0x00 |
|   } | | |
| } | | |

FIG. 28

| Syntax | No. of Bits | Format |
|---|---|---|
| wm_message_block() { | | |
| wm_message_id | 8 | uimsbf |
| wm_message_block_length | 8 | uimsbf |
| wm_message_version | 4 | uimsbf |
| fragment_number | 2 | uimsbf |
| last_fragment | 2 | uimsbf |
| wm_message_bytes() | var | |
| if((fragment_number==last_fragment) && (!fragment_number!=0)) { | | |
| message_CRC_32 | 32 | uimsbf |
| } | | |
| CRC_32 | 32 | uimsbf |
| } | | |

*FIG. 29*

| wm_message_id Value | wm_message() |
|---|---|
| 0x00 | reserved |
| 0x01 | content_id_message() |
| 0x02 | presentation_time_message() |
| 0x03 | uri_message() |
| 0x04 | vp1_ message() |
| 0x05 | dynamic_event_message() |
| 0x06 | emergency_alert_message() |
| 0x07 | display_override_message() |
| 0x08 | app_digest_message() |
| 0x09-0x7F | reserved |
| 0x80-0xFF | user private |

FIG. 35

| Element or Attribute Name | Use | Data Type | Short Description |
|---|---|---|---|
| SLT | | | Root element of the SLT |
|   @bsid | 1 | unsignedShort | Identifier of the entire Broadcast Stream. |
|   @sltCapabilities | 0..1 | string | Required capabilities for decoding and meaningfully presenting the content for all the services in this SLT instance. |
|   sltInetUrl | 0..1 | anyURI | Base URL to acquire ESG or service level signalling files available via broadband for services in this SLT. |
|     @urlType | 0..1 | unsignedByte | Type of files available with this URL |
|   Service | 1..N | | Service information |
|     @serviceId | 1 | unsignedShort | Integer number that identifies this Service within the scope of this Broadcast area. |
|     @sltSvcSeqNum | 1 | unsignedByte | Version of SLT service info for this service. |
|     @protected | 0..1 | boolean | Indicates whether one or more components needed for meaningful presentation of this service are protected. |
|     @majorChannelNo | 0..1 | 1..999 | Major channel number of the service |
|     @minorChannelNo | 0..1 | 1..999 | Minor channel number of the service |
|     @serviceCategory | 1 | unsignedByte | Service category, coded per Table |
|     @shortServiceName | 0..1 | string | Short name of the Service |
|     @hidden | 0..1 | boolean | Indicates whether the service is intended for testing or proprietary use, and is not to be selected by ordinary TV receivers. |
|     @broadbandAccessRequired | 0..1 | boolean | Indicates whether broadband access is required for a receiver to make a meaningful presentation of the service. |
|     @svcCapabilities | 0..1 | string | Required capabilities for decoding and meaningfully presenting content of this service. |
|     @applicationUrl | 0..1 | string | ApplicationUrl indicates the url of the application to be executed just after the service will be tuned. |
|     BroadcastSvcSignaling | 0..1 | | Location, protocol, address, id information for broadcast signaling |
|       @slsProtocol | 1 | unsignedByte | Protocol used to deliver the service layer signalling for this service |
|       @slsMajorProtocolVersion | 1 | unsignedByte | Major version number of protocol used to deliver Service Layer Signalling for this service. |
|       @slsMinorProtocolVersion | 1 | unsignedByte | Minor version number of protocol used to deliver Service Layer Signalling for this service. |
|       @slsPlpId | 1 | unsignedByte | PLP ID of the physical layer pipe carrying the broadcast SLS for this service. |
|       @slsDestinationIpAddress | 1 | string | A string containing the dotted-IPv4 destination address of the packets carrying broadcast SLS data for this service. |
|       @slsDestinationUdpPort | 1 | unsignedShort | Port number of the packets carrying broadcast SLS data for this service. |
|       @slsSourceIpAddress | 1 | string | A string containing the dotted-IPv4 source address of the packets carrying broadcast SLS data for this service. |
|     svcInetUrl | 0..N | anyURI | URL to access Internet signalling for this service |
|       @urlType | 0..1 | unsignedByte | Type of files available with this URL |

FIG. 36

| Element or Attribute Name | | | | | Use | Data Type | Description |
|---|---|---|---|---|---|---|---|
| bundleDescription | | | | | | | Root element of the User Service Bundle Description. |
| | userServiceDescription | | | | | | A single instance of an ATSC 3.0 Service. |
| | | @globalServiceID | | | 1 | anyURI | A globally unique URI that identifies the ATSC 3.0 Service, unique within the scope of the BSID. This parameter is used to link to ESG data (Service@globalServiceID). |
| | | @serviceId | | | 1 | unsignedShort | Reference to corresponding service entry in LLS (SLT). The value of this attribute is the same value of serviceId assigned to the entry. |
| | | @serviceStatus | | | 0..1 | boolean | Specify the status of this service. The value indicates whether this service is active or inactive. When set to "1" (true), that indicates service is active. Shall default to 1 when not present. |
| | | @fullMPDUri | | | 1 | anyURI | Reference to an MPD fragment which contains descriptions for contents components of the ATSC 3.0 Service delivered over broadcast and optionally, also over broadband. |
| | | @sTSIDUri | | | 1 | anyURI | Reference to the S-TSID fragment which provides access related parameters to the Transport sessions carrying contents of this ATSC 3.0 Service. |
| | | @applicationUrl | | | 0..1 | string | ApplicationUrl indicates the url of the application to be executed just after the service will be tuned |
| | | name | | | 0..N | string | Name of the ATSC 3.0 service as given by the lang attribute. |
| | | | @lang | | | 1 | language | Language of the ATSC 3.0 service name. The language shall be specified according to BCP 47. |
| | | serviceLanguage | | | 0..N | language | Available languages of the ATSC 3.0 service. The language shall be specified according to BCP 47. |
| | | capabilityCode | | | 0..1 | string | Specifies the capabilities and capability groups, as defined in the ATSC 3.0 Service Announcement specification, required in the receiver to be able to create a meaningful presentation of the content of this ATSC service. The format of this element shall be identical to the capabilities element specified under the Content fragment of the ATSC 3.0 Service Announcement specification |
| | | deliveryMethod | | | 1..N | | Container of transport related information pertaining to the contents of the service over broadcast and (optionally) broadband modes of access. |
| | | | broadcastAppService | | 1..N | | A DASH Representation delivered over broadcast, in multiplexed or non-multiplexed form, containing the corresponding media component(s) belonging to the ATSC 3.0 Service, across all Periods of the affiliated Media Presentation. |
| | | | | basePattern | 1..N | string | A character pattern for use by the ATSC receiver to match against any portion of the Segment URL used by the DASH client to request Media Segments of a parent Representation under its containing Period. A match implies that the corresponding requested Media Segment is carried over broadcast transport. |
| | | | unicastAppService | | 0..N | | A DASH Representation delivered over broadband, in multiplexed or non-multiplexed form, containing the constituent media content component(s) belonging to the ATSC 3.0 Service, across all Periods of the affiliated Media Presentation. |
| | | | | basePattern | 1..N | string | A character pattern for use by the ATSC receiver to match against any portion of the Segment URL used by the DASH client to request Media Segments of a parent Representation under its containing Period. A match implies that the corresponding requested Media Segment is carried over broadband transport. |

FIG. 37

| Element or Attribute Name | | | | Use | Data Type | Description |
|---|---|---|---|---|---|---|
| S-TSID | | | | | | Service Transport Session Instance Description |
| | @serviceId | | | 0..1 | unsignedShort | Reference to corresponding service element in the USD. The value of this attribute shall reference a service with a corresponding value of ServiceId. |
| | @applicationUrl | | | 0..1 | string | ApplicationUrl indicates the url of the application to be executed just after the service will be tuned |
| | RS | | | 1..N | | ROUTE session |
| | | @bsid | | 0..1 | unsignedShort | Identifier of the Broadcast Stream within which the content component(s) of the broadcastAppService are carried. When this attribute is absent, the default Broadcast Stream is the one whose PLPs carry SLS fragments for this ATSC 3.0 service. Its value shall be identical to that of the @bsid in the SLT. |
| | | @sIpAddr | | 0..1 | string | Source IP address (default: current ROUTE session's source IP address) (M for non-primary session) |
| | | @dIpAddr | | 0..1 | string | Destination IP address (default: current ROUTE session's destination IP address) (M for non-primary session) |
| | | @dport | | 0..1 | unsignedShort | Destination port (default: current ROUTE session's destination port) (M for non-primary session) |
| | | @PLPID | | 0..1 | unsignedByte | Physical Layer Pipe ID for ROUTE session (default: current physical layer pipe). PLP_ID shall be as specified A/322 "ATSC 3.0 Physical Layer Downlink Standard" [3]. |
| | | LS | | 1..N | | LCT channel |
| | | | @tsi | 1 | unsignedInt | TSI value |
| | | | @PLPID | 0..1 | unsignedByte | PLP ID (overrides default ROUTE session value) |
| | | | @bw | 0..1 | unsignedInt | Maximum bandwidth |
| | | | @startTime | 0..1 | dateTime | Start time |
| | | | @endTime | 0..1 | dateTime | End time |
| | | | SrcFlow | 0..1 | srcFlowType | Source Flow as defined in Annex A, Section A.3 |
| | | | RepairFlow | 0..1 | rprFlowType | Repair Flow as defined in Annex A, Section A.4 |

FIG. 39

| Element or Attribute Name | | | | Use | Data Type | Description |
|---|---|---|---|---|---|---|
| S-TSID | | | | | | Service Transport Session Instance Description |
| | @serviceId | | | 0..1 | unsignedShort | Reference to corresponding service element in the USD. The value of this attribute shall reference a service with a corresponding value of ServiceId. |
| | RS | | | 1..N | | ROUTE session |
| | | @bsid | | 0..1 | unsignedShort | Identifier of the Broadcast Stream within which the content component(s) of the broadcastAppService are carried. When this attribute is absent, the default Broadcast Stream is the one whose PLPs carry SLS fragments for this ATSC 3.0 service. Its value shall be identical to that of the @bsid in the SLT. |
| | | @sIpAddr | | 0..1 | string | Source IP address (default: current ROUTE session's source IP address) (M for non-primary session) |
| | | @dIpAddr | | 0..1 | string | Destination IP address (default: current ROUTE session's destination IP address) (M for non-primary session) |
| | | @dport | | 0..1 | unsignedShort | Destination port (default: current ROUTE session's destination port) (M for non-primary session) |
| | | @PLPID | | 0..1 | unsignedByte | Physical Layer Pipe ID for ROUTE session (default: current physical layer pipe). PLP_ID shall be as specified A/322 "ATSC 3.0 Physical Layer Downlink Standard" [3]. |
| | | LS | | 1..N | | LCT channel |
| | | | @tsi | 1 | unsignedInt | TSI value |
| | | | @PLPID | 0..1 | unsignedByte | PLP ID (overrides default ROUTE session value) |
| | | | @bw | 0..1 | unsignedInt | Maximum bandwidth |
| | | | @startTime | 0..1 | dateTime | Start time |
| | | | @endTime | 0..1 | dateTime | End time |
| | | | SrcFlow | 0..1 | srcFlowType | Source Flow as defined in Annex A, Section A.3 |
| | | | RepairFlow | 0..1 | rprFlowType | Repair Flow as defined in Annex A, Section A.4 |

FIG. 40

| Element or Attribute Name | | | Use | Data Type | Description |
|---|---|---|---|---|---|
| SrcFlow | | | | srcFlowType | Source flow carried in the LCT channel. |
| | @rt | | 0..1 | boolean | If @rt is not present, it is assumed false. Shall be present and set to "true" when the SrcFlow carries streaming media.<br><br>Default value: false |
| | @minBuffSize | | 0..1 | unsignedInt | Defines the minimum number of kilobytes required in the receiver transport buffer for the LCT channel. This value may be present if @rt is set to true. |
| | EFDT | | 0..1 | | The extended FDT instance. See further description in Section A.3.3.2.3. |
| | ContentInfo | | 0..1 | string | May provide additional information that can be mapped to the application service that is carried in this transport session, e.g. Representation ID of a DASH content or the Adaptation Set parameters of a DASH Media Representation in order to select the LCT channel for rendering. |
| | Payload | | 1..N | | Information on the payload of ROUTE packets carrying the objects of the source flow. |
| | | @codePoint | 0..1 | unsignedByte | A numerical representation of the combination of values specified for the child elements and attributes of the Payload element. The value of @codePoint shall be identical to the CP (Codepoint) field in the LCT header.<br><br>Default value = "0" |
| | | @formatID | 1 | unsignedByte | Specifies the payload format of the delivery object. For details see Table A.3.2. |
| | | @frag | 0..1 | unsignedByte | This attribute contains an unsignedByte value indicating how the payload of ROUTE packets carrying the objects of the source flow are fragmented for delivery.<br>0: arbitrary. This value means that the payload of this ROUTE packet carries a contiguous portion of the delivery object whose fragmentation occurs at arbitrary byte boundaries.<br>1: application specific (sample based). This value means that the payload of this ROUTE packet carries media data in the form of one or more complete samples, where the term "sample" is as defined in ISO/IEC 14496-12 [23]. Its usage pertains to the MDE mode as described in Sec. 8.1.1.5.2, whereby the packet strictly carries an MDE data block comprising samples stored in the 'mdat' box.<br>2: application specific (a collection of boxes). This value means that the payload of this ROUTE packet contains the entire data content of one or more boxes, where term "box" is as defined in ISO/IEC 14496-12 [41]. Its usage pertains to the MDE mode as described in Sec. 8.1.1.5.2, whereby each packet carries the portion of an MDE data block starting with RAP, and strictly comprising boxes which contain metadata(e.g. styp, sidx, moof and their contained (subordinate) boxes).<br>3-127: reserved for future use<br>128-255: reserved for proprietary use<br><br>Default value = "0" |
| | | @order | 0..1 | unsignedByte | This attribute contains an unsignedByte value indicating whether and how the payload of ROUTE packets carrying the objects of the source flow as DASH Segments are delivered in the order of their generation by the DASH encoder.<br>0: arbitrary. This packet carries a portion of the DASH Segment whose order is arbitrary (non-specific) relative to the portion of the same DASH Segment carried by another packet.<br>1: in-order delivery. The concatenation of the payloads of contiguous packets which carry a DASH Segment is identical to the Segment produced by the DASH encoder.<br>2: in-order delivery of media samples and prior to movie fragment box. The concatenation of the payloads of contiguous packets which carry the media samples of a movie fragment (where "movie fragment" is as defined by ISO/IEC 23009-1 [26]) is in the same order of those samples as produced by the DASH encoder. However, these packets shall be transmitted prior to the packet(s) which carry the movie fragment box, moof. Usage of @order=2 is specific to the MDE mode as described in Sec. 8.1.1.5.2.<br>3-127: reserved for future use<br>128-255: reserved for proprietary use<br><br>Default value = "0" |
| | | @srcFecPayloadID | 0..1 | unsignedByte | Defined values of the Source FEC Payload ID for use in conjunction with the following rules:<br>・0: the source FEC payload ID is absent and the entire delivery object is contained in this packet. The FECParams child element of SrcFlow shall be absent.<br>・1: the source FEC payload ID is a 32-bit unsigned integer value that expresses the start offset in the object. Start offset is defined in Section A.3.5 The FECParams child element of SrcFlow shall be absent.<br>・2: the FECParams child element of SrcFlow defines the Format of the Source FEC Payload ID.<br>Default value = "1" |
| | FECParams | | 0..1 | | Defines the parameters of the FEC scheme associated with the source flow, in the form of FEC Object Transmission Information as defined in RFC 5052 [15].<br><br>The FEC parameters are applied to the Source FEC Payload ID value specified in the ROUTE (ALC) packet header. |

FIG. 41

| Element or Attribute Name | Use | Data Type | Description |
|---|---|---|---|
| EFDT | | | If provided, it specifies the details of the file delivery data in the form of the Extended FDT instance which includes nominal FDT instance parameters.<br><br>The EFDT may either be embedded or may be provided as a reference. If provided as a reference the EFDT may be updated independently of the signaling metadata.<br><br>If referenced, and delivered as an in-band object of the included source flow which is delivered on an LCT channel separate from the LCT channel carrying the signaling metadata , its TOI value shall be "0".<br><br>If the referenced EFDT is delivered on a different LCT channel from the LCT channel carrying the contents of the referencing SrcFlow, its TOI value shall be "1". |
| @tsi | 0..1 | unsignedInt | TSI of the LCT channel carrying the referenced EFDT. |
| @idRef | 0..1 | anyURI | Identification of the EFDT in the form of a URI when the EFDT is delivered in-band with the source flow as a referenced delivery object. Identical to the Content-Location for the FDT. |
| @version | 0..1 | unsignedInt | Version of this Extended FDT instance descriptor. The version if increased by one when the descriptor is updated. The received EFDT with highest version number is the currently valid version. |
| @maxExpiresDelta | 0..1 | unsignedInt | Time interval in number of integer seconds, which when added to the wall-clock time at the receiver when it acquires the first ROUTE packet carrying the object described by this EFDT, shall represent the expiration time of the associated EFDT. If @maxExpiresDelta is not present, the expiration time of the EFDT shall be given by the sum of a) the value of the ERT field in the EXT_TIME header of the ROUTE packet and b) the current receiver time when parsing the packet header. See Section A.3.3.2.3.2 on additional rules for deriving the EFDT expiration time. |
| @maxTransportSize | 0..1 | unsignedInt | The maximum transport size of any object described by this EFDT.<br>Shall be present if not present in FEC_OTI. |
| FileTemplate | 0..1 | string | Specifies the file URL (equivalent to the Content-Location attribute of the FDT) or a template format for the derivation of the file URI. For details refer to Section A.3.3.2.3.2. |
| FDTParameters | 0..1 | fdt:FDT-InstanceType | Any parameters allowed in the FLUTE FDT instance from RFC 6726. |

# RECEPTION DEVICE, TRANSMISSION DEVICE, AND DATA PROCESSING METHOD

TECHNICAL FIELD

The present technology relates to a reception device, a transmission device, and a data processing method, and more particularly, to a reception device, a transmission device, and a data processing method that enable a flexible operation of a service using an application that accompanies content.

BACKGROUND ART

It is known that application control information such as an application information table (AIT) is used in performing delivery lifecycle control for an application accompanying content such as a program or a commercial (this application will be hereinafter simply referred to as the application). With this application control information, it is possible to control the start and the end of the application.

Meanwhile, there is a problem of a possibility that the application will be replaced with a malicious application unintended by the content provider, through a fraudulent act such as so-called broadcast hijacking (broadcast signal intrusion).

A method of constructing a full-fledged application authentication platform using Public Key Infrastructure (PKI) or the like might be considered as a solution to this kind of problem, but constructing a full-fledged platform only for application authentication is not realistic from a cost perspective. Also, digital rights management (DRM) is known as a mechanism for protecting the copyrights of content (see Patent Document 1, for example).

CITATION LIST

Patent Document

Patent Document 1: WO 2014/080783 A1

SUMMARY OF THE INVENTION

Problems to be Solved by the Invention

While the application lifecycle control is simplified, there is a demand for suggestions for providing an application in a secure manner at low costs, and flexibly operating a service using an application that accompanies content.

The present technology has been made in view of such circumstances, and aims to enable a flexible operation of a service using an application that accompanies content.

Solutions to Problems

A reception device according to a first aspect of the present technology is a reception device that includes: a reception unit that receives content; an acquisition unit that acquires an application in accordance with acquisition source information indicating an acquisition source of the application accompanying the content, the acquisition source information being included in control information transmitted together with the content; and a control unit that instantly starts the acquired application.

The reception device according to the first aspect of the present technology may be an independent device or may be an internal block forming one device. Meanwhile, a data processing method according to the first aspect of the present technology is a data processing method compatible with the above described reception device according to the first aspect of the present technology.

In the reception device and the data processing method according to the first aspect of the present technology, content is received, an application accompanying the content is acquired in accordance with acquisition source information that is included in control information transmitted together with the content and indicates the acquisition source of the application, and the acquired application is instantly started.

A transmission device according to a second aspect of the present technology is a transmission device that includes: a generation unit that generates control information for causing an acquired application to be instantly started, the control information including acquisition source information indicating an acquisition source of the application accompanying content; and a transmission unit that transmits the control information together with the content.

The transmission device according to the second aspect of the present technology may be an independent device or may be an internal block forming one device. Meanwhile, a data processing method according to the second aspect of the present technology is a data processing method compatible with the above described transmission device according to the second aspect of the present technology.

In the transmission device and the data processing method according to the second aspect of the present technology, control information that includes acquisition source information indicating the acquisition source of an application accompanying content and is for causing the acquired application to be instantly started, and the control information is transmitted together with the content.

A reception device according to a third aspect of the present technology is a reception device that includes: a reception unit that receives content; an acquisition unit that acquires an application accompanying the content, the application being protected by digital rights management (DRM) of the content; a verification unit that verifies whether the acquired application is a legitimate application; and a control unit that starts the application in a case where the application is recognized as a legitimate application.

The reception device according to the third aspect of the present technology may be an independent device or may be an internal block forming one device. Meanwhile, a data processing method according to the third aspect of the present technology is a data processing method compatible with the above described reception device according to the third aspect of the present technology.

In the reception device and the data processing method according to the third aspect of the present technology, content is received, an application that accompanies the content and is protected by digital rights management (DRM) of the content is acquired, verification is performed to determine whether the acquired application is a legitimate application, and the application is started in a case where the application is recognized as a legitimate application.

A transmission device according to a fourth aspect of the present technology is a transmission device that includes: a protection unit that protects an application accompanying content by digital rights management (DRM) of the content; and a transmission unit that transmits the content and the application, the content and the application being protected by the same digital rights management (DRM).

The transmission device according to the fourth aspect of the present technology may be an independent device or may be an internal block forming one device. Meanwhile, a data processing method according to the fourth aspect of the present technology is a data processing method compatible with the above described transmission device according to the fourth aspect of the present technology.

In the transmission device and the data processing method according to the fourth aspect of the present technology, an application accompanying content is protected by digital rights management (DRM) of the content, and the content and the application that are protected by the same digital rights management (DRM) are transmitted.

Effects of the Invention

According to the first through fourth aspects of the present technology, it is possible to flexibly operate a service using an application that accompanies content.

It should be noted that the effects of the present technology are not necessarily limited to the effects described herein, and may include any of the effects described in the present disclosure.

BRIEF DESCRIPTION OF DRAWINGS

FIG. 10 is a diagram showing an example description of MPD metadata according to an MPD event method.

FIG. 11 is a flowchart for explaining the flow of processing on the transmission side in a case where application control depending on events according to the MPD event method is performed.

FIG. 12 is a flowchart for explaining the flow of processing on the reception side in a case where application control depending on events according to the MPD event method is performed.

FIG. 13 is a diagram showing an example disposition of a DASHEventMessageBox according to an in-band event method.

FIG. 22 is a diagram showing an example syntax of an application digest.

FIG. 23 is a diagram showing an example of digest_type.

FIG. 27 is a diagram showing an example syntax of a watermark payload.

FIG. 28 is a diagram showing an example syntax of a WM message block.

FIG. 29 is a diagram showing an example of a WM message ID.

FIG. 35 is a diagram showing an example format of SLT.

FIG. 36 is a diagram showing an example format of USD.

FIG. 37 is a diagram showing an example format of S-TSID.

FIG. 39 is a diagram showing an example format of S-TSID.

FIG. 40 is a diagram showing an example format of SrcFlow.

FIG. 41 is a diagram showing an example format of EFDT.

MODES FOR CARRYING OUT THE INVENTION

The following is a description of embodiments of the present technology, with reference to the drawings. It should be noted that explanation will be made in the following order.

1. First embodiment: Application lifecycle control
 (1) System configuration
 (2) Application control in accordance with application URLs (3) Application control in accordance with application control events
    (A) MPD event method
    (B) In-band event method
2. Second embodiment: secure provision of applications
    (1) System configuration
    (2) Overview of an application digest
    (3) Application digest transmission methods
    (A) Watermark storage method
    (B) Non-VCL-NAL unit storage method
3. Examples of signaling
4. Modifications
5. Example configuration of a computer 1. First Embodiment: Application Lifecycle Control There is a demand for suggestions for implementing a control model of an application in a simple manner when a service using the application accompanying content such as a program or a commercial is provided. For example, Advanced Television Systems Committee (ATSC) 3.0, which is currently being developed and is a next-generation broadcasting standard in the United States, has considered the use of an application signaling table (AST) in application delivery lifecycle control. However, there is a demand for simpler implementation of a control model of an application, other than the use of an AST.

Therefore, in the present technology, only the Uniform Resource Locator (URL) (hereinafter referred to as the application URL) of the application that is started in conjunction with content is described in signaling. In a case where a service (channel) is selected, the application is acquired in accordance with the application URL described in the signaling, so that the acquired application is instantly started.

That is, in the present technology, lifecycle control on individual applications controlled by application control information such as AST or AIT is not performed, but one or more application URLs bound to the service (channel) or a specific time zone (such as program time frame or a commercial time frame) are described in signaling, so that the current application is acquired and is instantly started in a case where the application URL is described in signaling.

In the following, simplification of application lifecycle control using an application URL is described as a first embodiment.

(1) System Configuration
(Configuration of a Transmission System)

Figure 1:
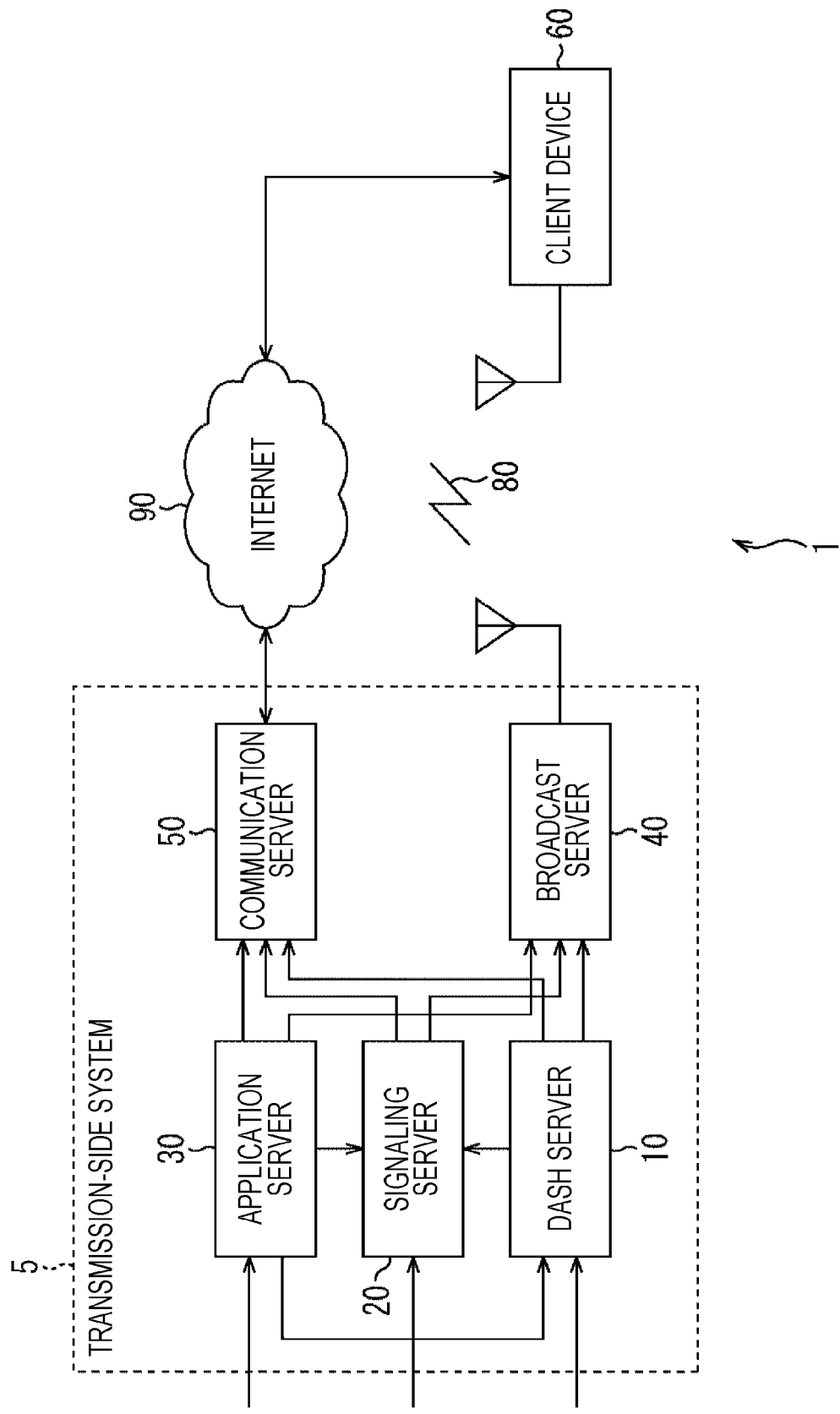
FIG. 1 is a diagram showing an example configuration of a transmission system according to a first embodiment.

FIG. 1 is a diagram showing an example configuration of an embodiment (the first embodiment) of a transmission system to which the present technology is applied. Note that the term "system" means a group of a plurality of devices logically gathered.

In FIG. 1, a transmission system 1 is formed with a transmission-side system 5 and a client device 60 on the reception side. In the transmission system 1, data transmitted from the transmission-side system 5 is received by the client device 60 via a transmission channel 80 or the Internet 90.

For example, in the transmission system 1, data transmission compliant with a predetermined standard such as ATSC 3.0 is performed. It should be noted that, in ATSC 3.0, it is assumed that more sophisticated services are to be provided by introducing not the MPEG2-TS (Transport Stream) method currently widely used as a transmission method, but an IP transmission method that uses, in digital broadcasting, Internet Protocol (IP) packets that are commonly used in the communications fields.

The transmission-side system 5 performs processing for transmitting data compliant with a predetermined standard such as ATSC 3.0, for example. The transmission-side system 5 includes a DASH server 10, a signaling server 20, an application server 30, a broadcast server 40, and a communication server 50.

The DASH server 10 is a server for providing delivery services compatible with MPEG-DASH (Dynamic Adaptive Streaming over HTTP). Here, MPEG-DASH is a streaming delivery standard compliant with over-the-top video (OTT-V), and is a standard related to adaptive streaming delivery using a streaming protocol based on Hyper Text Transfer Protocol (HTTP).

This MPEG-DASH standard specifies a manifest file for writing metadata that is management information about video and audio files, and a file format for transmitting video content. It should be noted that the former, which is a manifest file, is referred to as Media Presentation Description (MPD). Furthermore, the latter, which is a file format, is also referred to as a segment format.

The DASH server 10 receives data for generating MPD metadata from the outside, data of content, and the like. The DASH server 10 generates MPD metadata in accordance with the data from the outside, and transmits the MPD metadata to the signaling server 20. The DASH server 10 also generates a file of a segment of content such as a program or a commercial (such a segment will be hereinafter also referred to as a DASH segment) in accordance with the data from the outside, and transmits the file to the broadcast server 40 or the communication server 50.

The application server 30 receives data and the like for generating an application from the outside. The application server 30 generates an application URL indicating the acquisition source of the application in accordance with the data from the outside, and transmits the application URL to the signaling server 20. The application server 30 also generates the application to be identified by the application URL in accordance with the data from the outside, and transmits the application to the broadcast server 40 or the communication server 50.

It should be noted that the application is an application that accompanies content such as programs and commercials. Furthermore, an application that accompanies content may be a markup language such as Hyper Text Markup Language 5 (HTML5) or an application developed in a script language such as JavaScript (registered trademark) can be used, for example.

The application server 30 also generates an event for controlling the operation of the application (this event will be hereinafter referred to as the application control event), and transmits the event to the DASH server 10. The DASH server 10 can store the application control event transmitted from the application server 30 into the MPD metadata or the DASH segment.

The signaling server 20 receives data for generating a signal, from the outside. The signaling server 20 also receives the MPD metadata from the DASH server 10 and the application URL from the application server 30. The signaling server 20 generates a signal in accordance with data from the outside, the MPD metadata, and the application URL, and transmits the signal to the broadcast server 40 or the communication server 50.

Here, according to ATSC 3.0, it is assumed that Link Layer Signaling (LLS) signaling and Service Layer Signaling (SLS) signaling are used as signaling, for example. LLS signaling is signaling acquired prior to SLS signaling, and SLS signaling is acquired according to the information included in the LLS signaling. SLS signaling is service-unit signaling.

LLS signaling includes metadata such as a service list table (SLT). The SLT metadata includes basic information indicating the configurations of streams and services in the broadcast network, such as information (tuning information) necessary for channel selection for a service.

SLS signaling includes metadata such as User Service Description (USD), Service-based Transport Session Instance Description (S-TSID), or Media Presentation Description (MPD). USD metadata includes information such as the acquisition sources of other metadata. It should be noted that USD is sometimes referred to as User Service Bundle Description (USED).

S-TSID metadata is an extension of LCT Session Instance Description (LSID) for ATSC 3.0, and is control information for the Real-time Object Delivery over Unidirectional Transport (ROUTE) protocol. It should be noted that ROUTE is a protocol for streaming file transfer, and is an extension of File Delivery over Unidirectional Transport (FLUTE).

As described above, the MPD metadata is management information for files of video and audio files to be streamed. It should be noted that metadata such as SLT, USD, S-TSID, and MPD can be described in a markup language such as Extensible Markup Language (XML), for example.

The signaling server 20 generates LLS signaling including the SLT metadata, and the SLS signaling including USD metadata, S-TSID metadata, and MPD metadata. However, the signaling server 20 processes the MPD metadata generated by the DASH server 10 as SLS signaling. The signaling server 20 further incorporates the application URL generated by the application server 30 into metadata such as SLT, USD, S-TSID, or MPD.

The broadcast server 40 is a transmitter capable of performing data transmission compliant with digital broadcasting standards such as ATSC 3.0.

The broadcast server 40 receives the DASH segment transmitted from the DASH server 10, the signaling transmitted from the signaling server 20, and (a file of) the application transmitted from the application server 30. The broadcast server 40 processes the DASH segment, the signaling, and (the file of) the application, and transmits (simultaneously broadcasts) the results via the transmission channel 80.

Locally Cached Content (LCC) content is also input to the broadcast server 40. LCC content is content to be reproduced after being temporarily stored into a storage in the client device 60. The broadcast server 40 processes (a file of) the LCC content inputted thereto, and transmits (simultaneously broadcasts) the LCC content via the transmission channel 80.

The communication server 50 is a server that provides various kinds of data via the Internet 90 in response to a request from the client device 60 connected to the Internet 90.

The communication server 50 receives the DASH segment transmitted from the DASH server 10, the signaling transmitted from the signaling server 20, and (a file of) the application transmitted from the application server 30. The communication server 50 processes the DASH segment, the signaling, and (the file) of the application. Then, in response to a request from the client device 60, the communication server 50 transmits various kinds of files via the Internet 90.

The client device 60 is a receiver capable of receiving transmission data compliant with digital broadcast standards such as ATSC 3.0. For example, the client device 60 is a fixed receiver such as a television set or a set top box, or a mobile receiver such as a smartphone, a mobile phone, or a tablet computer. Alternatively, the client device 60 may be a device mounted on an automobile such as an in-vehicle television set, for example.

The client device 60 receives and processes files of DASH segments, signaling, LCC content, or the like transmitted (simultaneously broadcast) from the broadcast server 40 via the transmission channel 80, to output videos and sounds of content such as broadcast programs.

Furthermore, in a case where the client device 60 has a communication function, the client device 60 can access the communication server 50 via the Internet 90 and acquire various kinds of files. For example, the client device 60 receives and processes a file of a DASH segment, MPD metadata, and the like that are transmitted (adaptively streamed) from the communication server 50 via the Internet 90, to output videos and sounds of content such as video-on-demand (VOD) programs.

The client device 60 also acquires an application distributed from the broadcast server 40 or the communication server 50 in accordance with the application URL included in signaling transmitted from the broadcast server 40 or the communication server 50, and instantly starts the acquired application.

By doing so, the client device 60 executes an application that is acquired via broadcasting or communication and accompanies content acquired via the broadcasting or communication. However, the application may not be explicitly displayed as some information, but may be invisibly operated (in the background) (in some cases, an application may start without being recognized by the user).

Further, in a case where an application control event is stored in the MPD metadata or the DASH segment, the client device 60 controls the operation of the application in accordance with the application control event.

It should be noted that, in the transmission system 1, the transmission channel 80 may be formed with, for example, satellite broadcasting using a broadcasting satellite (BS) or a communications satellite (CS), cable broadcasting using cables (CATV), or the like, in addition to terrestrial waves (terrestrial broadcasting).

Here, in the transmission system 1 shown in FIG. 1, only one client device 60 is shown for ease of explanation. However, a plurality of client devices 60 can be provided, and a digital broadcast signal transmitted (simultaneously broadcast) by the transmission-side system 5 can be simultaneously received by the plurality of client devices 60 via the transmission channel 80.

A plurality of transmission-side systems 5 can also be provided. Each of the plurality of transmission-side systems 5 transmits a digital broadcast signal including a broadcast stream in a separate channel, or in a separate frequency band, for example, and the client device 60 can select the channel for receiving the broadcast stream from among the respective channels of the plurality of transmission-side systems 5.

Referring now to FIGS. 2 through 6, the configurations of the DASH server 10, the signaling server 20, the application server 30, and the broadcast server 40 of the transmission-side system 5, and the configuration of the client device 60 in the transmission system 1 shown in FIG. 1 are described. It should be noted that, although the configuration of the communication server 50 is not specifically described herein, the communication server 50 has a configuration similar to that of a general server having a communication function.

(Configuration of the DASH Server)

Figure 2:
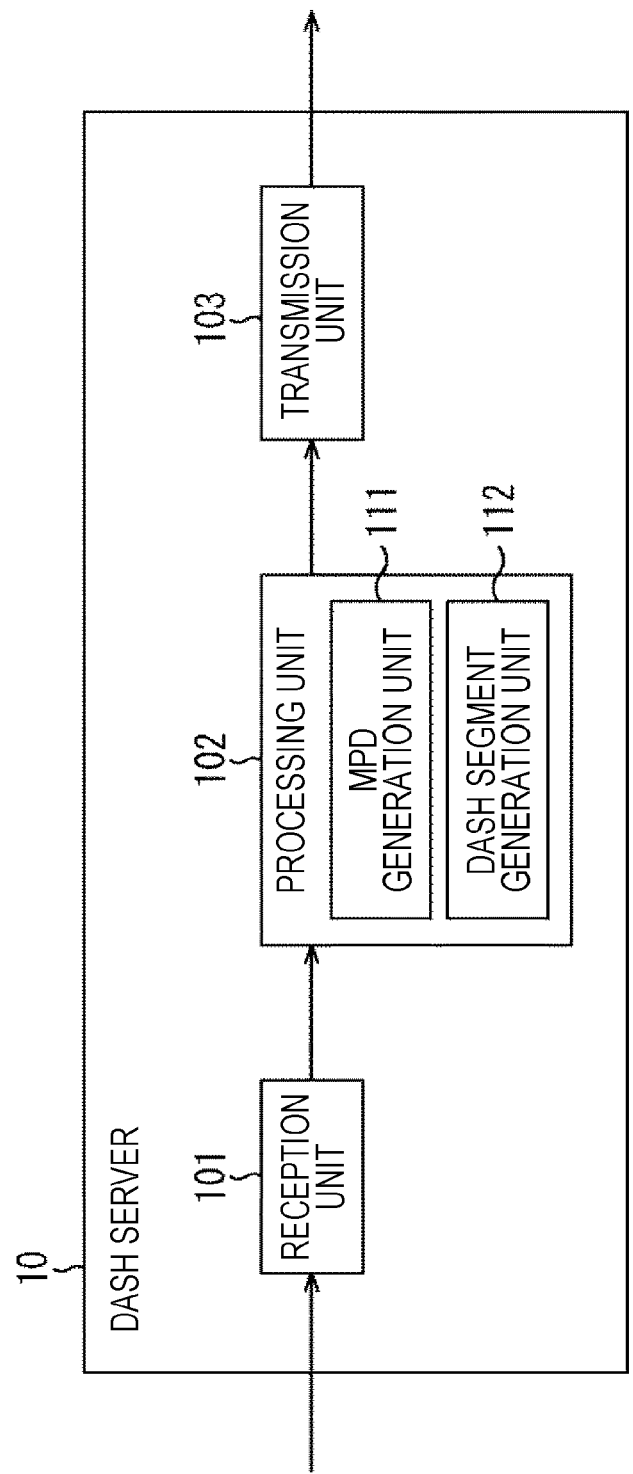
FIG. 2 is a diagram showing an example configuration of a DASH server.

FIG. 2 is a diagram showing an example configuration of the DASH server 10 shown in FIG. 1.

In FIG. 2, the DASH server 10 includes a reception unit 101, a processing unit 102, and a transmission unit 103.

The reception unit 101 receives data for streaming delivery from an external server (not shown) or the like, and supplies the data to the processing unit 102. In a case where the reception unit 201 receives an application control event from the application server 30, the reception unit 201 also supplies the application control event to the processing unit 102. It should be noted that an application control event will be described later in detail.

The processing unit 102 processes the data supplied from the reception unit 101, and supplies the processed data to the transmission unit 103. The processing unit 102 also includes an MPD generation unit 111 and a DASH segment generation unit 112.

The MPD generation unit 111 generates MPD metadata in accordance with the data supplied from the reception unit 101. In a case where an application control event is supplied from the reception unit 201 (where the later described MPD event method is adopted), the MPD generation unit 111 also stores the application control event into the MPD metadata.

The DASH segment generation unit 112 generates a DASH segment, in accordance with the data supplied from the reception unit 101. It should be noted that the DASH segment is compliant with ISO Base Media File Format (ISOBMFF). In a case where an application control event is supplied from the reception unit 201 (where the later described in-band event method is adopted), the DASH segment generation unit 112 also stores the application control event into the DASH segment. However, as will be described later in detail with reference to FIGS. 10 through 15, either the MPD metadata or the DASH segment should store an application control event.

Here, the DASH segment is a segment file obtained by processing content such as live content (for example, a live broadcast program such as a sports broadcast) transmitted from a relay location via a transmission channel or a communication line, or recorded content (for example, a recorded program such as a drama) stored in a storage.

The transmission unit 103 transmits the MPD metadata of the data supplied from the processing unit 102 to the signaling server 20, and transmits the DASH segment to the broadcast server 40 or the communication server 50. It should be noted here that, in a case where the DASH segment is delivered via broadcasting, the data is transmitted to the broadcast server 40. In a case where the DASH segment is delivered via communication, the data is transmitted to the communication server 50.

The DASH server 10 is configured as described above.

(Configuration of the Signaling Server)

Figure 3:
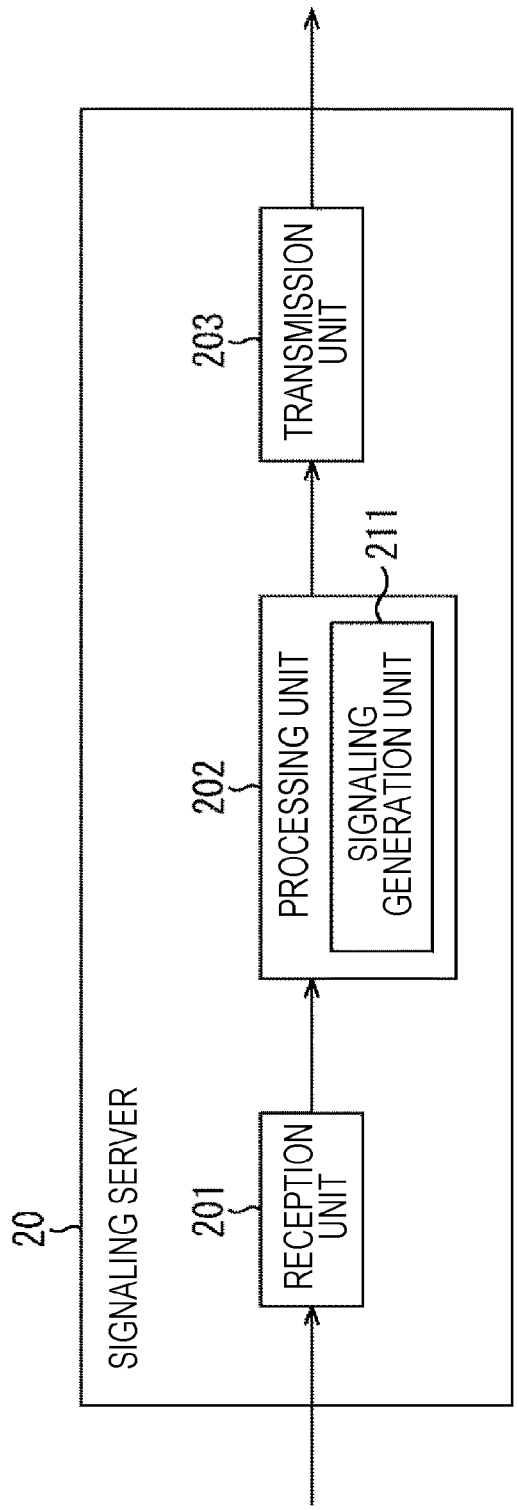
FIG. 3 is a diagram showing an example configuration of a signaling server.

FIG. 3 is a diagram showing an example configuration of the signaling server 20 shown in FIG. 1.

In FIG. 3, the signaling server 20 includes a reception unit 201, a processing unit 202, and a transmission unit 203.

The reception unit 201 receives data for generating signaling from an external server (not shown) or the like, and supplies the data to the processing unit 202. The reception unit 201 also receives MPD metadata transmitted from the DASH server 10 and an application URL transmitted from the application server 30, and supplies them to the processing unit 202.

The processing unit 202 processes the data supplied from the reception unit 201, and supplies the data to the transmission unit 203. The processing unit 202 also includes a signaling generation unit 211.

In accordance with the data supplied from the reception unit 201, the signaling generation unit 211 generates LLS signaling containing SLT metadata, and SLS signaling containing USD metadata, S-TSID metadata, and MPD metadata. However, the SLT metadata, the USD metadata, the S-TSID metadata, or the MPD metadata includes the application URL generated by the application server 30.

The transmission unit 203 transmits the signaling supplied from (the signaling generation unit 211 of) the processing unit 202 to the broadcast server 40 or the communication server 50. It should be noted here that, in a case where the signaling is delivered via broadcasting, the data is transmitted to the broadcast server 40. In a case where the signaling is delivered via communication, the data is transmitted to the communication server 50.

The signaling server 20 is configured as described above.

(Configuration of the Application Server)

Figure 4:
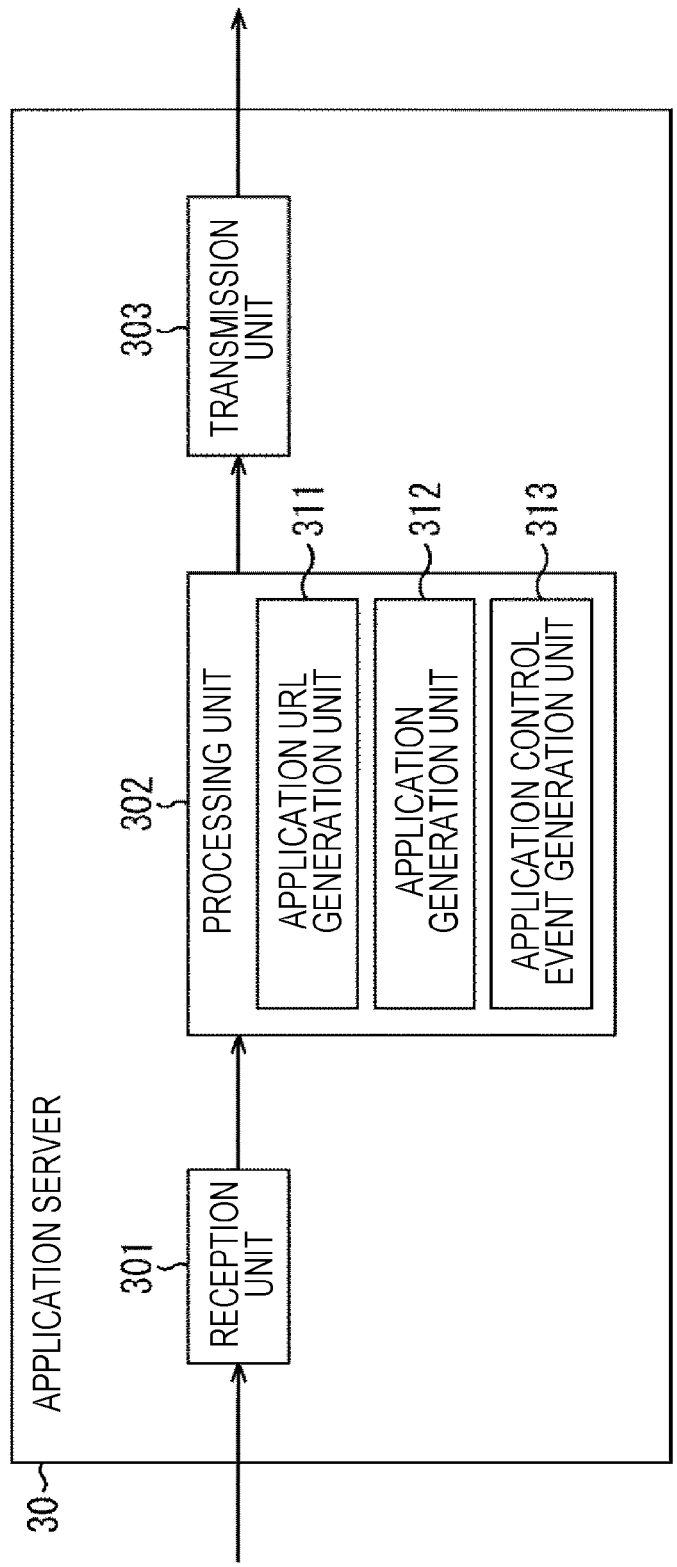
FIG. 4 is a diagram showing an example configuration of an application server.

FIG. 4 is a diagram showing an example configuration of the application server 30 shown in FIG. 1.

In FIG. 4, the application server 30 includes a reception unit 301, a processing unit 302, and a transmission unit 303.

The reception unit 301 receives data for an application from an external server (not shown) or the like, and supplies the data to the processing unit 302. The processing unit 302 processes the data supplied from the reception unit 301, and supplies the data to the transmission unit 303. The processing unit 302 also includes an application URL generation unit 311, an application generation unit 312, and an application control event generation unit 313.

In accordance with the data supplied from the reception unit 301, the application URL generation unit 311 generates an application URL indicating the acquisition source of an application. In accordance with the data supplied from the reception unit 301, the application generation unit 312 generates the application to be identified by the application URL.

At predetermined timing to cause the application to perform a predetermined operation, the application control event generation unit 313 generates an event for controlling the operation of the application (this event is an application operation event).

The transmission unit 303 transmits the application URL of the data supplied from the processing unit 302 to the signaling server 20, and transmits the application to the broadcast server 40 or the communication server 50. It should be noted here that, in a case where the application is delivered via broadcasting, the data is transmitted to the broadcast server 40. In a case where the application is delivered via communication, the data is transmitted to the communication server 50.

In a case where an application operation event is supplied from (the application control event generation unit 313 of) the processing unit 302, the transmission unit 303 also supplies the application operation event to the DASH server 10.

The application server 30 is configured as described above.

[Configuration of the Broadcast Server]

Figure 5:
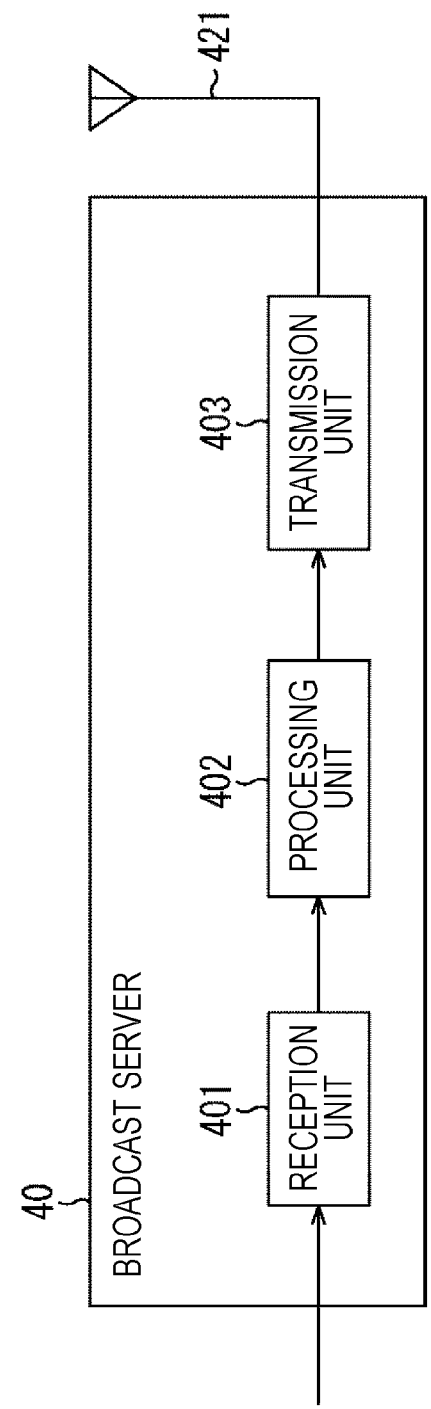
FIG. 5 is a diagram showing an example configuration of a broadcast server.

FIG. 5 is a diagram showing an example configuration of the broadcast server 40 shown in FIG. 1.

In FIG. 5, the broadcast server 40 includes a reception unit 401, a processing unit 402, and a transmission unit 403.

The reception unit 401 receives a DASH segment transmitted from the DASH server 10, signaling transmitted from the signaling server 20, and an application transmitted from the application server 30, and supplies them to the processing unit 402.

The processing unit 402 performs necessary processing on the DASH segment, the signaling, and the application supplied from the reception unit 401, and supplies them to the transmission unit 403. Here, processing for generating an IP/UDP packet storing the data of an LCT session including a DASH segment, SLS signaling, and an application in the payload, processing for generating an IP/UDP packet storing the data of LLS signaling in the payload, or the like Is performed, for example.

The transmission unit 403 transmits (simultaneously broadcasts) broadcast waves (a digital broadcast signal) including the data supplied from the processing unit 402 via the transmission channel 80 through an antenna 421.

The broadcast server 40 is configured as described above.

(Configuration of the Client Device)

Figure 6:
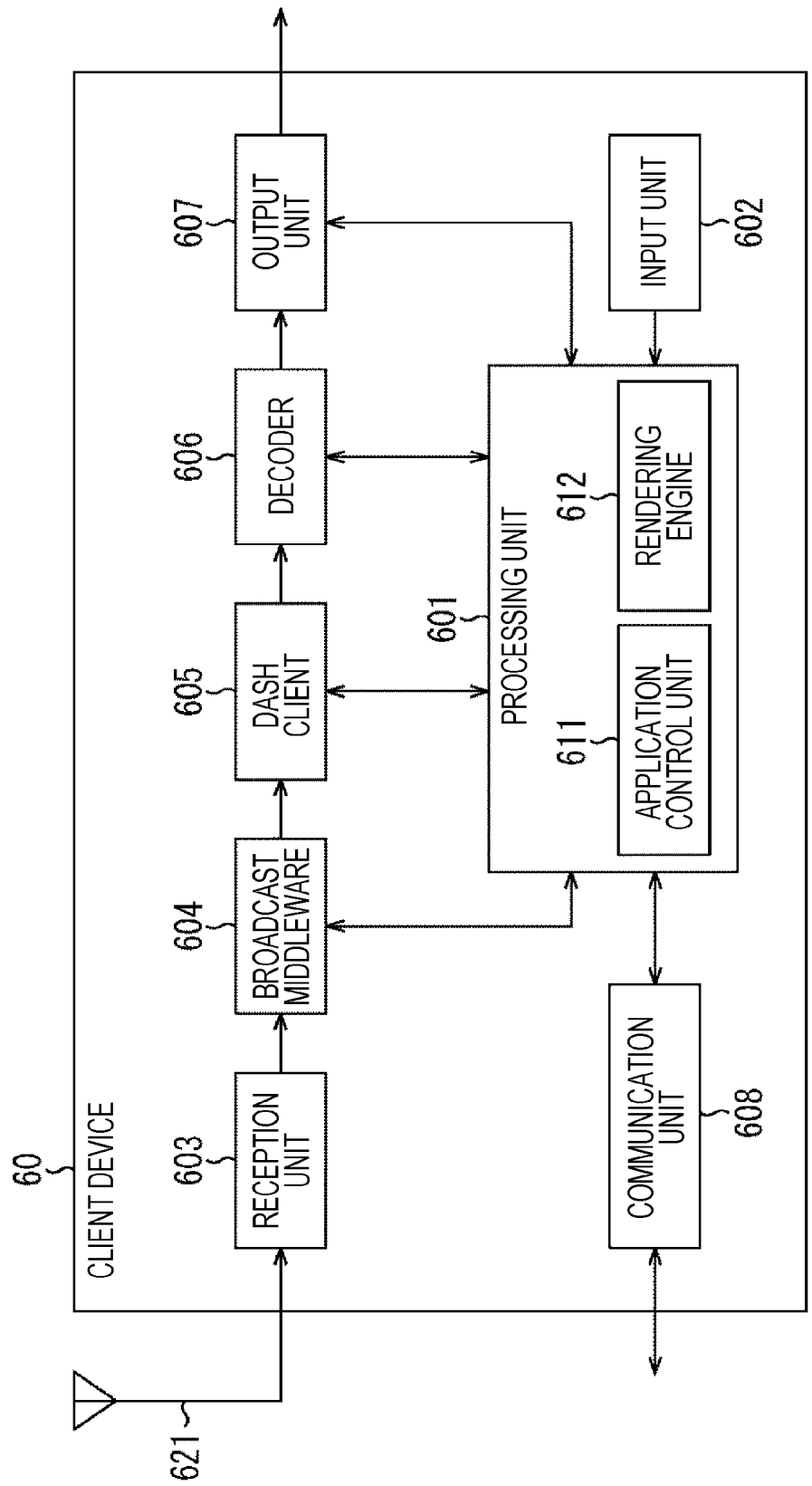
FIG. 6 is a diagram showing an example configuration of a client device.

FIG. 6 is a diagram showing an example configuration of the client device 60 shown in FIG. 1.

In FIG. 6, the client device 60 includes a processing unit 601, an input unit 602, a reception unit 603, broadcast middleware 604, a DASH client 605, a decoder 606, an output unit 607, and a communication unit 608.

The processing unit 601 performs processing for controlling operation of each component of the client device 60 and the like.

The input unit 602 supplies an operation signal corresponding to a user operation to the processing unit 601. In accordance with the operation signal supplied from the input unit 602, the processing unit 601 controls operation of each component of the client device 60.

The reception unit 603 receives and processes broadcast waves (a digital broadcast signal) transmitted (simultaneously broadcast) from the broadcast server 40 via the transmission channel 80 through an antenna 621, and supplies the resultant data to the broadcast middleware 604. It should be noted that the reception unit 603 is formed with a tuner or the like.

The broadcast middleware 604 processes the data supplied from the reception unit 603, and supplies the data to the processing unit 601 or the DASH client 605. Here, of the current data to be processed, the MPD metadata and the DASH segment are supplied to the DASH client 605, and data such as the application and the signaling are supplied to the processing unit 601.

The MPD metadata and the DASH segment are supplied from the broadcast middleware 604 to the DASH client 605. In accordance with the MPD metadata, the DASH client 605 processes the DASH segment. The video and audio data obtained by processing this DASH segment is supplied to the decoder 606.

The decoder 606 decodes video and audio data supplied from the DASH client 605, in accordance with predetermined decoding methods (such as High Efficiency Video Coding (HEVC)) and Advanced Audio Coding (AAC), for example). The video and audio data obtained through this decoding are supplied to the output unit 607.

The output unit 607 outputs the video and audio data supplied from the decoder 606. As a result, in the client device 60, content such as a program or a commercial is reproduced, and the video and the sound thereof are output.

Under the control of the processing unit 601, the communication unit 608 exchanges data with the communication server 50 via the Internet 90. Of the data received by the communication unit 608, the MPD metadata and the DASH segment are supplied to the DASH client 605, and data such as the application and the signaling are supplied to the processing unit 601. The processing performed on these pieces of data acquired via communication is similar to the above described processing performed on the data acquired via broadcasting, and therefore, explanation thereof is not made herein.

The processing unit 601 further includes an application control unit 611 and a rendering engine 612. The application control unit 611 controls operation of the application supplied from the broadcast middleware 604 or the communication unit 608. The rendering engine 612 controls the output unit 607, to generate a video and sound and the like by rendering video, audio, and application data.

The client device 60 is configured as described above.

(2) Application Control in Accordance with Application URLs

As described above, there is a demand for a proposal to implement, in a simple manner, a control model of an application that accompanies content such as a program or a commercial. In the first embodiment, the application URL of an application that starts in conjunction with content is described in signaling (metadata in SLT, USD, S-TSID, MPD, or the like, for example), so that, in a case where the service is selected, the application is immediately acquired and instantly started in accordance with the application URL described in the signaling in the client device 60.

Figure 7:
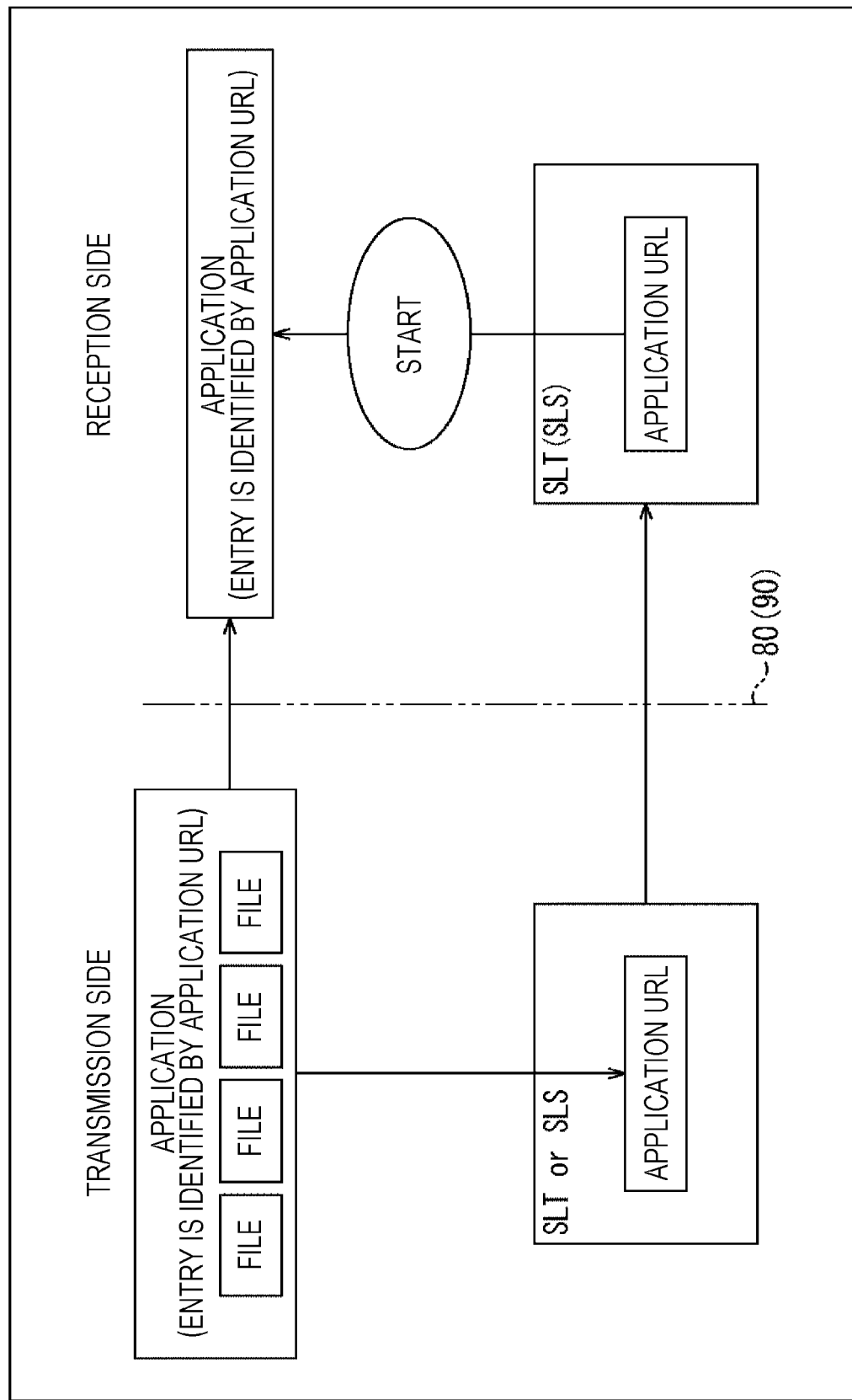
FIG. 7 is a diagram showing an overview of application control in accordance with application URLs.

Here, as shown on the left side in FIG. 7, in the transmission-side system 5 on the transmission side, the application URL generation unit 311 of the application server 30 generates the application URL. Meanwhile, the application is generated by the application generation unit 312 of the application server 30.

Here, the application is developed in a markup language such as HTML5 or a script language such as JavaScript (registered trademark), for example, and is formed with a plurality of files such as HTML document files and image files. Meanwhile, an application entry (index.html, for example) is identified by an application URL. However, an entry means the page that is activated first in an application.

In the transmission-side system 5 on the transmission side, an application generated by the application server 30 is transmitted to the client device 60 on the reception side via the transmission channel 80 (or the Internet 90) by the broadcast server 40 (or the communication server 50).

Also, in the transmission-side system 5 on the transmission side, an application URL generated by the application server 30 is incorporated into SLT metadata or SLS signaling (metadata in USD, S-TSID, MPD, or the like, for example) generated by (the signaling generation unit 211 of) the signaling server 20.

In the transmission-side system 5 on the transmission side, signaling generated by the signaling server 20 is transmitted to the client device 60 on the reception side via the transmission channel 80 (or the Internet 90) by the broadcast server 40 (or the communication server 50).

On the other hand, as shown on the right side in FIG. 7, the signaling transmitted from the transmission-side system 5 on the transmission side is received and processed in the client device 60 on the reception side. In this signaling, an application URL is included in SLT metadata or SLS signaling (metadata in USD, S-TSID, MPD, or the like, for example).

The client device 60 on the reception side receives the application transmitted from the broadcast server 40 (or the communication server 50), in accordance with the application URL included in the SLT metadata or the SLS signaling.

The client device 60 on the reception side then instantly starts the received application.

Here, the started application explicitly displays some information in some case, or the application is activated while the background is transparent in some other case (where nothing is displayed, and the user is not made to recognize the start of the application).

Furthermore, as for the timing to stop the active application, for example, the application can be stopped when the current service is switched to another one, with the trigger being a user operation (such as a service switching operation with a remote controller) or control performed on a native application (an embedded application) in the client device 60.

However, even in a case where the service is switched to another one, if the same application URL is included in the SLS metadata or the SLS signaling of the other service, the active application remains in operation without a stop. In this case, the active application is notified of the service ID or the major channel number of the service at the switch destination, so that the active application can detect that service switching has occurred.

It should be noted that one or more application URLs can be described as a list in signaling. In a case where application URLs are described as a list, activation priority control, activation selection control, and the like are performed on the applications corresponding to those application URLs, in accordance with the operating environment and the like of the client device 60, for example.

As described above, in the application control based on application URLs in the first embodiment, an application is acquired in accordance with the application URL included in SLT metadata or SLS signaling (metadata in USD, S-TSID, MPD, or the like, for example), and is instantly started. Thus, a control model of an application can be implemented in a simpler manner than in a case where application control information such as AST or AIT is used in performing application delivery lifecycle control.

Figure 8:
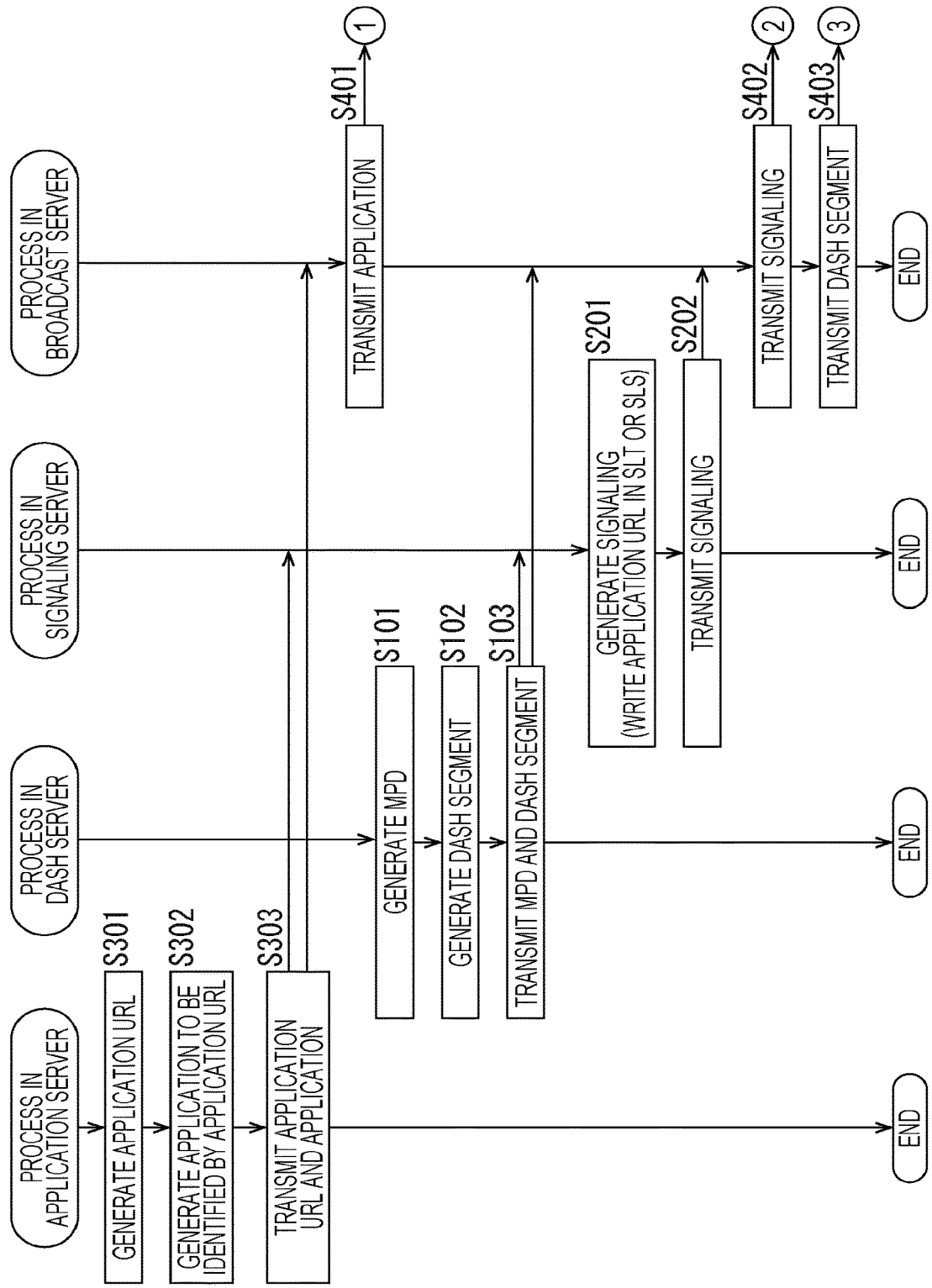
FIG. 8 is a flowchart for explaining the flow of processing on the transmission side in a case where application control in accordance with application URLs is performed.
Figure 9:
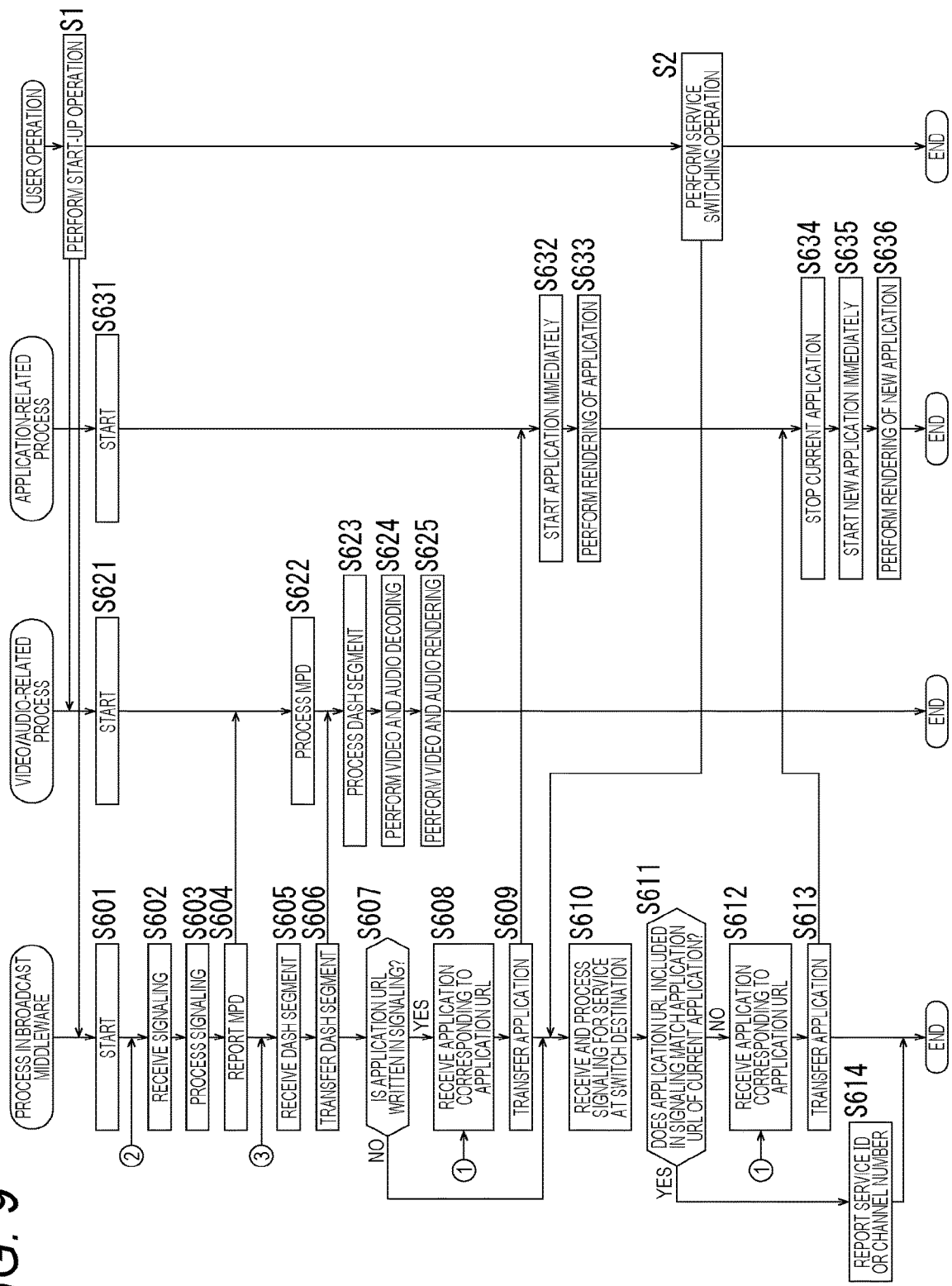
FIG. 9 is a flowchart for explaining the flow of processing on the reception side in a case where application control in accordance with application URLs is performed.

The following is a description of the flow of processing to be performed in the respective devices of the transmission system 1 (FIG. 1) in a case where application control depending on application URLs is performed, with reference to the flowcharts shown in FIGS. 8 and 9.

(Flow of Processing on the Transmission Side)

Referring first to the flowchart in FIG. 8, the flow of processing on the transmission side in a case where application control depending on application URLs is performed is described.

The processes in steps S101 through S103 in FIG. 8 are performed by the DASH server 10. In step S101, the MPD generation unit 111 generates MPD metadata.

Furthermore, in step S102, the DASH segment generation unit 112 processes (the data of) content such as a program, to generate a DASH segment whose reproduction is to be managed with the MPD metadata generated through the process in step S101.

In step S103, the transmission unit 103 transmits the MPD metadata generated through the process in step S101 to the signaling server 20, and transmits the DASH segment generated through the process in step S102 to the broadcast server 40.

The processes in steps S301 through S303 in FIG. 8 are performed by the application server 30. In step S301, the application URL generation unit 311 generates an application URL. In step S302, the application generation unit 312 generates the application to be identified by the application URL generated through the process in step S301.

In step S303, the transmission unit 303 transmits the application URL generated through the process in step S301 to the signaling server 20, and transmits the application generated through the process in step S302 to the broadcast server 40.

The processes in steps S201 and S202 in FIG. 8 are performed by the signaling server 20. Also, in the signaling server 20, the MPD metadata transmitted through the process in step S103 and the application URL transmitted through the process in step S303 are received.

In step S201, the signaling generation unit 211 generates signaling. Here, LLS signaling containing SLT metadata, and SLS signaling containing USD metadata, S-TSID metadata, and MPD metadata are generated as the signaling. The application URL generated by the application server 30 is also described in the SLT metadata or the SLS signaling (metadata in USD, S-TSID, MPD, or the like, for example).

In step S202, the transmission unit 203 transmits the signaling generated through the process in step S201 to the broadcast server 40.

The processes in steps S401 through S403 in FIG. 8 are performed by the broadcast server 40. Also, in the broadcast server 40, the DASH segment transmitted through the process in step S103, the signaling transmitted through the process in step S202, and the application transmitted through the process in step S303 are received.

The transmission unit 403 transmits (simultaneously broadcasts) the application generated by the application server 30, the signaling generated by the signaling server 20, and the DASH segment generated by the DASH server 10 via the transmission channel 80 (S401 through S403).

The flow of processing on the transmission side has been described so far.

Note that, although, in the transmission-side processing shown in FIG. 8, an application, signaling, and a DASH segment are delivered by the broadcast server 40 via broadcasting, it is also possible that all or part of the data of an application, signaling, and a DASH segment may be delivered by the communication server 50 via communication. It should be noted that the description below also mainly concerns a case where the data of an application, signaling, a DASH segment, and the like is delivered by the broadcast server 40 via broadcasting.

(Flow of Processing on the Reception Side)

Referring now to the flowchart in FIG. 9, the flow of processing on the reception side in a case where application control depending on application URLs is performed is described.

The processing shown in FIG. 9 is performed by the client device 60. It should be noted that FIG. 9 shows not only the flow of the processing to be performed by the broadcast middleware 604, but also the flow in a video/audio-related process to be performed by the DASH client 605, the decoder 606, the rendering engine 612, and the like, and the flow in an application-related process to be performed by the application control unit 611, the rendering engine 612, and the like.

However, the video/audio-related process indicates a process related to the video and audio data of content, and the application-related process indicates a process related to the data of an application.

In the client device 60, in a case where a starting operation is performed by a user who is to view content (S1), respective components such as the processing unit 601, the broadcast middleware 604, the DASH client 605, and the decoder 606 are started (S601, S621, S631).

In step S602, the broadcast middleware 604 receives signaling transmitted from the broadcast server 40 via the reception unit 603. In step S603, the broadcast middleware 604 processes the signaling received through the process in step S602.

Here, LLS signaling containing SLT metadata, and SLS signaling containing USD metadata, S-TSID metadata, and MPD metadata are processed as the signaling. Furthermore, in a case where there is an application accompanying the content, the application URL is described in the SLT metadata or the SLS signaling (metadata in USD, S-TSID, MPD, or the like, for example).

In step S604, the broadcast middleware 604 notifies the DASH client 605 of the MPD metadata acquired through the process in step S603. In step S622, the DASH client 605 processes the MPD metadata reported through the process in step S604.

In step S605, the broadcast middleware 604 receives the DASH segment transmitted from the broadcast server 40 via the reception unit 603. In step S606, the broadcast middleware 604 transfers the DASH segment received through the process in step S605 to the DASH client 605.

In step S623, the DASH client 605 processes the DASH segment transferred through the process in step S606, in accordance with a result of the processing of the MPD metadata in step S622. Further, in step S624, the decoder 606 decodes the video and audio data obtained through the process in step S623.

In step S625, the rendering engine 612 renders the video and audio data obtained through the process in step S624. As a result, the video of the content such as a program is displayed on the client device 60, and the sound thereof is output via the output unit 607.

In the client device 60, the processes in steps S622 though S625 are performed by the DASH client 605, the decoder 606, and the rendering engine 612 in the above manner, so that content such as a selected program is reproduced.

Further, in step S607, the broadcast middleware 604 determines whether an application URL is described in signaling such as the SLT metadata or the SLS signaling (metadata in USD, S-TSID, MPD, or the like, for example), in accordance with a result of the processing of the signaling in step S603.

If it is determined in step S607 that an application URL is described in the signaling, the process moves on to step S608. In step S608, under the control of the application control unit 611, the broadcast middleware 604 receives the application transmitted from the broadcast server 40 via the reception unit 603 in accordance with the application URL described in the signaling.

In step S609, the broadcast middleware 604 transfers the application received through the process in step S608 to the application control unit 611.

In step S632, the application control unit 611 instantly starts the application transferred through the process in step S609. Further, in step S633, the rendering engine 612 renders the data of the application started through the process in step S632. As a result, the video of the application accompanying the content such as a program is displayed on the client device 60.

In the client device 60, the processes in steps S632 and 633 are performed by the application control unit 611 and the rendering engine 612 in the above manner, so that the application is started. The application may of course be displayed on the screen together with the video of the content such as a program, but may be executed in the background without display.

It should be noted that, if it is determined in step S607 that any application URL is not described in the signaling, the processes in steps S608 and S609 are skipped. That is, in this case, the application accompanying the content is not started.

After that, in a case where a service switching operation is performed by the user viewing the content on the client device 60 (S2), for example, the broadcast middleware 604 receives and processes signaling of the service at the switch destination transmitted from the broadcast server 40 via the reception unit 603 (S610).

Note that, although detailed explanation is not repeated herein, in a case where a service switching operation is performed, processes similar to the above described processes in steps S604 though S606 and the processes in steps S622 though S625 are performed, so that the content of the program at the switch destination is reproduced.

Further, in step S611, in a case where an application URL is described in signaling such as the SLT metadata in accordance with a result of the processing of the signaling in step S610, the broadcast middleware 604 determines whether the application URL is the same as the application URL of the currently active application.

If it is determined in step S611 that the application URL described in the signaling is different from the application URL of the active application, the process moves on to step S612. In step S612, under the control of the application control unit 611, the broadcast middleware 604 receives the application transmitted from the broadcast server 40 via the reception unit 603 in accordance with the application URL described in the signaling.

In step S613, the broadcast middleware 604 transfers the application received through the process in step S612 to the application control unit 611.

In step S634, the application control unit 611 stops (terminates) the application started through the process in step S632.

In step S635, the application control unit 611 instantly starts the new application transferred through the process in step S613. Further, in step S636, the rendering engine 612 renders the data of the new application started through the process in step S635. As a result, instead of a video of the application started through the process in step S632, a video of the new application started through the process in step S635 is displayed on the client device 60.

If it is determined in step S611 that the application URL described in the signaling is the same as the application URL of the currently active application, the process moves on to step S614.

In step S614, the broadcast middleware 604 notifies the application control unit 611 of the service ID or the channel number (the major channel number) of the service at the switch destination. As a result, the application control unit 611 causes the application started through the process in step S632 to recognize the service ID or the channel number of the service at the switch destination, so that the application can sense that service switching has occurred.

It should be noted that, if it is determined in step S611 that any application URL is not described in the signaling, the processes in steps S612 though S614 are skipped.

The flow of processing on the reception side has been described above.

(3) Application Control in Accordance with Application Control Events

Meanwhile, an application may actively switch services in accordance with an interaction with the user or some other event. In such a case, the application calls an application programming interface (API) for switching services, for example. Furthermore, to explicitly stop an application in a case where contents of a service is being reproduced in the client device 60, a DASH event specified in MPEG-DASH is used, so that the current application can be stopped by a control command that can be interpreted by the application.

Here, MPEG-DASH defines an event notification mechanism called a DASH event, and specifies two kinds of event transfer methods. Specifically, the first transfer method is an MPD event, and the second transfer method is an in-band event (in-band event signaling). In the first embodiment, operations of applications are controlled with MPD events and in-band events.

It should be noted that the control command in the case of using a DASH event should be a control command that can be interpreted by the current application, and therefore, there is no need to standardize and specify the format thereof and the contents of the command such as meaning. Because of this, in the first embodiment, schemIdUri="urn:atsc:applicationPrivateEvent" is defined as a SchemIdUri, which defines the type of a new event. In this manner, a DASH event for carrying a protocol primitive both the transmission-side system 5 and the client device 60 can understand are introduced.

Hereinafter, a method of controlling operation of an application using an MPD event will be referred to as the MPD event method, and a method of controlling operation of an application using an in-band event (in-band event signaling) will be referred to as the in-band event method. In the following, these methods will be explained in detail in this order.

(A) MPD Event Method

According to the MPD event method, an EventStream element is added for each period in MPD metadata, and information about the event is described therein. Specifically, in the MPD metadata, an event firing schedule for each period and event data to be processed by the client device 60 at the timing of firing of each event are described. With this arrangement, the MPD metadata is analyzed so that processing using the event data is performed at the timing of firing of a predetermined event in the client device 60.

(Example Description in MPD)

FIG. 10 is a diagram showing an example description of MPD metadata according to the MPD event method.

It should be noted that, in MPD metadata in the XML format, a Period element, an AdaptationSet element, and a Representation element are described in a hierarchical structure. A Period element is a unit that describes the configuration of a service such as content. Furthermore, an AdaptationSet element and a Representation element are used in each stream of service components such as a video, an audio, and subtitles, and the attribute of each stream can be described.

In FIG. 10, the availabilityStartTime attribute of an MPD element as the root element indicates the UTC time of the start of the first Period element. Further, the startTime attribute of the Period element indicates the offset time from the availabilityStartTime attribute of the MPD element.

Here, in addition to the AdaptationSet element and the Representation element in which information about the respective streams of service components such as a video and an audio are described, an EventStream element is added to the Period element. That is, the event specified by this EventStream element is associated with the stream of the service components specified by the AdaptationSet element.

With this EventStream element, it is possible to describe the event firing schedule for each Period element and the event-related data that should be processed by the client device 60 at the timing of each event firing (or should be passed on to the application started (operating) in the client device 60).

In the example description of MPD metadata shown in FIG. 10, the type of the event can be defined by the schemeIdUri attribute in the EventStream element, and the event-related data can be described in the content part of an Event element of the EventStream element. That is, the format of the event-related data (indicating what should be stored) stored in the content part of this Event element is defined (specified) by the value of the schemeIdUri attribute ("urn:xxx" in this example).

Note that, although "1000" is designated as the timescale attribute of the EventStream element, which means that the unit time of the value of the presentationTime attribute of the Event element is 1/1000 seconds.

Further, in the EventStream element in FIG. 10, event-related data −1 is described in the content part of the first Event element, for example, so that the event-related data −1 can be passed on to the currently active application at an event that lasts for a unit time of "1000" designated by the duration attribute from the firing time "0" designated by the presentationTime attribute.

Also, event-related data −2 is described in the content part of the second Event element, for example, so that the event-related data −2 can be passed on to the currently active application at an event that lasts for a unit time of "4000" designated by the duration attribute from the firing time "1000" designated by the presentationTime attribute.

Here, "urn:atsc:applicationPrivateEvent" is defined as the value of the schemeIdUri attribute of the EventStream element, for example, so that the proprietary protocol both the transmission-side system 5 and the client device 60 shown in FIG. 1 can understand can be processed. The processing of such a proprietary protocol is a process such as changing the displayed contents of the application being executed by the client device 60 and stopping the execution of the application, for example.

It should be noted that the MPD event method can be used only in cases where the contents of the Period element described in the MPD metadata can be determined in the transmission-side system 5 prior to sending of the MPD metadata.

The following is a description of the flow of processing to be performed in the respective devices of the transmission system 1 (FIG. 1) in a case where application control depending on events according to the MPD event method is performed, with reference to the flowcharts shown in FIGS. 11 and 12. However, this application control depending on events according to the MPD event method is performed on the assumption that an application has already been started in the client device 60 through the above described processes shown in FIGS. 8 and 9.

(Flow of Processing on the Transmission Side)

Referring first to the flowchart in FIG. 11, the flow of processing on the transmission side in a case where application control depending on events according to the MPD event method is performed is described.

The processes in steps S311 and S312 in FIG. 11 are performed by the application server 30. In step S311, the application control event generation unit 313 generates an application control event. In step S312, the transmission unit 303 transmits the application control event generated through the process in step S311 to the DASH server 10.

The processes in steps S111 though S113 in FIG. 11 are performed by the DASH server 10. Also, in the DASH server 10, the application control event transmitted through the process in step S312 is received.

In step S111, when generating MPD metadata, the MPD generation unit 111 stores the application control event, which has been generated by the application server 30, as an MPD event into the MPD metadata.

Specifically, in the MPD metadata, an EventStream element is described in a Period element, and the application control event generated by the application server 30 is described as the event-related data. It should be noted, at this stage, "urn:atsc:applicationPrivateEvent" is specified in the schemeIdUri attribute of the EventStream element.

In step S112, the DASH segment generation unit 112 processes content such as a program, to generate a DASH segment whose reproduction is to be managed with the MPD metadata generated through the process in step S111.

In step S113, the transmission unit 103 transmits the MPD metadata generated through the process in step S111 to the signaling server 20, and transmits the DASH segment generated through the process in step S112 to the broadcast server 40.

The processes in steps S211 and S212 in FIG. 11 are performed by the signaling server 20. Also, in the signaling server 20, the MPD metadata transmitted through the process in step S113 is received.

In step S211, the signaling generation unit 211 generates signaling. Here, LLS signaling containing SLT metadata, and SLS signaling containing USD metadata, S-TSID metadata, and MPD metadata are generated as the signaling. However, the MPD metadata includes an MPD event (an application control event).

In step S212, the transmission unit 203 transmits the signaling generated through the process in step S211 to the broadcast server 40.

The processes in steps S411 and S412 in FIG. 11 are performed by the broadcast server 40. Also, in the broadcast server 40, the DASH segment transmitted through the process in step S113 and the signaling transmitted through the process in step S212 are received.

The transmission unit 403 transmits (simultaneously broadcasts) the signaling generated by the signaling server 20 and the DASH segment generated by the DASH server 10 via the transmission channel 80 (S411 and S412).

The flow of processing on the transmission side has been described so far.

Note that, although, in the above described processing on the transmission side shown in FIG. 11, an application control event is generated by the application server 30, a dedicated event server for generating application control events may be provided. Also, signaling or a DASH segment may be delivered by the communication server 50 via the communication.

(Flow of Processing on the Reception Side)

Referring now to the flowchart in FIG. 12, the flow of processing on the reception side in a case where application control depending on events according to the MPD event method is performed is described.

In steps S641 though S643, the signaling from the broadcast server 40 is received and processed by the broadcast middleware 604, and the DASH client 605 is notified of the MPD metadata, as in steps S602 through S604 in FIG. 9.

In step S651, the DASH client 605 processes the MPD metadata reported through the process in step S643. In step S652, the DASH client 605 also extracts the application control event stored as an MPD event from the MPD metadata, in accordance with a result of the processing of the MPD metadata in step S651.

Specifically, in the MPD metadata, an EventStream element is described in a Period element, and an application control event is described as the event-related data. Therefore, the application control event is extracted therefrom. It should be noted, at this stage, "urn:atsc:applicationPrivateEvent" is specified in the schemeIdUri attribute of the EventStream element.

In step S653, the DASH client 605 notifies the application control unit 611 of the application control event extracted through the process in step S652.

In step S661, the application control unit 611 receives the application control event reported through the process in step S653. In step S662, the application control unit 611 processes the proprietary protocol in accordance with the application control event acquired through the process in step S661. Here, the processing of the proprietary protocol is a process both the transmission-side system 5 and the client device 60 can understand, a process such as changing the displayed contents of the active application and stopping the execution of the application is performed, for example.

It should be noted that, in steps S644 and S645, the DASH segment is received by the broadcast middleware 604 and is transferred to the DASH client 605, as in steps S605 and S5606 in FIG. 9. Further, in steps S654 though S656, the DASH client 605, the decoder 606, and the rendering engine 612 perform processing related to the video and audio data of the content, so that the video of the content such as a program is displayed, and the sound thereof is output, as in steps S623 through S625 of FIG. 9

The flow of processing on the reception side has been described above.

Note that, as the processing on the reception side shown in FIG. 12 is performed in the client device 60, it is possible to stop (terminate) the active application in accordance with an application control event through the process in step S662. However, once the application is stopped, any application is not started until a different application URL from the application URL of the stopped application is designated in the SLS signaling of the same service (or in the entry of the service in the SLT metadata). Through such simplification of a control model, application lifecycle control can be simplified. Thus, installation and testing of the client device 60 can be facilitated, and introduction costs can be lowered, for example.

(B) In-Band Event Method

According to the in-band event method, an MP4 box called a DASHEventMessageBox having a box_type "emsg" as the brand name of MP4 is inserted into a DASH segment, so that an application control event is transmitted in a segment stream. It should be noted that, in the description below, a DASHEventMessageBox having the box_type "emsg" among DASHEventMessageBoxes is also referred to as an emsg box.

(Example Disposition of a DASHEventMessageBox)

FIG. 13 is a diagram showing an example disposition of a DASHEventMessageBox of the in-band event method.

In the example shown in FIG. 13, "emsg" is placed in the field of box_type. Meanwhile, the type of event is defined in the field of scheme_id_uri, and the event-related data is placed in the field of message_data.

Here, "urn:atsc:applicationPrivateEvent" is defined in the field of scheme_id_uri, so that the proprietary protocol both the transmission-side system 5 and the client device 60 shown in FIG. 1 can understand can be processed.

Further, in A of FIG. 13, event-related data −1 is placed in the field of message_data, so that the event-related data −1 can be passed on to the currently active application at an event that lasts for a unit time of "0xFFFF", which is placed in the field of event duration, after the firing time "0" (0×1/1000 seconds after the earliest DASH segment presentation time) placed in the field of presentation time delta.

Meanwhile, in B of FIG. 13, event-related data −2 is placed in the field of message_data, so that the event-related data −2 can be passed on to the currently active application at an event that lasts for a unit time of "0xFFFF", which is placed in the field of event duration, after the firing time "500" (500×1/1000 seconds after the earliest DASH segment presentation time) placed in the field of presentation time delta.

In this manner, "urn:atsc:applicationPrivateEvent" is defined in the field of scheme_id_uri, and the event-related data −1 or the event-related data −2 is placed in the field of message_data. Thus, it becomes possible to change the displayed contents of the application being executed in the client device 60, or stop the application, for example.

Figure 14:
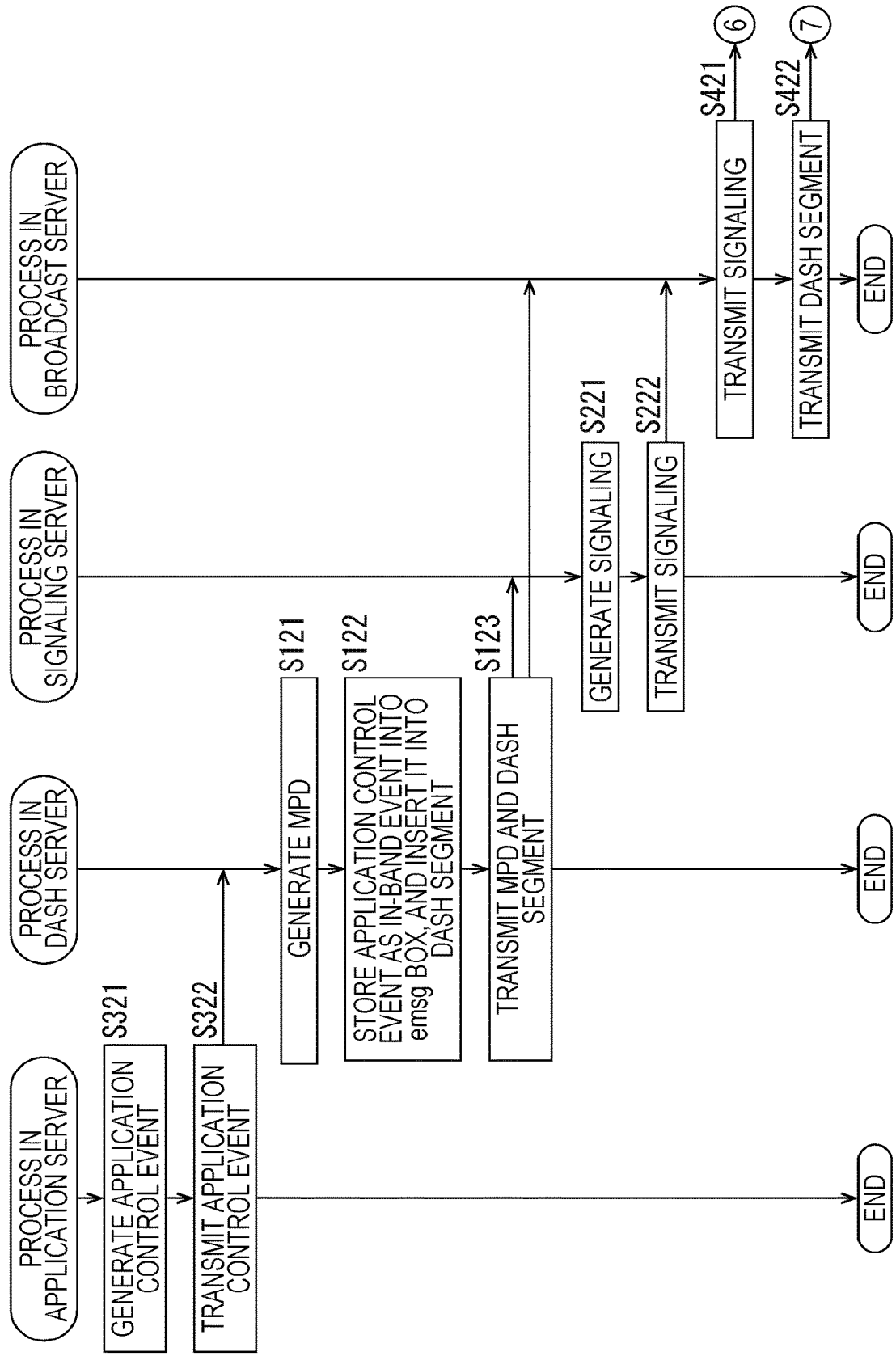
FIG. 14 is a flowchart for explaining the flow of processing on the transmission side in a case where application control depending on events according to the in-band event method is performed.
Figure 15:
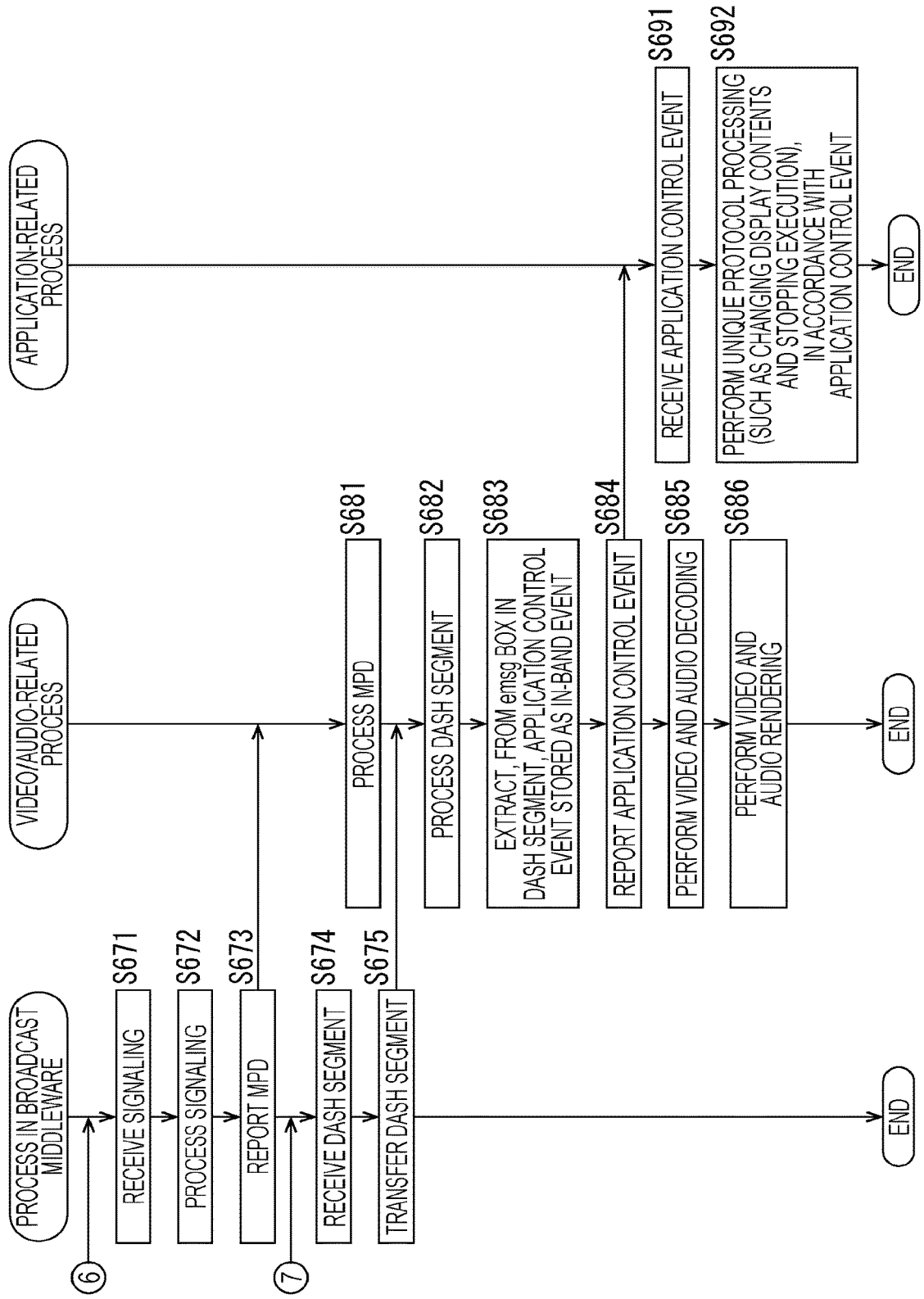
FIG. 15 is a flowchart for explaining the flow of processing on the reception side in a case where application control depending on events according to the in-band event method is performed.

The following is a description of the flow of processing to be performed in the respective devices of the transmission system 1 (FIG. 1) in a case where application control depending on events according to the in-band event method is performed, with reference to the flowcharts in FIGS. 14 and 15.

(Flow of Processing on the Transmission Side)

Referring first to the flowchart in FIG. 14, the flow of processing on the transmission side in a case where application control depending on events according to the in-band event method is performed is described.

In steps S321 and S322 in FIG. 14, the application control event generation unit 313 of the application server 30 generates an application control event, and transmits the application control event to the DASH server 10, as in steps S311 and S312 in FIG. 11.

Steps S121 though S123 in FIG. 14 are performed by the DASH server 10. Also, in the DASH server 10, the application control event transmitted through the process in step S322 is received. In step S121, the MPD generation unit 111 generates MPD metadata.

In step S122, when generating a DASH segment, the DASH segment generation unit 112 stores the application control event as an in-band event into the emsg box (DASHEventMessageBox), and inserts the application control event into (the box structure of) the DASH segment.

Specifically, in the emsg box (DASHEventMessageBox), "urn:atsc:applicationPrivateEvent" is defined in the field of scheme_id_uri, and the application control event generated by the application server 30 is placed as event-related data in the field of message_data.

In step S123, the transmission unit 103 transmits the MPD metadata generated through the process in step S121 to the signaling server 20, and transmits the DASH segment generated through the process in step S122 to the broadcast server 40.

In steps S221 and S222 in FIG. 14, LLS signaling and SLS signaling are generated by the signaling generation unit 211 of the signaling server 20, and are transmitted to the broadcast server 40, as in steps S211 and S212 in FIG. 11.

In steps S421 and S422 in FIG. 14, the transmission unit 403 of the broadcast server 40 transmits the signaling generated by the signaling server 20 and the DASH segment generated by the DASH server 10 via the transmission channel 80, as in steps S411 and S412 in FIG. 11.

The flow of processing on the transmission side has been described so far.

Note that, although, in the above described processing on the transmission side shown in FIG. 14, an application control event is generated by the application server 30, as in the processing on the transmission side shown in FIG. 11, a dedicated event server for generating application control events may be provided. Also, signaling or a DASH segment may be delivered by the communication server 50 via the communication.

(Flow of Processing on the Reception Side)

Referring now to the flowchart in FIG. 15, the flow of processing on the reception side in a case where application control depending on events according to the in-band event method is performed is described.

In steps S671 though S673, the signaling from the broadcast server 40 is received and processed by the broadcast middleware 604, and the DASH client 605 is notified of the MPD metadata, as in steps S641 through S643 in FIG. 12.

In step S681, the DASH client 605 processes the MPD metadata reported through the process in step S673.

In steps S674 and S675, the DASH segment from the broadcast server 40 is received by the broadcast middleware 604, and is transferred to the DASH client 605, as in steps S644 and S645 in FIG. 12.

In step S682, the DASH client 605 processes the DASH segment transferred through the process in step S675, in accordance with a result of the processing of the MPD metadata in step S681. In step S683, the DASH client 605 also extracts the application control event stored as an in-band event from the emsg box (DASHEventMessageBox) inserted in (the box structure of) the DASH segment, in accordance with a result of the processing in step S682.

Specifically, in the emsg box (DASHEventMessageBox), "urn:atsc:applicationPrivateEvent" is defined in the field of scheme_id_uri, and the application control event is placed as event-related data in the field of message_data. Therefore, the application control event is extracted therefrom.

In step S684, the DASH client 605 notifies the application control unit 611 of the application control event extracted through the process in step S683.

In steps S691 and S692, the application control unit 611 processes the proprietary protocol corresponding to the application control event, as in steps S661 and S662 in FIG. 12. Here, the processing of the proprietary protocol is a process both the transmission-side system 5 and the client device 60 can understand, a process such as changing the displayed contents of the active application and stopping the execution of the application is performed, for example.

It should be noted that, in steps S685 and S686, the decoder 606 and the rendering engine 612 perform processing relating to the video and audio data of the content, so that the video of the content such as a program is displayed, and its sound is output, as in steps S655 and S656 in FIG. 12.

The flow of processing on the reception side has been described above.

Note that, as the processing on the reception side shown in FIG. 15 is performed in the client device 60, it is possible to stop (terminate) the active application in accordance with an application control event through the process in step S692. However, once the application is stopped, any application is not started until a different application URL from the application URL of the stopped application is designated in the SLS signaling of the same service (or in the entry of the service in the SLT metadata). Through such simplification of a control model, application lifecycle control can be simplified. Thus, installation and testing of the client device 60 can be facilitated, and introduction costs can be lowered, for example.

2. Second Embodiment: Secure Provision of Applications

Meanwhile, there is a problem with an application accompanying content such as a program or a commercial, because such an application can be replaced with a malicious application unintended by the provider (such as a broadcasting station) of the content such as a program, through an fraudulent act such as so-called broadcast hijacking. A method of constructing a full-fledged application authentication platform using Public Key Infrastructure (PKI) or the like might be considered as a solution to this kind of problem, but constructing a full-fledged platform only for application authentication is not realistic from a cost perspective.

Meanwhile, it is assumed that content such as a program accompanied by an application is protected from illegitimate use by digital rights management (DRM). In view of this, the present technology enables secure provision of an application accompanying convent, taking advantage of this content protection mechanism of DRM.

In the description below, secure provision of an application using the content protection mechanism of DRM will be described as a second embodiment. It should be understood that, in the second embodiment, lifecycle control on securely provided applications is simplified, as in the first embodiment described above.

Further, in the second embodiment, an application digest (the later described application digest (app_digest_message) shown in FIG. 22) including a digest value (a hash value) obtained through certain calculation procedures (algorithm) from an application with the use of the content protection mechanism of DRM is stored by the following two methods.

Specifically, according to a first method, an application digest is inserted as a watermark into video coded data as a VCL-NAL (Video Coding Layer-Network Abstraction Layer) unit, and is then transmitted as a sample in mdat of fragmented mp4 of ISO Base Media File Format (ISOBMFF). In the description below, this first method will be described as the watermark storage method.

According to a second method, on the other hand, an application digest is stored directly into a non-VCL-NAL (Non Video Coding Layer-Network Abstraction Layer) unit, and is then transmitted as a sample in mdat of fragmented mp4 of ISOBMFF. In the description below, this second method will be referred to as the non-VCL-NAL unit storage method.

It should be noted that a Network Abstraction Layer (NAL) is a layer (a network abstraction layer) provided between a Video Coding Layer (VCL) handling a video coding process and a lower-order system that transmits and accumulates coded information (coded strings), in High Efficiency Video Coding (HEVC) or the like, for example. Therefore, a VCL and an NAL are separated structures.

(1) System Configuration (Configuration of a Transmission System)

Figure 16:
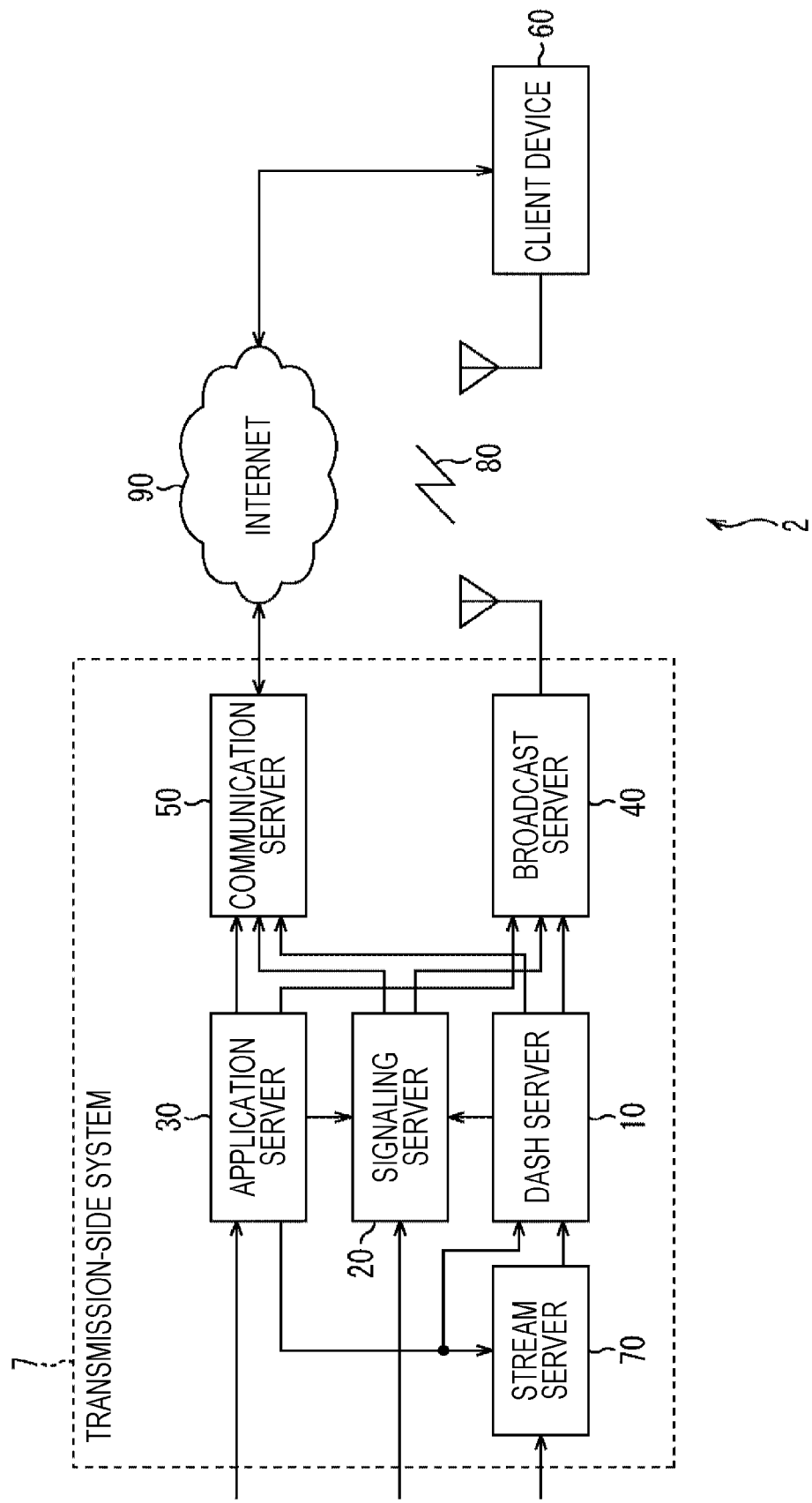
FIG. 16 is a diagram showing an example configuration of a transmission system according to a second embodiment.

FIG. 16 is a diagram showing an example configuration of an embodiment (the second embodiment) of a transmission system to which the present technology is applied.

In FIG. 16, the transmission system 2 is formed with a transmission-side system 7 and a client device 60 on the reception side. It should be noted that, in the transmission system 2 shown in FIG. 16, the components equivalent to those of the transmission system 1 in FIG. 1 are denoted by the same reference numerals as those used in FIG. 1, and explanation of them will not be repeated as appropriate.

In FIG. 16, the transmission-side system 7 differs from the transmission-side system 5 shown in FIG. 1 in that a stream server 70 is newly provided in addition to the components from the DASH server 10 to the communication server 50.

The application server 30 generates an application digest. Note that, as will be described later in detail with reference to FIG. 22 and other drawings, the application digest includes an application URL of an application, and a digest value (a hash value) generated by applying a predetermined algorithm to the application.

In a case where the watermark storage method is adopted, the application server 30 transmits the application digest to the stream server 70. In a case where the non-VCL-NAL unit storage method is adopted, the application server 30 transmits the application digest to the DASH server 10.

The stream server 70 processes (the data of) content such as a program, to generate a stream (a baseband frame sequence). The stream server 70 also encodes the baseband frame of the stream, to generate a VCL-NAL unit.

However, in a case where the watermark storage method is adopted, the stream server 70 stores the application digest generated by the application server 30 into a watermark inserted in the baseband frame of the stream.

The DASH server 10 processes the data of the stream transmitted from the stream server 70, generates a DASH segment, and transmits the DASH segment to the broadcast server 40 or the communication server 50.

However, in a case where the watermark storage method is adopted, the DASH server 10 generates the DASH segment by processing a DRM protected file obtained through encryption of the VCL-NAL unit including the watermark storing the application digest generated by the application server 30.

In a case where the non-VCL-NAL unit storage method is adopted, on the other hand, the DASH server 10 generates the DASH segment by generating a non-VCL-NAL unit storing the application digest generated by the application server 30, and processing a DRM protected file obtained through encryption of the VCL-NAL unit and the non-VCL-NAL unit.

The broadcast server 40 or the communication server 50 delivers the DASH segment generated by the DASH server 10, the signaling generated by the signaling server 20, and the application generated by the application server 30 via the transmission channel 80 or the Internet 90.

Like the client device 60 shown in FIG. 1, the client device 60 reproduces content, and executes the application accompanying the content. However, the client device 60 differs from the client device 60 shown in FIG. 1 in performing an application verification process using an application digest.

Specifically, in a case where the watermark storage method is adopted, the client device 60 extracts the application digest stored in the watermark included in the DRM protected file, and performs an application verification process, using the application digest. In a case where the non-VCL-NAL unit storage method is adopted, on the other hand, the client device 60 extracts the application digest stored in the non-VCL-NAL unit included in the DRM protected file, and performs an application verification process, using the application digest.

It should be noted that the configuration of the transmission system 2 shown in FIG. 16 is an example, and some other configuration may be adopted. For example, application digests may be generated not by the application server 30 but by a dedicated server. Further, a dedicated server may perform processing related to the watermark in a case where the watermark storage method is adopted, for example.

Referring now to FIGS. 17 through 20, the configurations of the stream server 70, the DASH server 10, and the application server 30 of the transmission-side system 7, and the configuration of the client device 60 in the transmission system 2 shown in FIG. 16 are described. It should be noted that the configuration of the signaling server 20 is the same as that shown in FIG. 3, and therefore, explanation thereof will not be repeated. The communication server 50 also has the same configuration as the above described configuration.

(Configuration of the Stream Server)

Figure 17:
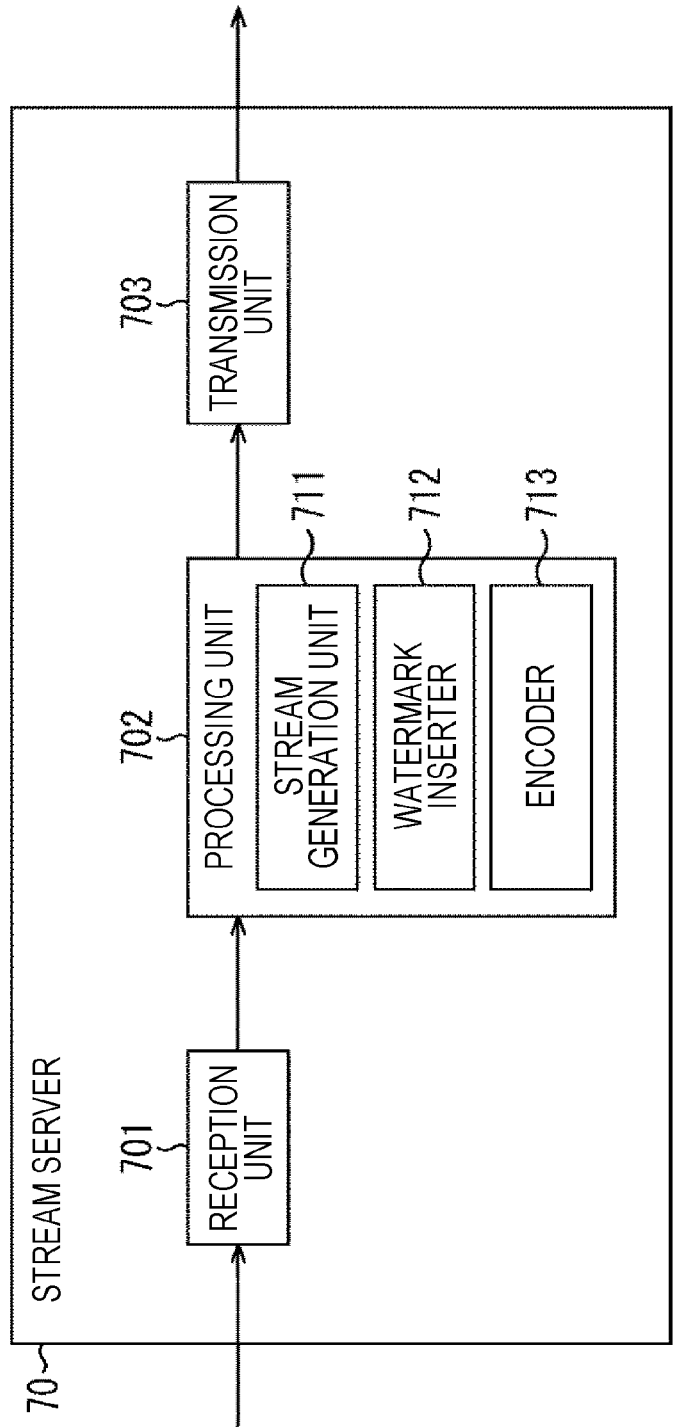
FIG. 17 is a diagram showing an example configuration of a stream server.

FIG. 17 is a diagram showing an example configuration of the stream server 70 shown in FIG. 16.

In FIG. 17, the stream server 70 includes a reception unit 701, a processing unit 702, and a transmission unit 703. Further, the processing unit 702 includes a stream generation unit 711, a watermark inserter 712, and an encoder 713.

The reception unit 701 receives (the data of) content such as a program or a commercial from an external server (not shown) or the like, and supplies the content to the processing unit 702. It should be noted that, in this example, a case where (the data of) content such as a program or a commercial is provided from the outside is described, but (the data of) content such as a program or a commercial may be accumulated by the stream server 70.

Furthermore, in a case where the watermark storage method is adopted, the reception unit 701 receives an application digest transmitted from the application server 30, and supplies the application digest to (the watermark inserter 712 of) the processing unit 702.

The processing unit 702 processes (the data of) the content such as a program supplied from the reception unit 701, and supplies the content to the transmission unit 703. The processing unit 702 also receives supplies from the stream generation unit 711, the watermark inserter 712, and the encoder 713.

The stream generation unit 711 generates a video stream (a baseband frame sequence) by processing (the data of) the content such as a program supplied from the reception unit 701. Note that, although not specifically described herein, the stream generation unit 711 also generates an audio stream by processing (the data of) the content.

In a case where the watermark storage method is adopted, the watermark inserter 712 inserts an application digest generated by the application server 30 into a watermark (a watermark payload) inserted in the baseband frame of the stream generated by the stream generation unit 711.

However, the watermark inserter 712 operates only in a case where the watermark storage method is adopted. In a case where the non-VCL-NAL unit storage method is adopted, there is no need to operate (or provide) the watermark inserter 712 in the stream server 70.

The encoder 713 encodes the baseband frame of the video stream generated by the stream generation unit 711 and generates a VCL-NAL unit, in accordance with a predetermined coding method (HEVC or the like, for example). Note that, although not specifically described herein, the encoder 713 also encodes the audio stream generated by the stream generation unit 711, in accordance with a predetermined coding method (AAC or the like, for example).

The transmission unit 703 transmits the stream data including the VCL-NAL unit (and the audio data) supplied from (the encoder 713 of) the processing unit 702, to the DASH server 10.

The stream server 70 is configured as described above.

(Configuration of the DASH Server)

Figure 18:
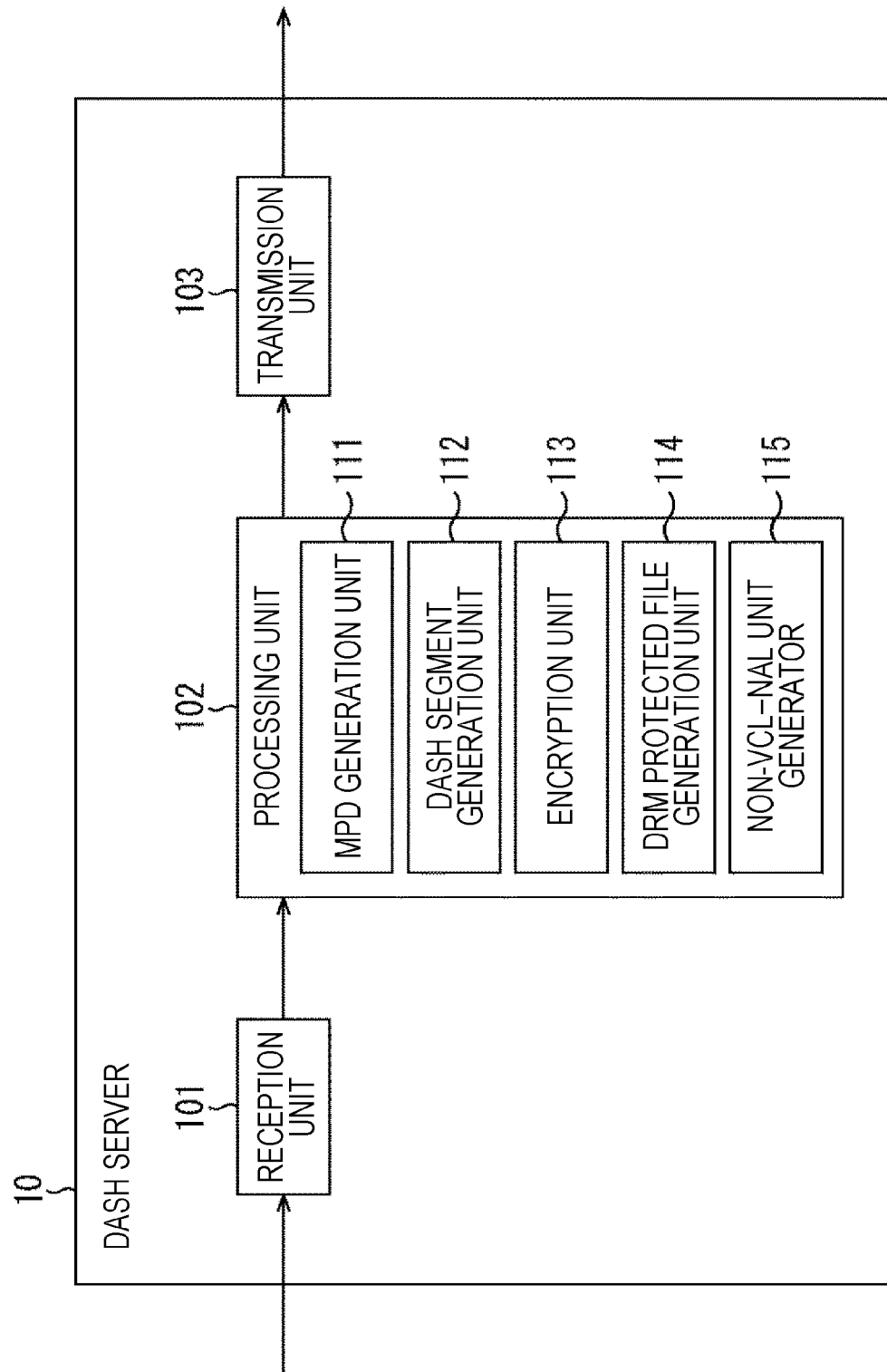
FIG. 18 is a diagram showing an example configuration of a DASH server.

FIG. 18 is a diagram showing an example configuration of the DASH server 10 shown in FIG. 16. Note that, in the DASH server 10 in FIG. 18, the components equivalent to those of the DASH server 10 in FIG. 2 are denoted by the same reference numerals as those used in FIG. 2, and explanation thereof is not made herein.

In FIG. 18, the DASH server 10 includes a reception unit 101, a processing unit 102, and a transmission unit 103. Further, the processing unit 102 includes not only an MPD generation unit 111 and a DASH segment generation unit 112, but also an encryption unit 113, a DRM protected file generation unit 114, and a non-VCL-NAL unit generation unit 115.

The reception unit 101 receives the data of a stream transmitted from the stream server 70, and supplies the stream to the processing unit 102. The processing unit 102 processes the data of the stream supplied from the reception unit 101, generates a DASH segment, and supplies the DASH segment to the transmission unit 103. The transmission unit 103 transmits the DASH segment supplied from the processing unit 102 to the broadcast server 40 or the communication server 50.

More specifically, in a case where the watermark storage method is adopted, a DASH segment is generated in the following manner. That is, the encryption unit 113 encrypts a VCL-NAL unit generated by the stream server 70 according to a predetermined encryption method.

The DRM protected file generation unit 114 then processes the VCL-NAL unit encrypted by the encryption unit 113, to generate a DRM protected file. Here, the DRM protected file is protected according to a DRM scheme such as PlayReady (registered trademark), for example. The DASH segment generation unit 112 then processes the DRM protected file generated by the DRM protected file generation unit 114, to generate a DASH segment.

In a case where the non-VCL-NAL unit storage method is adopted, on the other hand, a DASH segment is generated in the following manner. That is, the non-VCL-NAL unit generation unit 115 generates a non-VCL-NAL unit storing an application digest generated by the application server 30. Further, in accordance with a predetermined encryption method, the encryption unit 113 encrypts a VCL-NAL unit generated by the stream server 70 and the non-VCL-NAL unit generated by the non-VCL-NAL unit generation unit 115.

The DRM protected file generation unit 114 then processes the VCL-NAL unit and the non-VCL-NAL unit encrypted by the encryption unit 113, to generate a DRM protected file. Here, the DRM protected file is protected according to a DRM scheme such as PlayReady (registered trademark), for example. The DASH segment generation unit 112 then processes the DRM protected file generated by the DRM protected file generation unit 114, to generate a DASH segment. However, the non-VCL-NAL unit generation unit 115 operates only in a case where the non-VCL-NAL unit storage method is adopted. In a case where the watermark storage method is adopted, there is no need to operate (or provide) the non-VCL-NAL unit generation unit 115 in the DASH server 10.

The DASH server 10 is configured as described above.

(Configuration of the Application Server)

Figure 19:
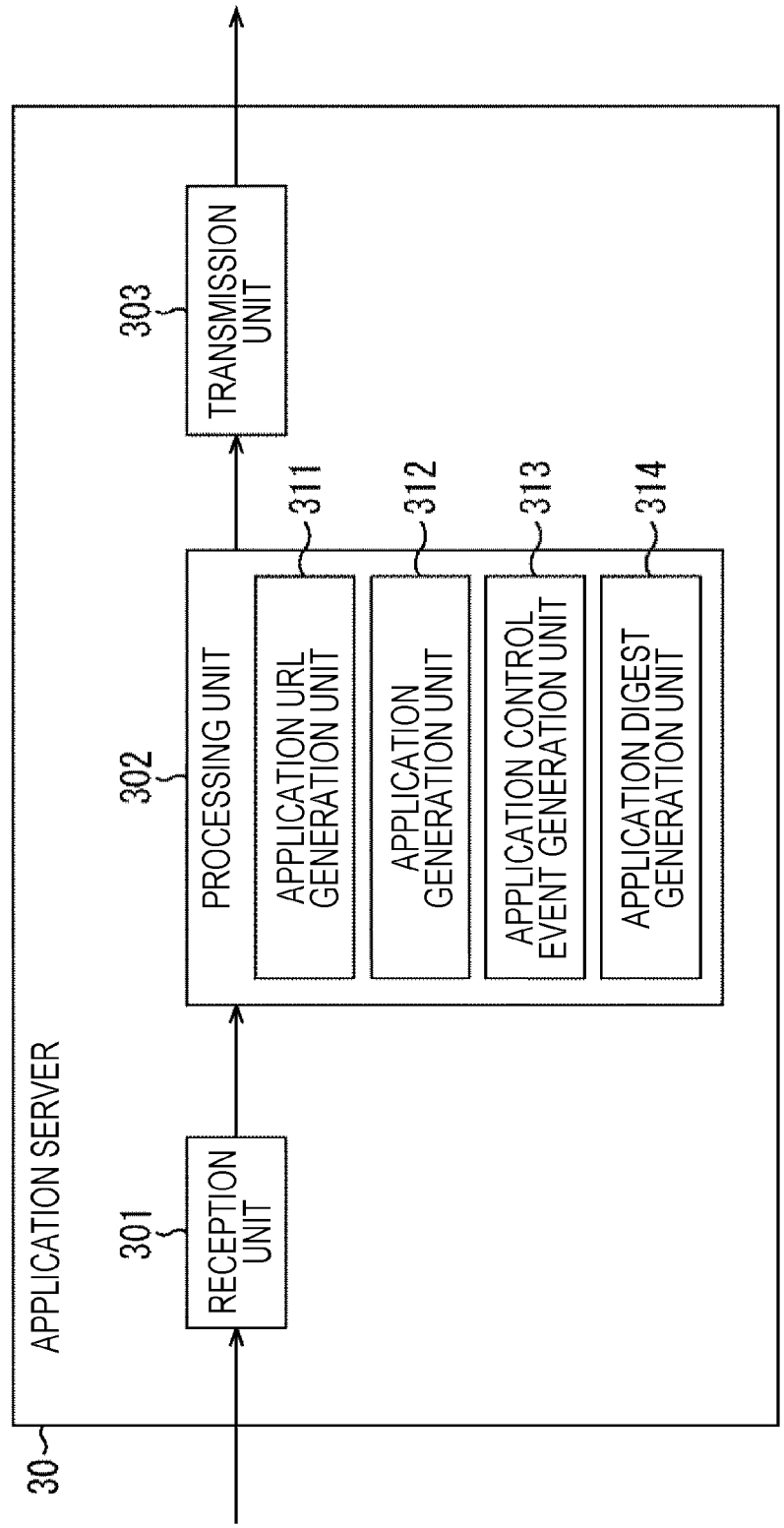
FIG. 19 is a diagram showing an example configuration of an application server.

FIG. 19 is a diagram showing an example configuration of the application server 30 shown in FIG. 16. It should be noted that, in the application server 30 shown in FIG. 19, the components equivalent to those of the application server 30 shown in FIG. 4 are denoted by the same reference numerals as those used in FIG. 4, and explanation thereof is not made herein.

In FIG. 19, the application server 30 includes a reception unit 301, a processing unit 302, and a transmission unit 303. Further, the processing unit 302 includes an application digest generation unit 314 in addition to an application URL generation unit 311, an application generation unit 312, and an application control event generation unit 313.

The application digest generation unit 314 generates an application digest including a digest value (a hash value) obtained through certain calculation procedures (algorithm) from an application generated by the application generation unit 312, and supplies the application digest to the transmission unit 303. Note that, the contents of the application digest will be described later in detail, with reference to FIG. 22 and other drawings.

The transmission unit 303 transmits the application digest supplied from the application digest generation unit 314 to the DASH server 10 or the stream server 70.

It should be noted that, in a case where the watermark storage method is adopted, the application digest is transmitted to the stream server 70. In a case where the non-VCL-NAL unit storage method is adopted, on the other hand, the application digest is transmitted to the DASH server 10.

The application server 30 is configured as described above.

(Configuration of the Client Device)

Figure 20:
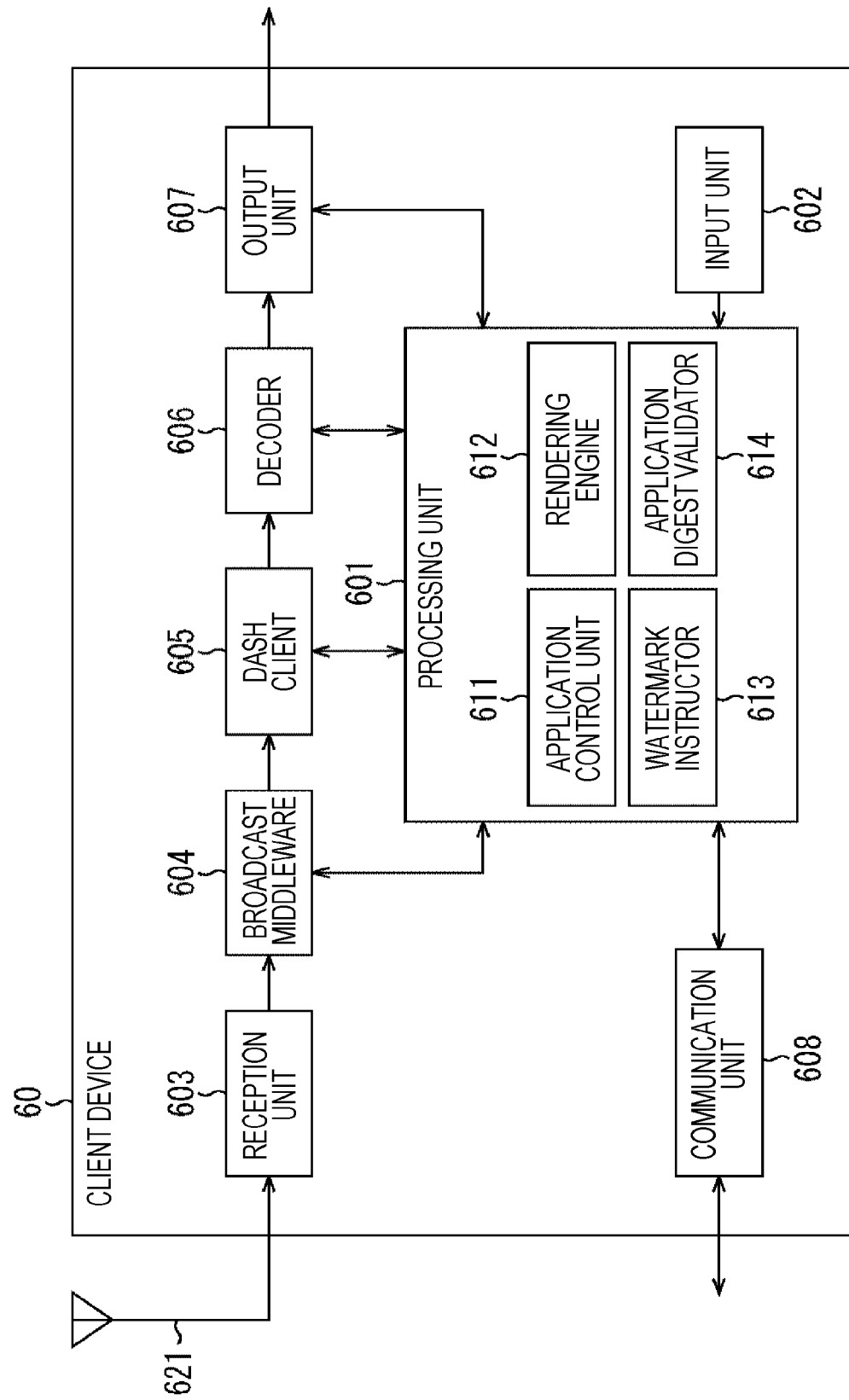
FIG. 20 is a diagram showing an example configuration of a client device.

FIG. 20 is a diagram showing an example configuration of the client device 60 shown in FIG. 16. It should be noted that, in the client device 60 shown in FIG. 20, the components equivalent to those of the client device 60 in FIG. 6 are denoted by the same reference numerals as those used in FIG. 6, and explanation thereof is not made herein.

In FIG. 20, the client device 60 includes a processing unit 601, an input unit 602, a reception unit 603, a broadcast middleware 604, a DASH client 605, a decoder 606, an output unit 607, and a communication unit 608. Further, unlike the processing unit 601 shown in FIG. 6, the processing unit 601 includes a watermark extractor 613 and an application digest validator 614, in addition to an application control unit 611 and a rendering engine 612.

The client device 60 in FIG. 16 differs from the client device 60 shown in FIG. 6 in performing an application verification process using an application digest.

More specifically, in a case where the watermark storage method is adopted, an application verification process using an application digest is performed in the following manner. That is, (the DRM protected file processing unit of) the DASH client 605 performs unpackaging of a DRM protected file obtained by processing a DASH segment. Further, according to a predetermined decryption method, (the decryption unit of) the DASH client 605 decrypts the encrypted VCL-NAL unit obtained through the unpackaging of the DRM protected file.

The decoder 606 then decodes the VCL-NAL unit processed by the DASH client 605, according to a predetermined decoding method (HEVC or the like, for example). At this stage, the watermark extractor 613 extracts the watermark inserted in the baseband frame obtained by decoding the VCL-NAL unit. The application digest validator 614 extracts the application digest stored in the watermark extracted by the watermark extractor 613.

The application digest validator 614 then compares the application digest stored in the watermark with the application digest corresponding to the application from the broadcast middleware 604. If the application digests as the current comparison objects are the same, the application from the broadcast middleware 604 is (instantly) started.

In a case where the non-VCL-NAL unit storage method is adopted, on the other hand, an application verification process using an application digest is performed in the following manner. That is, (the DRM protected file processing unit of) the DASH client 605 performs unpackaging of a DRM protected file obtained by processing a DASH segment. Further, according to a predetermined decryption method, (the decryption unit of) the DASH client 605 decrypts the encrypted non-VCL-NAL unit obtained through the unpackaging of the DRM protected file.

The application digest validator 614 then extracts the application digest stored in the non-VCL-NAL unit decrypted by (the decryption unit of) the DASH client 605.

The application digest validator 614 then compares the application digest stored in the non-VCL-NAL unit with the application digest corresponding to the application from the broadcast middleware 604. If the application digests as the current comparison objects are the same, the application from the broadcast middleware 604 is (instantly) started.

In this manner, an application verification process using an application digest is performed by the watermark storage method or the non-VCL-NAL unit storage method in the client device 60. However, the watermark extractor 613 operates only in a case where the watermark storage method is adopted. In a case where the non-VCL-NAL unit storage method is adopted, there is no need to operate (or provide) the watermark extractor 613 in the client device 60.

The client device 60 is configured as described above.

(2) Overview of an Application Digest

According to the first embodiment described above, in a case where application start control is performed as the lifecycle control on the application that accompanies content, the client device 60 is notified of the application URL of the application, so that the application (the application package) identified by the application URL is acquired and is instantly started in the client device 60.

In this case, the application is acquired via broadcasting or communication. However, it is necessary to protect the application in a case where there is a possibility that a fraudulent act such as replacement or falsification of the application URL or the application will be conducted in the broadcast transmission path.

An example of conceivable protection methods herein is a method of encrypting the session for transmitting SLT metadata or (metadata of) SLS signaling including an application URL and the session for transmitting the application, using an appropriate transport/network security technique (Security Architecture for Internet Protocol (IPSec) or the like, for example).

However, the costs for constructing a system for this kind of encryption and detection of falsification or the like might become a problem, and there is a demand for a mechanism for minimizing costs, and protecting application URLs and applications more easily from the danger of fraudulent acts such as replacement and falsification.

In view of the above, according to the second embodiment, the digest value (the hash value) of an application calculated by a hash function algorithm in the transmission-side system 7 is reported as an application digest to the client device 60 so that a fraudulent act such as replacement or falsification of the application can be detected. Furthermore, using the application digest (the digest value of the application) reported from the transmission-side system 7, the client device 60 verifies whether a fraudulent act such as replacement or falsification has been conducted on the application.

For example, in a case where an application is formed with a plurality of files such as HTML document files, a method defined by an XML signature (XML Signature) can be used as a method of collectively signing the files constituting the application. It should be noted that an XML signature is recommended for specifying XML syntax for digital signature by W3C (World Wide Web Consortium).

Figure 21:
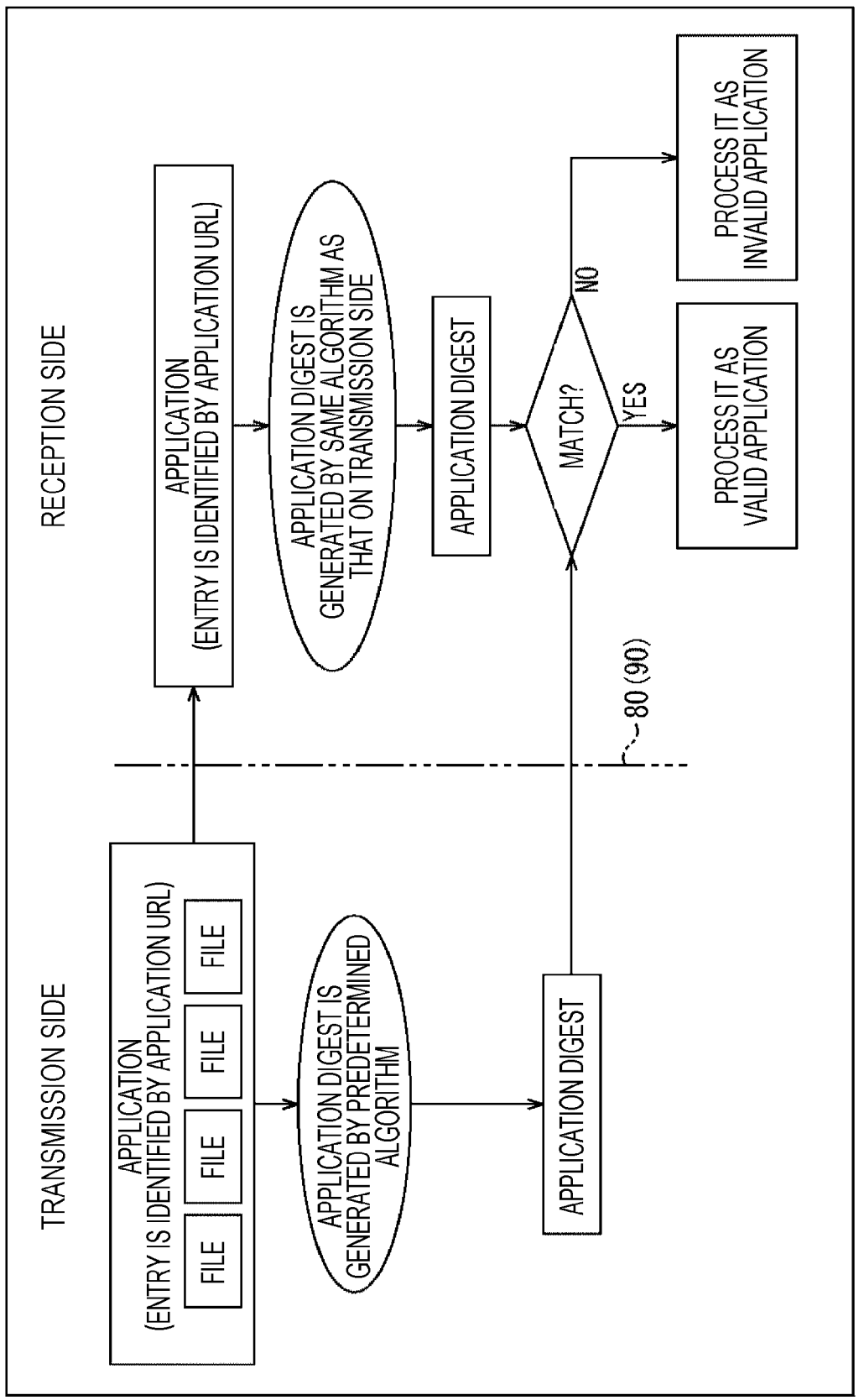
FIG. 21 is a diagram showing an overview of an application digest.

As shown on the left side in FIG. 21, in the transmission-side system 7 on the transmission side, the application digest generation unit 314 of the application server 30 generates an application digest including a digest value (a hash value) generated by applying a predetermined algorithm to an application to be delivered to the client device 60. This application digest can include the application URL of the current application and a digest value obtained by applying a predetermined algorithm, such as Message Digest Algorithm 5 (MD5), SHA-1, or SHA-256, to the application URL, for example.

In the transmission-side system 7 on the transmission side, an application generated by the application server 30 is transmitted to the client device 60 on the reception side via the transmission channel 80 (or the Internet 90) by the broadcast server 40 (or the communication server 50).

Further, in the transmission-side system 7 on the transmission side, an application digest generated by the application server 30 is transmitted to the client device 60 on the reception side via the transmission channel 80 (or the Internet 90) by the broadcast server 40 (or the communication server 50), while being protected by the watermark storage method or the non-VCL-NAL unit storage method.

In the client device 60 on the reception side, on the other hand, the application transmitted from the transmission-side system 7 on the transmission side is received. The client device 60 on the reception side applies the same algorithm as that used by the transmission-side system 7 on the transmission side to the application delivered (received) from the transmission-side system 7 on the transmission side, and generates an application digest (a digest value). Here, a digest value is obtained by applying a predetermined algorithm, such as MD5, SHA-1, or SHA-256, to the application URL of the current application, for example.

Also, in the client device 60 on the reception side, an application digest that is transmitted from the transmission-side system 7 on the transmission side, and is protected by the watermark storage method or the non-VCL-NAL unit storage method is received.

The client device 60 on the reception side then compares the application digest (the digest value) protected by the watermark storage method or the non-VCL-NAL unit storage method with the application digest (the digest value) obtained by the client device 60 using the same algorithm as that used on the transmission side, and determines whether these application digests (digest values) are the same.

In a case where the application digests (digest values) are determined to be the same, the client device 60 on the reception side processes the application delivered from the transmission-side system 7 on the transmission side as a legitimate application, and instantly starts the application, for example. In a case where the application digests (digest values) are determined not to be the same, on the other hand, the client device 60 on the reception side processes the application delivered from the transmission-side system 7 on the transmission side as an illegitimate application, and does not start the application, for example.

Meanwhile, content accompanied by an application may be protected from illegitimate use by digital rights management (DRM). Particularly, ATSC 3.0 requires protection of (streams of) content such as programs, and is highly likely to introduce some type of DRM. In the second embodiment, the DRM for protecting content is used, and an application digest is reported from the transmission-side system 7 to the client device 60, so that a check can be made to verify whether the application is a legitimate application.

As the DRM is used, it is also possible to verify the binding (association) between (a stream of) the current content to be protected and the application accompanying the content.

Here, a method such as PlayReady (registered trademark), Marlin, Widevine, or Verimatrix can be used as the DRM, for example. However, various formats for application binding protection that can be commonly used for any method are preferably specified. Thus, the client device 60 can verify whether the binding is with a legitimate application in a case where any of the methods is adopted as DRM, regardless of the differences among the respective methods.

(Example Syntax of an Application Digest)

FIG. 22 is a diagram showing an example syntax of an application digest (app_digest_message).

The 8-bit uri_strlen indicates the length of the URL (the application URL) for identifying the current application. Uri_string ( ) formed with 8×uri_strlen bits indicates the URL (the application URL) for identifying the current application.

The 8-bit digest_type indicates the type of algorithm of a cryptographic hash function. For example, as shown in FIG. 23, in a case where "0x01" is designated as digest_type, the algorithm is Message Digest Algorithm 5 (MD5). Also, in a case where "0x02" is designated as digest_type, SHA-1 is designated as the algorithm, for example. In a case where "0x03" is designated, SHA-256 is designated as the algorithm, for example. It should be noted that SHA is an abbreviation for Secure Hash Algorithm. Meanwhile, 0x00 and 0x04 through 0xFF are set as reserved values (Reserved) for future expansions.

Referring back to FIG. 22, the 8-bit digest_len indicates the byte length of the digest_value of the current application. The digest value formed with 8×digest-len bits indicates the digest value of the current application.

Furthermore, in the second embodiment, the application digest (app_digest_message) shown in FIG. 22 is stored according to the watermark storage method or the non-VCL-NAL unit storage method described above.

That is, according to the watermark storage method, an application digest is inserted as a watermark into video coded data, and is then transmitted as a VCL-NAL unit that is a sample in mdat of fragmented mp4 of ISOBMFF. Furthermore, according to the non-VCL-NAL unit storage method, on the other hand, an application digest is stored directly into a non-VCL-NAL unit so as to be transmitted as a sample in mdat of fragmented mp4 of ISOBMFF.

Figure 24:
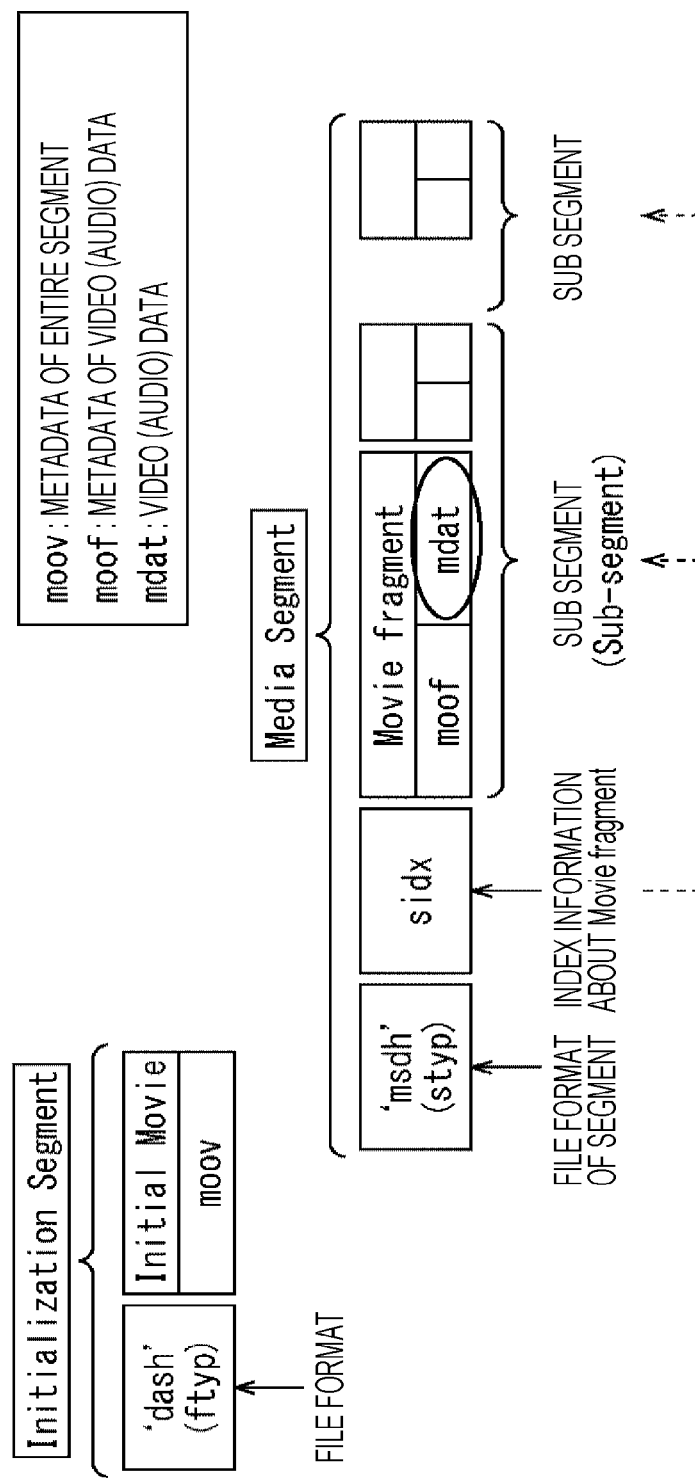
FIG. 24 is a diagram showing an example of the data format of a segment compliant with ISOBMFF.

Note that, although FIG. 24 shows an example of the data format of a segment compliant with ISOBMFF, in a case where the watermark storage method or the non-VCL-NAL unit storage method is adopted, an application digest is stored in mdat between moof and mdat constituting the Movie fragment of a sub segment (Sub Segment) in a media segment (Media Segment).

(3) Application Digest Transmission Methods

Next, the watermark storage method and the non-VCL-NAL unit storage method are described in detail.

(A) Watermark Storage Method (Overview of the Watermark Storage Method)

Figure 25:
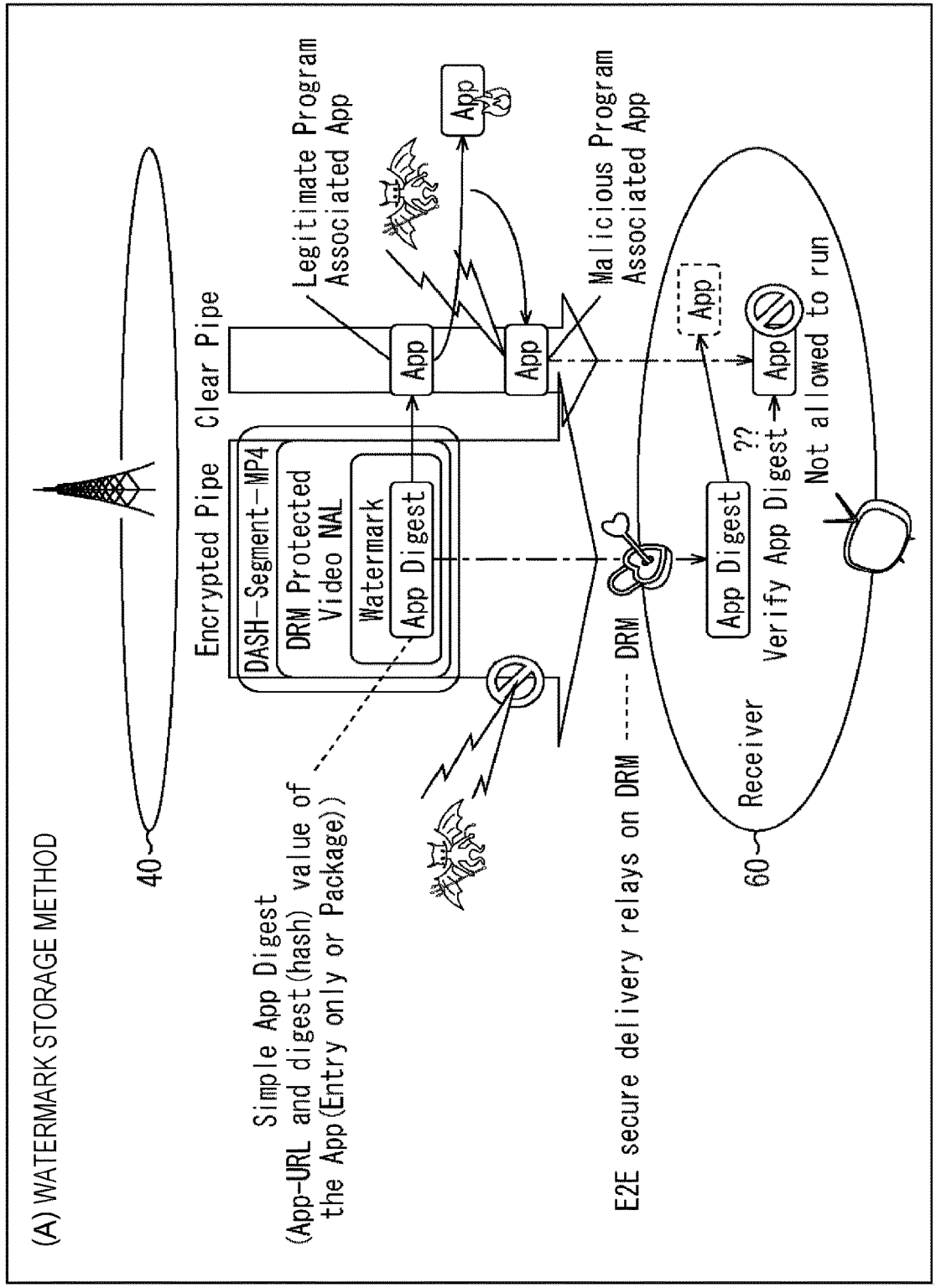
FIG. 25 is a diagram for explaining an overview of a watermark storage method.

FIG. 25 is a diagram for explaining an overview of the watermark storage method.

FIG. 25 schematically shows a broadcast stream to be transmitted from the broadcast server 40 of the transmission-side system 7 to the client device 60 via the transmission channel 80. This broadcast stream includes a portion encrypted by DRM (Encrypted Pipe) and an unencrypted portion (Clear Pipe).

According to the watermark storage method, an application digest (App Digest) for verifying an application (App) is stored in a watermark (Watermark) in the encrypted pipe, so that the application digest is protected. However, as shown in FIG. 22, the application digest includes application identification information (an application URL, for example) and the digest value of the application.

The client device 60 extracts the application URL and the digest value of the application stored in the watermark by canceling the DRM during reproduction of the content such as a program, and, using the digest value, verifies whether the application identified by the application URL is a legitimate application. In this case, verification is performed by comparing the digest value stored in the watermark with the digest value corresponding to the application acquired in accordance with the application URL. In a case where these digest values are the same, the application identified by the application URL is determined to be a legitimate application.

For example, in ATSC 3.0, which adopts an IP transmission method, a video and audio stream of content such as a program is transmitted and protected by a secure encrypted pipe according to DRM. However, a watermark including an application digest is stored in a VCL-NAL unit stored in mdat of the Movie fragment of a media segment forming a file (DASH segment MP4 fragment file) of the DASH segment (of the content) to be transmitted in a ROUTE session on IP/UDP. Furthermore, a field of an application digest including the application URL and the digest value of the application is defined as the structure of this watermark.

As the watermark storage method is adopted in this manner, a secure encrypted pipe according to DRM for protection of content such as a program is used for transmitting an application digest. As a result, end-to-end security is guaranteed, and it becomes possible to avoid fraud (attacks) by a malicious third party, such as replacement or falsification of an application, or falsification of association between content and the application, for example.

Further, according to the watermark storage method, application authentication can be performed by using the existing DRM, without construction of a full-fledged platform (infrastructure) for application authentication using PKI or the like. Thus, a cost reduction can be guaranteed.

(Structure of a Watermark Payload)

Figure 26:
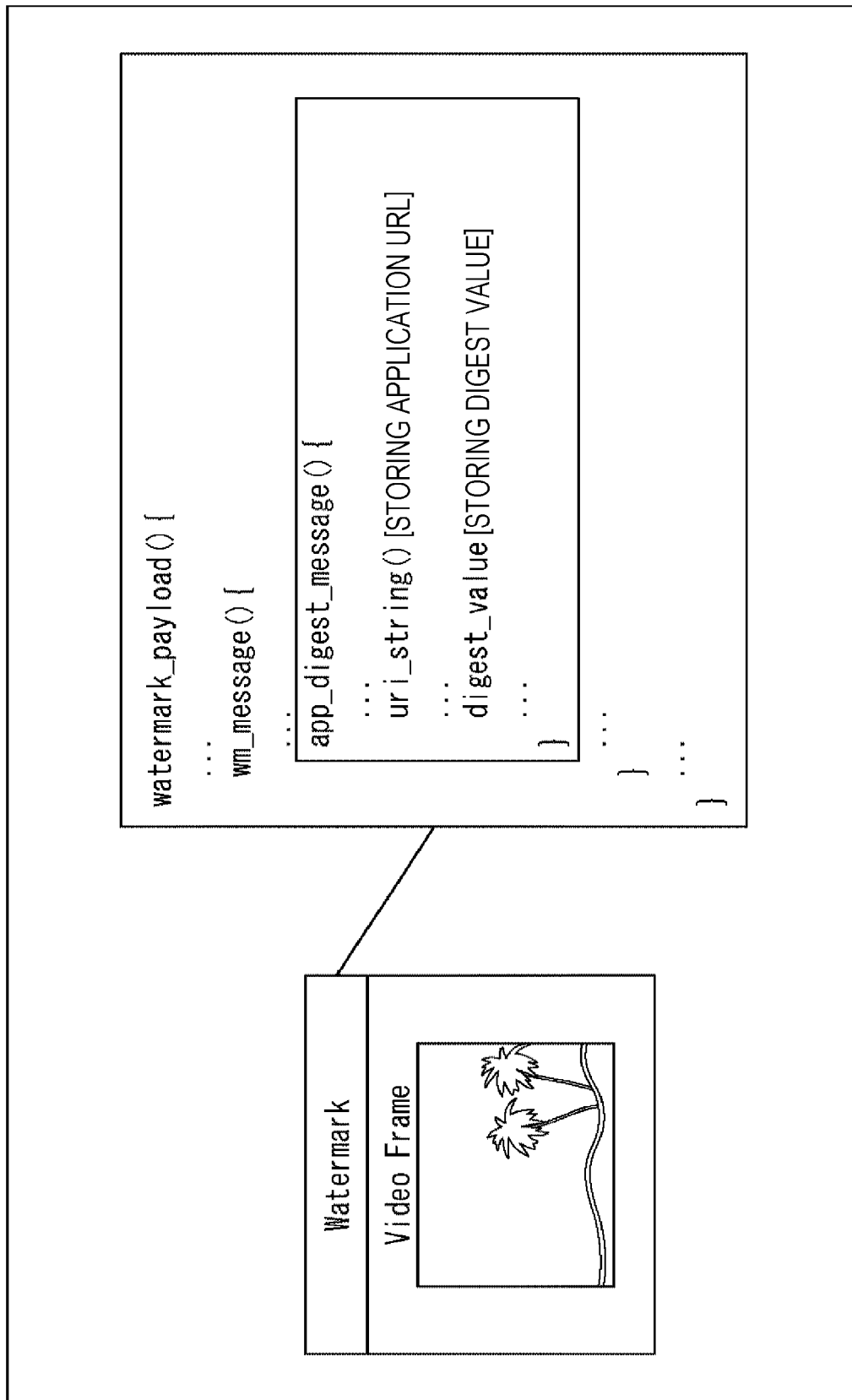
FIG. 26 is a diagram showing a method of storing an application digest using a video watermark.

FIG. 26 is a diagram showing a method of storing an application digest using a video watermark (a watermark).

As shown in FIG. 26, in one video frame, predetermined lines (two lines, for example) in an upper portion of the video display region can be used as a video watermark. In the lines used in this video watermark, an information amount of one or two bits can be transmitted for each block, for example. Furthermore, in the video watermark, predetermined lines (two lines, for example) of video coded data can be used in transmitting a watermark payload.

In this watermark payload, the application digest message (app_digest_message ( )) shown in FIG. 22 can be placed as a WM message (wm_message ( ). This application digest message includes uri_string ( ) storing the application URL and digest_value storing the digest value. The syntax of the watermark payload will be described below with reference to FIGS. 27 through 29.

(Syntax of a Watermark Payload)

FIG. 27 is a diagram showing an example of the syntax of a watermark payload.

In the 16-bit run in pattern, the transmission pattern of the video watermark and the resolution of one region expressed in the range from white to black are specified. As this transmission pattern, one or two lines are designated, for example. Furthermore, as the resolution of one region, 8 to 12 bits are designated, for example.

The wm_message_block ( ) indicates the message region of the watermark. The 8-bit zero pad indicates zero padding.

(Syntax of the WM Message Block)

FIG. 28 is a diagram showing an example of the syntax of the WM message block (wm_message_block ( )) shown in FIG. 27.

The WM message ID is designated in 8-bit wm_message_id. The WM message block length is designated in 8-bit wm_message_block_length.

The WM message version is designated in 4-bit wm_message_version. Information about fragments is specified in 2-bit fragment_number and 2-bit last_fragment.

Here, the WM message corresponding to the value specified in the WM message ID is specified in wm_message ( ). For example, as shown in FIG. 29, in a case where "0x08" is designated as the WM message ID, an application digest message (app_digest_message ( )) is placed as the WM message. It should be noted that the WM message includes error detection codes such as message_CRC_32 and CRC_32.

Figure 30:
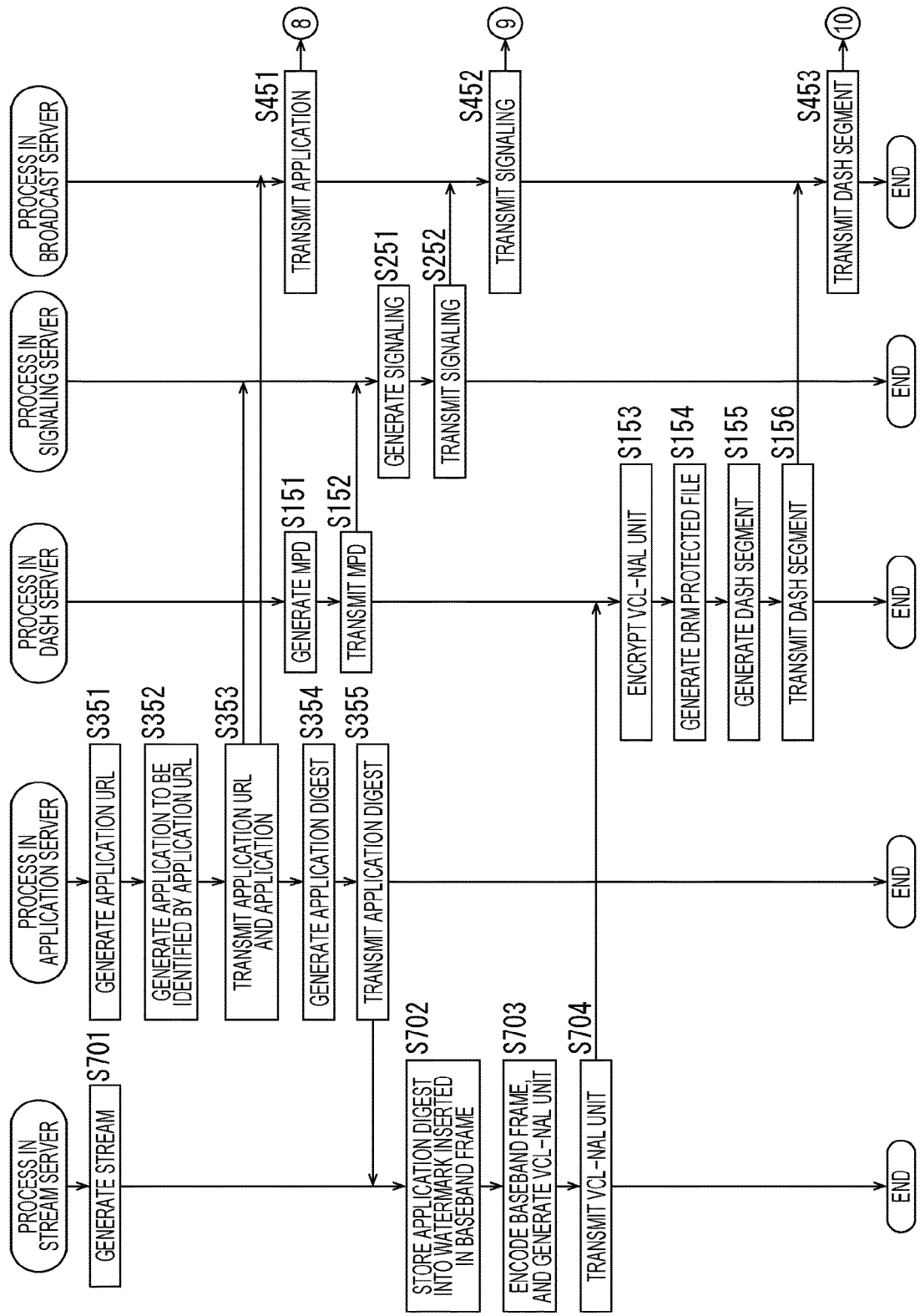
FIG. 30 is a flowchart for explaining the flow of processing on the transmission side in a case where the watermark storage method is adopted.
Figure 31:
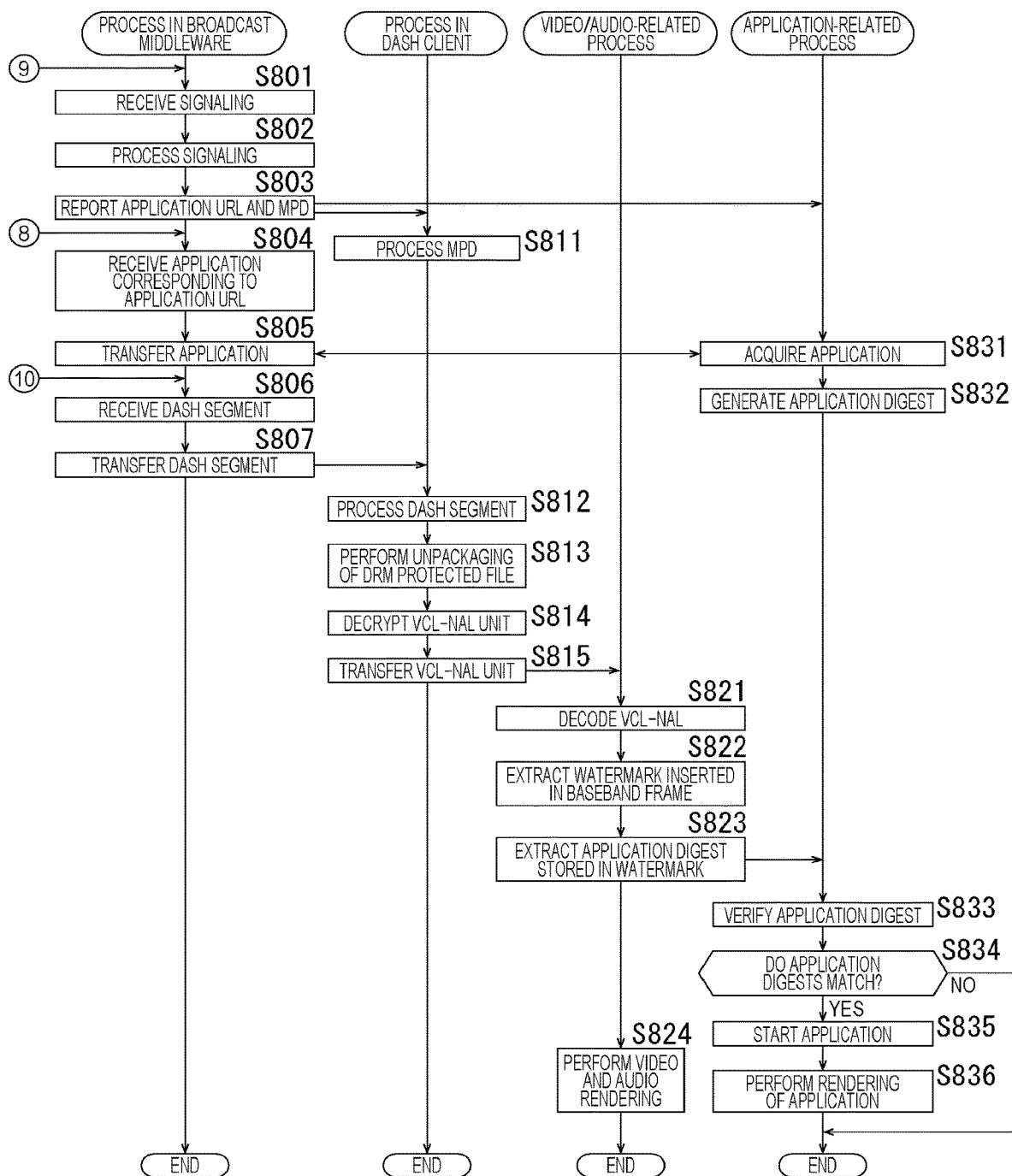
FIG. 31 is a flowchart for explaining the flow of processing on the reception side in a case where the watermark storage method is adopted.

The following is a description of the flow of processing to be performed in the respective devices of the transmission system 2 (FIG. 16) in a case where the watermark storage method is adopted, with reference to the flowcharts shown in FIGS. 30 and 31.

(Flow of Processing on the Transmission Side)

Referring first to the flowchart in FIG. 30, the flow of processing on the transmission side in a case where the watermark storage method is adopted is described. It should be noted that this processing on the transmission side is performed in a case where an application digest is stored in a video watermark. Therefore, the processing for video data will be mainly described below, and explanation of the processing for audio data will be skipped where appropriate.

The processes in steps S351 though S355 in FIG. 30 are performed by the application server 30. In step S351, the application URL generation unit 311 generates an application URL. In step S352, the application generation unit 312 generates the application to be identified by the application URL generated through the process in step S351.

In step S353, the transmission unit 303 transmits the application URL generated through the process in step S351 to the signaling server 20, and transmits the application generated through the process in step S352 to the broadcast server 40.

In step S354, the application digest generation unit 314 generates an application digest. This application digest contains, for example, the application URL generated through the process in step S351 and the digest value (hash value)

obtained by applying a predetermined algorithm (such as MD5, for example) to the application generated through the process in step S352.

In step S355, the transmission unit 303 transmits the application digest generated through the process in step S354 to the stream server 70.

The processes in steps S701 though S704 in FIG. 30 are performed by the stream server 70. Also, in the stream server 70, the application digest transmitted through the process in step S355 is received.

In step S701, the stream generation unit 711 generates a stream (a baseband frame sequence) by processing (the data of) content such as a program accumulated in the reception unit 701.

In step S702, the watermark inserter 712 stores the application digest generated by the application server 30 into a watermark (a watermark payload) inserted in the baseband frame of the stream generated through the process in step S701.

In step S703, the encoder 713 encodes the baseband frame processed in step S702 according to a predetermined coding method (HEVC or the like, for example), and generates a VCL-NAL unit. In step S704, the transmission unit 703 transmits the VCL-NAL unit generated through the process in step S703, to the DASH server 10.

The processes in steps S151 though S156 in FIG. 30 are performed by the DASH server 10. Also, in the DASH server 10, the VCL-NAL unit transmitted through the process in step S704 is received.

In step S151, the MPD generation unit 111 generates MPD metadata. Further, in step S152, the transmission unit 103 transmits the MPD metadata generated through the process in step S151, to the signaling server 20.

In step S153, the encryption unit 113 encrypts the VCL-NAL unit generated by the stream server 70, according to a predetermined encryption method. In step S154, the DRM protected file generation unit 114 processes the VCL-NAL unit encrypted through the process in step S153, to generate a DRM protected file.

In step S155, the DASH segment generation unit 112 processes the DRM protected file generated through the process in step S154, to generate a DASH segment. In step S156, the transmission unit 103 transmits the DASH segment generated through the process in step S155, to the broadcast server 40.

The processes in steps S251 and S252 in FIG. 30 are performed by the signaling server 20. Also, in the signaling server 20, the MPD metadata transmitted through the process in step S152 and the application URL transmitted through the process in step S353 are received.

In step S251, the signaling generation unit 211 generates signaling. Here, LLS signaling containing SLT metadata, and SLS signaling containing USD metadata, S-TSID metadata, and MPD metadata are generated as the signaling. The application URL generated by the application server 30 is also described in the SLT metadata or the SLS signaling (metadata in USD, S-TSID, MPD, or the like, for example).

In step S252, the transmission unit 203 transmits the signaling generated through the process in step S251, to the broadcast server 40.

The processes in steps S451 though S453 in FIG. 30 are performed by the broadcast server 40. Also, in the broadcast server 40, the DASH segment transmitted through the process in step S156, the signaling transmitted through the process in step S252, and the application transmitted through the process in step S353 are received.

The transmission unit 403 transmits (simultaneously broadcasts) the application generated by the application server 30, the signaling generated by the signaling server 20, and the DASH segment generated by the DASH server 10 via the transmission channel 80 (S451 through S453).

The flow of processing on the transmission side has been described so far.

(Flow of Processing on the Reception Side)

Referring now to the flowchart in FIG. 31, the flow of processing on the reception side in a case where the watermark storage method is adopted is described. It should be noted that this processing on the reception side is performed in a case where an application digest is stored in a video watermark. Therefore, the processing for video data will be mainly described below, and explanation of the processing for audio data will be skipped where appropriate.

FIG. 31 shows not only the flow of the processing to be performed by the broadcast middleware 604 and the DASH client 605, but also the flow in a video/audio-related process to be performed by the decoder 606, the rendering engine 612, the watermark extractor 613, and the like, and the flow in an application-related process to be performed by the application control unit 611, the rendering engine 612, the application digest validator 614, and the like.

However, the video/audio-related process indicates a process related to the video and audio data of content, and the application-related process indicates a process related to the data of an application, as in FIG. 9 and others.

In step S801, the broadcast middleware 604 receives the signaling transmitted from the broadcast server 40 via the reception unit 603. In step S802, the broadcast middleware 604 processes the signaling received through the process in step S801.

Here, LLS signaling containing SLT metadata, and SLS signaling containing USD metadata, S-TSID metadata, and MPD metadata are processed as the signaling. The application URL generated by the application server 30 is also described in the SLT metadata or the SLS signaling (metadata in USD, S-TSID, MPD, or the like, for example).

In step S803, the broadcast middleware 604 notifies the DASH client 605 of the MPD metadata acquired through the process in step S802, and notifies the application control unit 611 of the application URL acquired through the process in step S802.

In step S804, under the control of the application control unit 611, the broadcast middleware 604 receives the application transmitted from the broadcast server 40 via the reception unit 603 in accordance with the application URL described in the signaling. In step S805, the broadcast middleware 604 transfers the application received through the process in step S804, to the application control unit 611.

In step S831, the application control unit 611 acquires the application transferred through the process in step S805. In step S832, the application digest validator 614 generates an application digest corresponding to the application acquired through the process in step S831.

Furthermore, in this process in step S832, the same algorithm (MD5 or the like, for example) as that used in the process in step S354 (FIG. 30) in the transmission-side system 7 is applied to the application acquired through the process in step S831, so that a digest value (a hash value) is generated.

In step S806, the broadcast middleware 604 receives the DASH segment transmitted from the broadcast server 40 via the reception unit 603. In step S807, the broadcast middleware 604 transfers the DASH segment received through the process in step S806, to the DASH client 605.

In step S812, the DASH client 605 processes the DASH segment transferred through the process in step S807, in accordance with a result of the processing of the MPD metadata in step S811. In step S813, (the DRM protected file processing unit of) the DASH client 605 processes the DRM protected file acquired through the process in step S812, and performs unpackaging of the DRM protected file.

In step S814, according to a predetermined decryption method, (the decryption unit of) the DASH client 605 decrypts the encrypted VCL-NAL unit obtained through the process in step S814. In step S815, the DASH client 605 transfers the VCL-NAL unit decrypted through the process in step S814, to the decoder 606.

In step S821, according to a predetermined decoding method (HEVC or the like, for example), the decoder 606 decodes the VCL-NAL unit transferred through the process in step S815. In step S822, the watermark extractor 613 extracts the watermark (video watermark) inserted in the baseband frame obtained through the process in step S821.

In step S823, the application digest validator 614 extracts the application digest stored in the watermark (watermark payload) extracted through the process in step S822. It should be noted that, in the client device 60, the rendering engine 612 renders the video and audio data obtained through the process in step S821, so that the video and the sound of the content such as a program are output (S824), as in the cases described above.

In step S833, the application digest validator 614 performs application digest verification by comparing the application digest generated through the process in step S832 with the application digest extracted through the process in step S823. In step S834, in accordance with a result of the verification in step S833, the application digest validator 614 determines whether the compared application digests are the same.

Here, the application digest (the digest value) extracted through the process in step S823 has been generated through the process in step S354 (FIG. 30) (by the application server 30) in the transmission-side system 7, and has been generated according to the same algorithm (MD5 or the like, for example) as that used for the application digest (the digest value) generated through the process in step S832. Therefore, if the application digests (the digest values) compared in the determination process in step S834 are the same, the current application can be regarded as a legitimate application.

If the compared application digests are determined to be the same in step S834, the process moves on to step S835. In step S835, the application control unit 611 (instantly) starts the application acquired through the process in step S831. That is, in this case, the client device 60 regards the received application as a legitimate application, and permits the application to start.

In step S836, the rendering engine 612 renders the data of the application started through the process in step S835. As a result, the video of the application accompanying the content such as a program is displayed on the client device 60, for example.

If the compared application digests are determined not to be the same in step S834, on the other hand, the processes in steps S835 and S836 are skipped. That is, in this case, the client device 60 regards the received application as an illegitimate application, and refuses a start of the application. It should be noted that, in a case where such an illegitimate application is detected, for example, some other operation such as notifying the user or the related broadcasting station may be performed.

The flow of processing on the reception side has been described above.

(B) Non-VCL-NAL Unit Storage Method (Overview of the Non-VCL-NAL Unit Storage Method)

Figure 32:
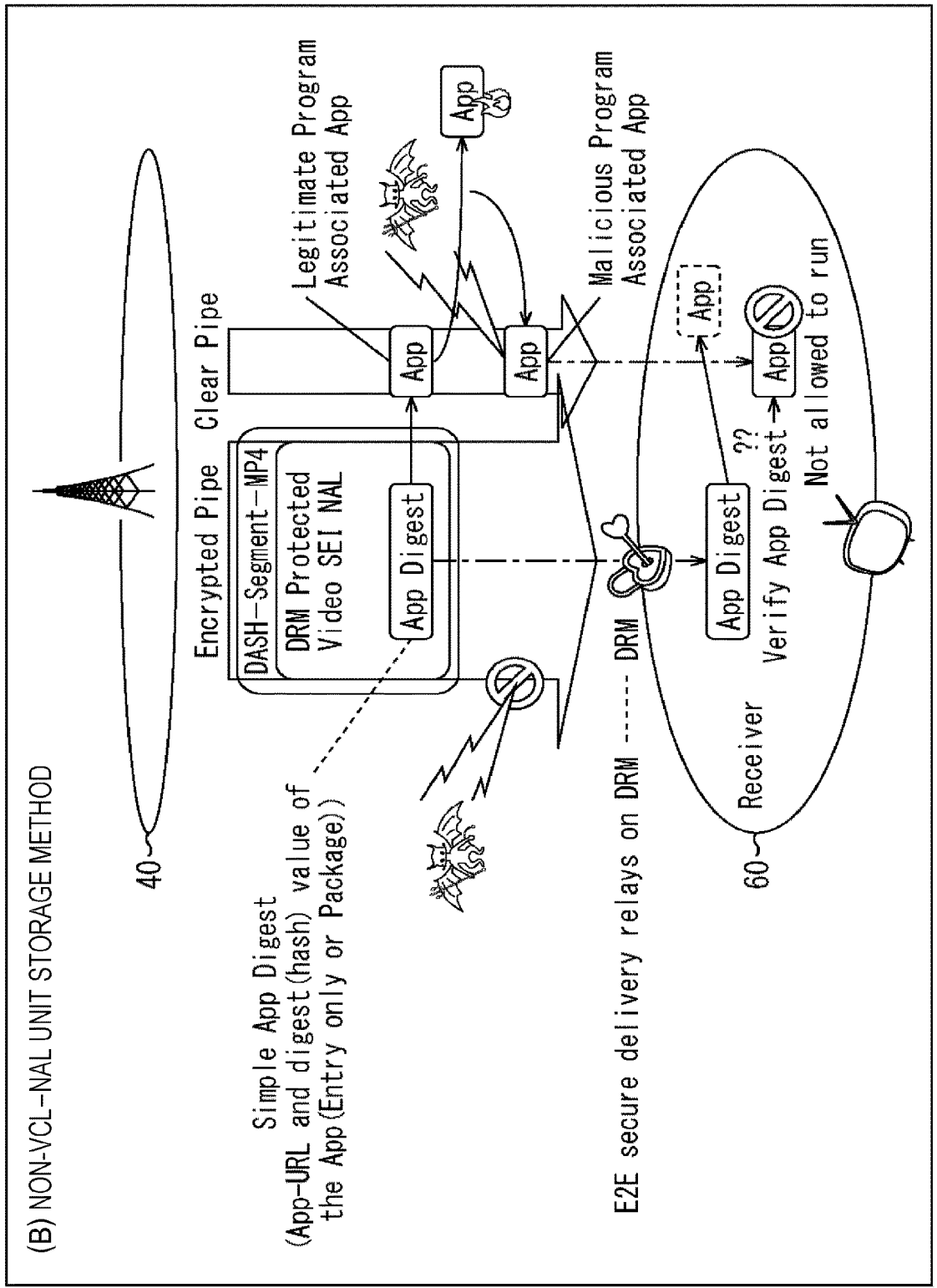
FIG. 32 is a diagram for explaining an overview of a non-VCL-NAL unit storage method.

FIG. 32 is a diagram for explaining an overview of the non-VCL-NAL unit storage method.

Like FIG. 25, FIG. 32 schematically shows a broadcast stream to be transmitted from the broadcast server 40 to the client device 60 via the transmission channel 80. This broadcast stream includes a portion encrypted by DRM (Encrypted Pipe) and an unencrypted portion (Clear Pipe).

According to the non-VCL-NAL unit storage method, an application digest (App Digest) for verifying an application (App) is stored in Video-SEI stored in an NAL unit in the encrypted pipe, so that the application digest is protected.

Here, the network abstraction layer (NAL) unit includes various kinds of data, and can be roughly classified into a video coding layer (VCL) and a non-video coding layer (Non-VCL). A VCL-NAL unit is slice data (coded data) of a compressed video.

On the other hand, a non-VCL-NAL unit is designed for storing other auxiliary information. For example, a non-VCL-NAL unit may be a video parameter set (VPS), a sequence parameter set (SPS), a picture parameter set (PPS), supplemental enhancement information (SEI), or the like. Particularly, an SEI message is for storing additional information that is not indispensable in decryption of a VCL, and can include information (User data unregistered) uniquely defined by the user. Thus, an application digest can be stored into an SEI message.

According to the non-VCL-NAL unit storage method, however, not only a VCL-NAL unit but also an NAL unit (a non-VCL-NAL unit) storing an SEI message including an application digest needs to be subjected to DRM encryption. Further, as shown in FIG. 22, this application digest includes identification information (the application URL, for example) about the application and the digest value of the application.

The client device 60 extracts the application URL and the digest value of the application stored in the non-VCL-NAL unit (SEI message) by canceling the DRM during reproduction of the content such as a program, and, using the digest value, performs verification to determine whether the application identified by the application URL is a legitimate application. Here, verification is performed by comparing the digest value stored in the non-VCL-NAL unit (SEI message) with the digest value corresponding to the application acquired in accordance with the application URL. In a case where these digest values are the same, the application identified by the application URL is determined to be a legitimate application.

As the non-VCL-NAL unit storage method is adopted in this manner, a secure encrypted pipe according to DRM for protection of content such as a program is used for transmitting an application digest. As a result, end-to-end security is guaranteed, and it becomes possible to avoid fraud (attacks) by a malicious third party, such as replacement or falsification of an application, or falsification of association between content and the application.

Also, according to the non-VCL-NAL unit storage method, application authentication can be performed by using the existing DRM, without construction of a full-fledged platform (infrastructure) for application authentication using PKI or the like. Thus, a cost reduction can be guaranteed.

Further, in a case where the watermark storage method is adopted, it is necessary to always keep the watermark extractor 613 (FIG. 20) in an active state, to extract the application digest stored in a watermark in the client device 60. In a case where the non-VCL-NAL unit storage method is adopted, on the other hand, it is possible to extract the application digest without activating (not providing) the watermark extractor 613.

Figure 33:
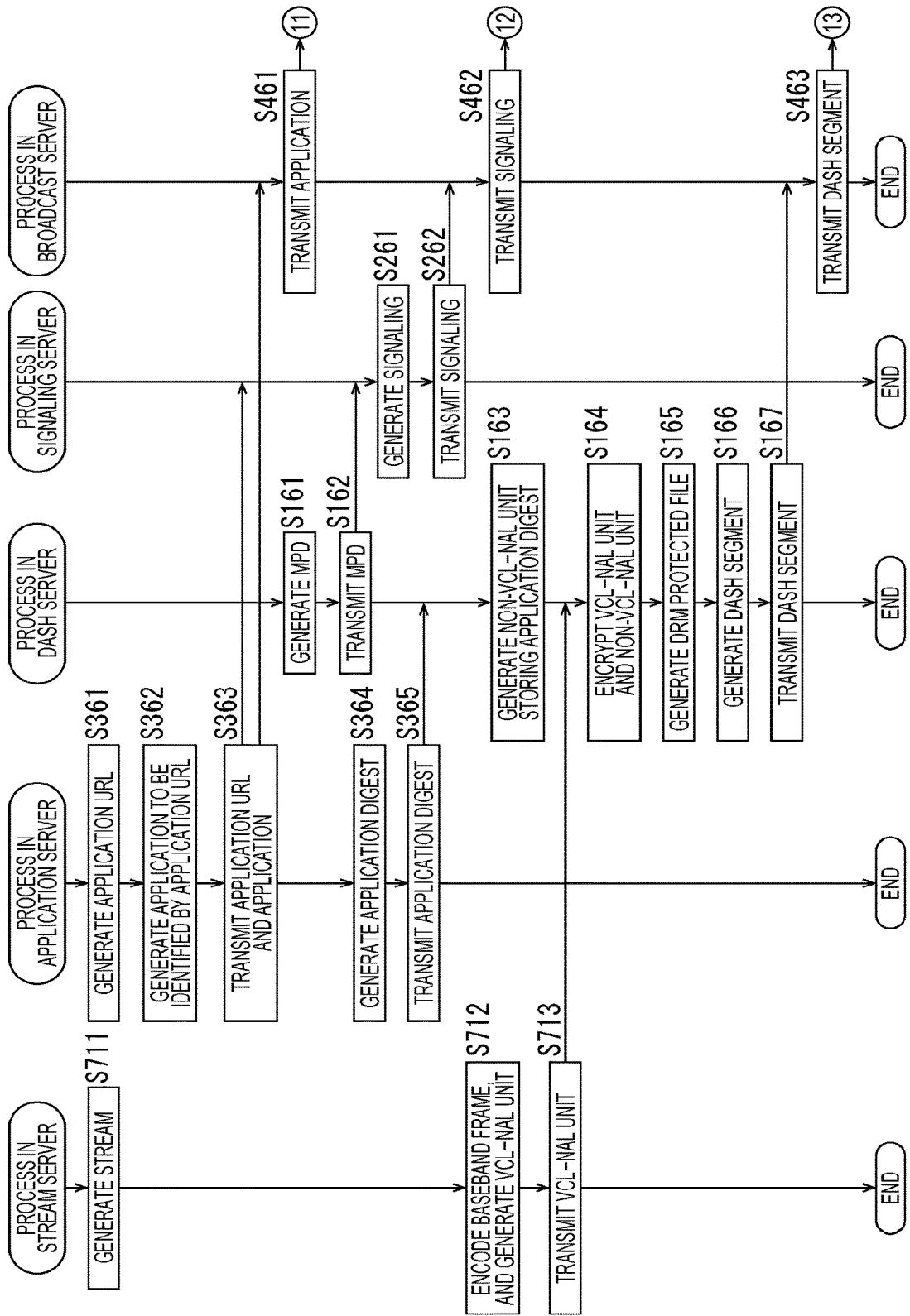
FIG. 33 is a flowchart for explaining a flow of processing on the transmission side in a case where the non-VCL-NAL unit storage method is adopted.
Figure 34:
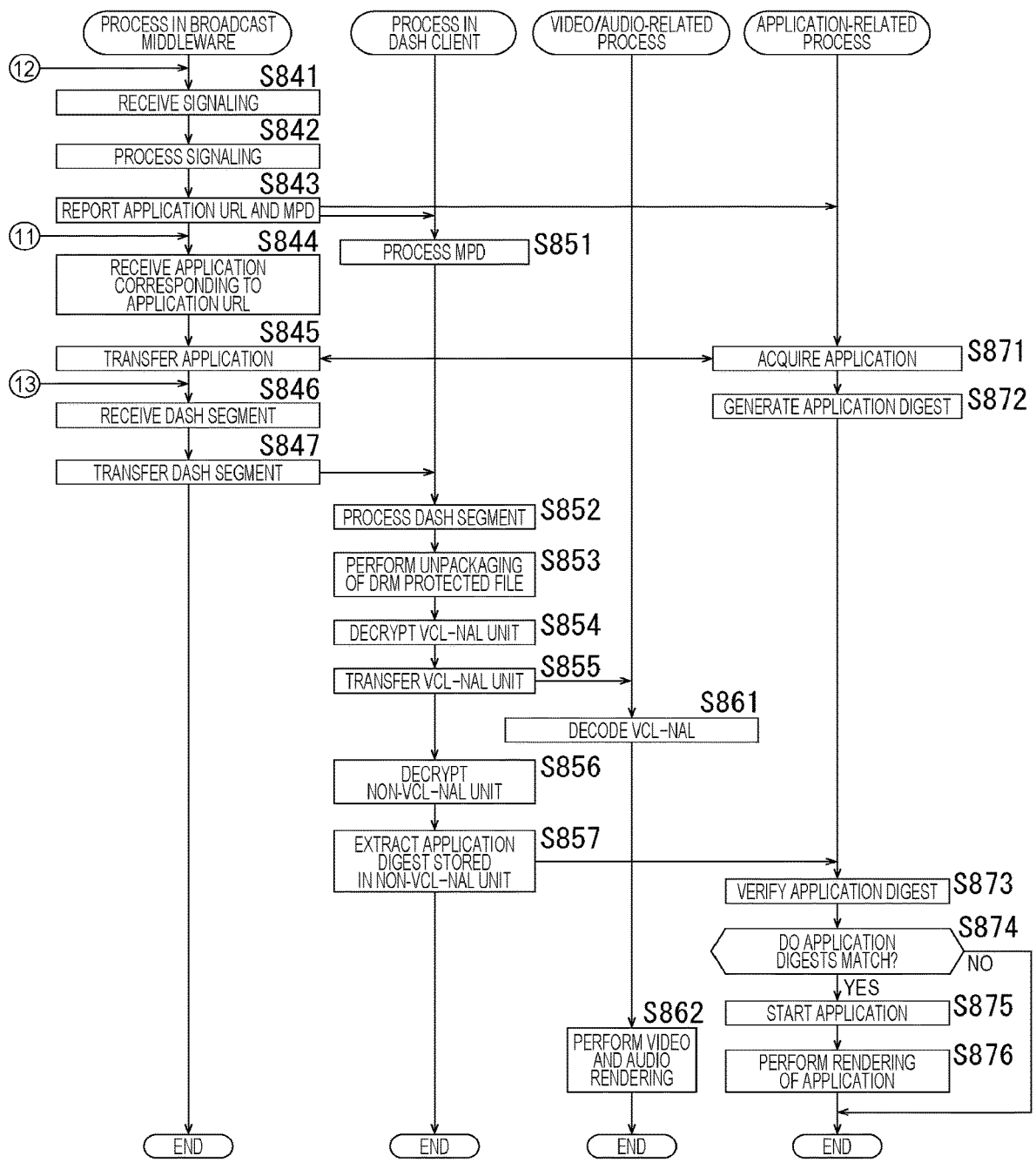
FIG. 34 is a flowchart for explaining a flow of processing on the reception side in a case where the non-VCL-NAL unit storage method is adopted.

The following is a description of the flow of processing to be performed in the respective devices of the transmission system 2 (FIG. 16) in a case where the non-VCL-NAL unit storage method is adopted, with reference to the flowcharts shown in FIGS. 33 and 34.

(Flow of Processing on the Transmission Side)

Referring first to the flowchart in FIG. 33, the flow of processing on the transmission side in a case where the non-VCL-NAL unit storage method is adopted is described. It should be noted that this processing on the transmission side is performed in a case where an application digest is stored in a non-VCL-NAL unit. Therefore, the processing for video data will be mainly described below, and explanation of the processing for audio data will be skipped where appropriate.

The processes in steps S361 though S365 in FIG. 33 are performed by the application server 30. In steps S361 though S365, an application URL, an application, and an application digest are generated, and are transmitted to the current server, as in steps S351 though S355 in FIG. 30.

However, in a case where the non-VCL-NAL unit storage method is adopted, the application digest is transmitted not to the stream server 70 but to the DASH server 10. Further, this application digest contains, for example, the application URL generated through the process in step S361 and the digest value (hash value) obtained by applying a predetermined algorithm (such as MD5, for example) to the application generated through the process in step S362.

The processes in steps S711 though S713 in FIG. 33 are performed by the stream server 70. In step S711, a stream (a baseband frame sequence) is generated, as in step S701 in FIG. 30.

In step S712, the encoder 713 encodes the baseband frame generated through the process in step S711 according to a predetermined coding method (HEVC or the like, for example), and generates a VCL-NAL unit. In step S713, the transmission unit 703 transmits the VCL-NAL unit generated through the process in step S712, to the DASH server 10.

The processes in steps S161 though S167 in FIG. 33 are performed by the DASH server 10. Also, in the DASH server 10, the application digest transmitted through the process in step S365, as well as the VCL-NAL unit transmitted through the process in step S713, is received.

In steps S161 and S162 in FIG. 33, MPD metadata is generated, and is transmitted to the signaling server 20, as in steps S151 and S152 in FIG. 30.

In step S163, the non-VCL-NAL unit generation unit 115 generates a non-VCL-NAL unit storing the application digest generated by the application server 30. Here, an SEI message that the user can uniquely define can be used as the non-VCL-NAL unit.

In step S164, the encryption unit 113 encrypts the VCL-NAL unit generated by the stream server 70 and the non-VCL-NAL unit generated through the process in step S163, according to a predetermined encryption method. In step S165, the DRM protected file generation unit 114 processes the VCL-NAL unit and the non-VCL-NAL unit encrypted through the process in step S164, to generate a DRM protected file.

In step S166, the DASH segment generation unit 112 processes the DRM protected file generated through the process in step S165, to generate a DASH segment. In step S167, the transmission unit 103 transmits the DASH segment generated through the process in step S166, to the broadcast server 40.

The processes in steps S261 and S262 in FIG. 33 are performed by the signaling server 20. In steps S261 and S262, signaling is generated, and is transmitted to the broadcast server 40, as in steps S251 and S252 in FIG. 30.

The processes in steps S461 though S463 in FIG. 33 are performed by the broadcast server 40. In steps S461 though S463, the application, the signaling, and the DASH segment are transmitted (simultaneously broadcast) by the transmission unit 403 via the transmission channel 80, as in steps S451 though S453 in FIG. 30.

The flow of processing on the transmission side has been described so far.

(Flow of Processing on the Reception Side)

Referring now to the flowchart in FIG. 34, the flow of processing on the reception side in a case where the non-VCL-NAL unit storage method is adopted is described. It should be noted that this processing on the reception side is performed in a case where an application digest is stored in a non-VCL-NAL unit. Therefore, the processing for video data will be mainly described below, and explanation of the processing for audio data will be skipped where appropriate.

In steps S841 though S847, signaling, an application, and a DASH segment transmitted from the broadcast server 40 are received and processed by the broadcast middleware 604, as in steps S801 though S807 in FIG. 31.

Also, in step S851, MPD metadata is processed by the DASH client 605, as in step S811 in FIG. 31. Further, in steps S871 and S872, the application corresponding to the application URL is acquired by the application control unit 611, and an application digest in accordance with the application is generated by the application digest validator 614, as in steps S831 and S832 in FIG. 31.

In this process in step S832, the same algorithm (MD5 or the like, for example) as that used in the process in step S364 (FIG. 33) in the transmission-side system 7 is applied to the application acquired through the process in step S871, so that a digest value (a hash value) is generated.

In step S852, the DASH client 605 processes the DASH segment transferred through the process in step S847, in accordance with a result of the processing of the MPD metadata in step S851. In step S853, (the DRM protected file processing unit of) the DASH client 605 processes the DRM protected file acquired through the process in step S852, and performs unpackaging of the DRM protected file.

In step S854, according to a predetermined decryption method, (the decryption unit of) the DASH client 605 decrypts the encrypted VCL-NAL unit obtained through the process in step S853. In step S855, the DASH client 605 transfers the VCL-NAL unit decrypted through the process in step S854, to the decoder 606.

In step S861, according to a predetermined decoding method (HEVC or the like, for example), the decoder 606 decodes the VCL-NAL unit transferred through the process in step S855. Further, in step S862, the rendering engine 612 performs rendering of the video and audio data obtained through the process in step S861. As a result, in the client device 60, the video and the sound of the content such as a program are output.

Further, in step S856, according to a predetermined decryption method, (the decryption unit of) the DASH client 605 decrypts the encrypted non-VCL-NAL unit obtained through the process in step S853. In step S857, the application digest validator 614 extracts the application digest stored in the non-VCL-NAL unit decrypted through the process in step S856.

In step S873, the application digest validator 614 performs application digest verification by comparing the application digest generated through the process in step S872 with the application digest extracted through the process in step S857. In step S874, in accordance with a result of the verification in step S873, the application digest validator 614 determines whether the compared application digests are the same.

Here, the application digest (the digest value) extracted through the process in step S857 has been generated through the process in step S364 (FIG. 33) (by the application server 30) in the transmission-side system 7, and has been generated according to the same algorithm (MD5 or the like, for example) as that used for the application digest (the digest value) generated through the process in step S872. Therefore, if the application digests (the digest values) compared in the determination process in step S874 are the same, the current application can be regarded as a legitimate application.

If the compared application digests are determined to be the same in step S874, the process moves on to step S875. In steps S875 and S876, the received application is regarded as a legitimate application, and the application is (instantly) started, so that the video thereof is displayed, as in steps S835 and S836 in FIG. 31.

If the compared application digests are determined not to be the same in step S874, on the other hand, the received application is regarded as an illegitimate application, and the application is not started.

The flow of processing on the reception side has been described above.

3. Examples of Signaling

The following is a description of example formats of signaling for transmitting acquisition source information (such as a URL) indicating the acquisition source of an application, with reference to FIGS. 35 through 42.

(SLT Format)

FIG. 35 is a diagram showing an example format of SLT metadata in an XML format. It should be noted that, between the elements and the attributes in FIG. 35, "@" is attached to the attributes. Also, indented elements and attributes are those specified for the higher-order elements. These relationships also apply in the other signaling formats described later.

An SLT element is a root element, and is a higher-order element of a bsid attribute, an sltCapabilities attribute, an sltInetUrl element, and a Service element.

In the bsid attribute, the broadcast stream ID is specified. In the sltCapabilities attribute, information about required capabilities is specified.

In the sltInetUrl element, the base URL for acquiring an Electronic Service Guide (ESG) and SLS signaling is specified. The sltInetUrl element is a higher-order element of a urlType attribute. In the urlType attribute, the type of files available with the base URL is specified.

In the Service element, information about one or more services is specified. The Service element is a higher-order element of a serviceId attribute, an sltSvcSeqNum attribute, a protected attribute, a majorChannelNo attribute, a minorChannelNo attribute, a serviceCategory attribute, a shortServiceName attribute, a hidden attribute, a broadbandAccessRequired attribute, an svcCapabilities attribute, an applicationUrl attribute, a BroadcastSvcSignaling element, and an svcInetUrl element.

In the serviceId attribute, the service ID is specified. In the sltSvcSeqNum attribute, information about the version of the SLT metadata is specified. In the protected attribute, encryption information indicating protection of the service is specified.

In the majorChannelNo attribute, the major channel number is specified. In the minorChannelNo attribute, the minor channel number is specified. In the serviceCategory attribute, the category of the service is specified. In the shortServiceName attribute, the short service name is specified.

In the hidden attribute, whether the service is a hidden service or not is specified. In the broadbandAccessRequired attribute, whether it is necessary to access a communication line such as the Internet 90 or not is specified. In the svcCapabilities attribute, information about capabilities required for decoding and the like is specified.

In the applicationUrl attribute, the URL (application URL) indicating the acquisition source of the application is specified. This application URL is the information for identifying the entry (index.html, for example) in a case where the application is formed with a plurality of files such as an HTML document file and an image file, for example. Also, in the client device 60 that has received this SLT metadata, the application is acquired in accordance with the application URL, and is instantly started.

In the BroadcastSvcSignaling element, information about the acquisition source of SLS signaling is specified in a case where the SLS signaling is acquired via broadcasting. The BroadcastSvcSignaling element is a higher-order element of an slsProtocol attribute, an slsMajorProtocolVersion attribute, an slsMinorProtocolVersion attribute, an slsPlpId attribute, an slsDestinationIpAddress attribute, an slsDestinationUdpPort attribute, and an slsSourceIpAddress attribute.

In the slsProtocol attribute, information about the protocol of SLS signaling is specified. In the slsMajorProtocolVersion attribute, the major version number of the protocol of SLS signaling is specified. In the slsMinorProtocolVersion attribute, the minor version number of the protocol of SLS signaling is specified.

In the slsPlpId attribute, the ID of the physical layer pipe (PLP) to which SLS signaling is transmitted is specified. In the slsDestinationIpAddress attribute, the IP address of the destination of SLS signaling is specified. In the slsDestinationUdpPort attribute, the port number of the destination of SLS signaling is specified. In the slsSourceIpAddress attribute, the IP address of the source of SLS signaling is specified.

In the svcInetUrl element, the URL of the acquisition source of SLS signaling is specified in a case where the SLS signaling is acquired via communication. The svcInetUrl element is a higher-order element of a urlType attribute. In the urlType attribute, the type of files available with this URL is specified.

Note that, as for the number of occurrences (Use) in FIG. 35, in a case where "1" is designated, only one element or attribute is specified, and in a case where "0 . . . 1" is specified, the element or attribute may or may not be specified. Further, in a case where "1 . . . N" is specified, one or more elements or attributes are specified. In a case where "0 . . . N" is specified, one or more elements or attributes may or may not be specified.

Further, in a case where "unsignedShort" or "unsignedByte" is specified as Data Type, the value of the element or attribute is of an integer type. In a case where "string" is specified as Data Type, the value of the element or attribute is of a character string type. In a case where "anyURI" is specified as Data Type, the value of the element or attribute is a character string in the form of a URI. In a case where "boolean" is specified as Data Type, the element or attribute is of a Boolean type. Note that, in a case where "language" is specified as Data Type, the value of the element or attribute is valid as the value of an xml:lang attribute, and in a case where "dateTime" is specified, the value of the element or attribute indicates a specific date and time.

(USD Format)

FIG. 36 is a diagram showing an example format of USD metadata (USBD metadata) in an XML format.

A bundleDescription element is a root element, and is a higher-order element of a userServiceDescription element (USD element). This userServiceDescription element is a higher-order element of a globalServiceID attribute, a serviceId attribute, a serviceStatus attribute, a fullMPDUri attribute, an sTSIDUri attribute, an applicationUrl attribute, a name element, a serviceLanguage element, a capabilityCode element, and a deliveryMethod element.

In the globalServiceID attribute, the global service ID is specified. In the serviceId attribute, the service ID is specified. In the serviceStatus attribute, information about the status of the service is specified. In the fullMPDUri attribute, the URI for referring to MPD metadata is specified. In the sTSIDUri attribute, the URI for referring to S-TSID metadata is specified.

In the applicationUrl attribute, the URL (application URL) indicating the acquisition source of the application is specified. This application URL is the information for identifying the entry (index.html, for example) in a case where the application is formed with a plurality of files such as an HTML document file and an image file, for example. Also, in the client device 60 that has received this USD metadata, the application is acquired in accordance with the application URL, and is instantly started.

In the name element, the name of the service of ATSC 3.0 is specified. The name element is a higher-order element of a lang attribute. In the lang attribute, the language of the name of the ATSC 3.0 service is specified. In the serviceLanguage element, the languages available in the ATSC 3.0 service are specified. In the capabilityCode element, the codes related to capabilities are specified.

In the deliveryMethod element, information about the data delivery method is specified The deliveryMethod element is a higher-order element of a broadcastAppService element and a unicastAppService element. The broadcastAppService element is a higher-order element of a basePattern element, and information about delivery via broadcasting is specified therein. The unicastAppService element is a higher-order element of a basePattern element, and information about delivery via communication is specified therein.

(S-TSID Format)

FIG. 37 is a diagram showing an example format of S-TSID metadata.

An S-TSID element is a root element, and is a higher-order element of a serviceId attribute, an applicationUrl attribute, and an RS element. In the serviceId attribute, the service ID is specified.

In the applicationUrl attribute, the URL (application URL) indicating the acquisition source of the application is specified. This application URL is the information for identifying the entry (index.html, for example) in a case where the application is formed with a plurality of files such as an HTML document file and an image file, for example. Also, in the client device 60 that has received this S-TSID metadata, the application is acquired in accordance with the application URL, and is instantly started.

In the RS element, information about a ROUTE session is specified. The RS element is a higher-order element of a bsid attribute, an sIpAddr attribute, a dIpAddr attribute, a dport attribute, a PLPID attribute, and an LS element.

In the bsid attribute, the broadcast stream ID is specified. In the sIpAddr attribute, the IP address of the source is specified. In the dIpAddr attribute, the IP address of the destination is specified. In the dport attribute, the port number of the destination is specified. In the PLPID attribute, the PLP ID in the ROUTE session is specified.

In the LS element, information about an LCT session is specified. The LS element is a higher-order element of a tsi attribute, a PLPID attribute, a bw attribute, a startTime attribute, an endTime attribute, a SrcFlow element, and a RprFlow element.

In the tsi attribute, TSI is specified. In the PLPID attribute, the ID of the PLP is specified. In the bw attribute, the bandwidth is specified. In the startTime attribute and the endTime attribute, the start date and time, and the end date and time are specified. In the SrcFlow element, source flow information is specified.

(MPD Format)

Figure 38:
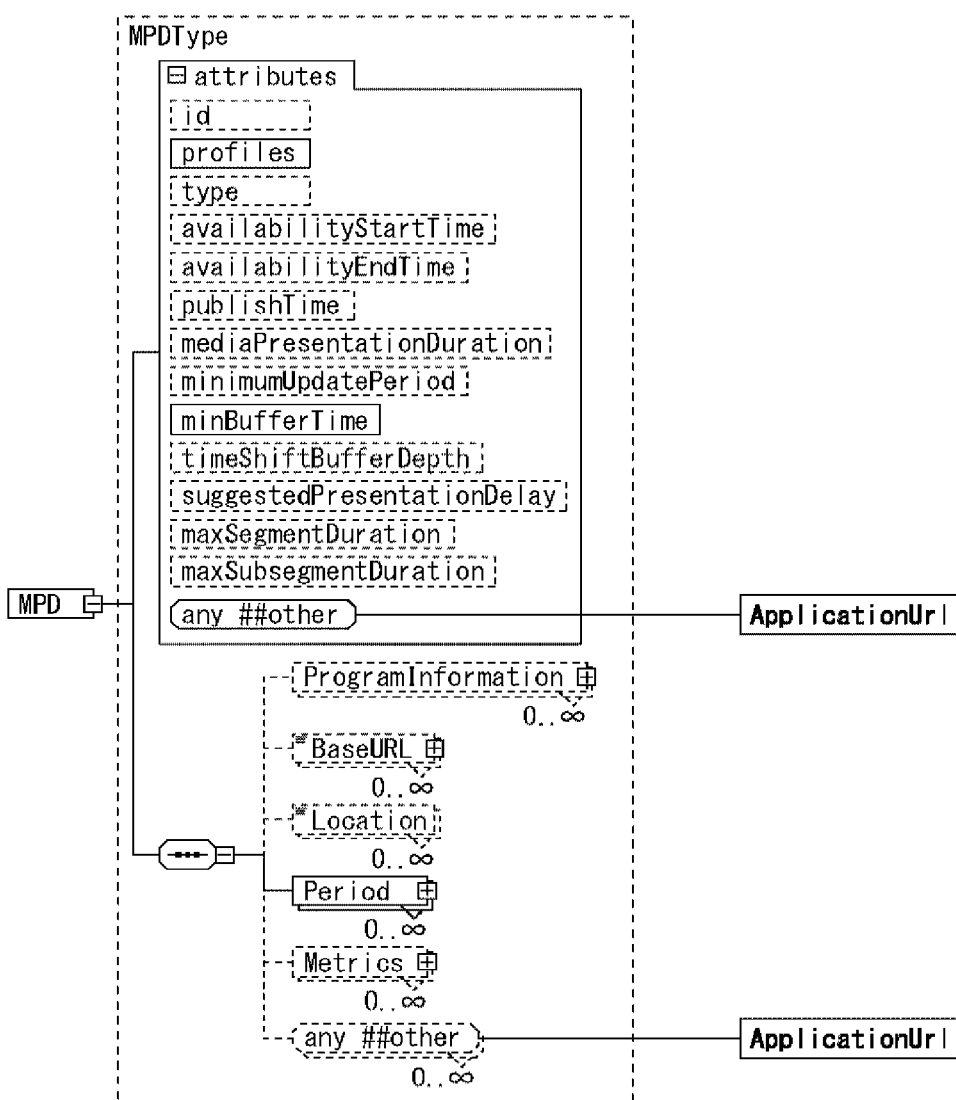
FIG. 38 is a diagram showing an example extension of an applicationUrl element of MPD metadata.

FIG. 38 is a diagram showing an example format of MPD metadata.

In FIG. 38, the attributes specified under an MPD element as the root element are enumerated inside the frame of "attributes", and the elements specified under the MPD element are enumerated outside the frame of "attributes". Among the attributes or elements specified in the MPD element, "any ##other" indicates a freely expandable region, so that an applicationUrl attribute or an applicationUrl element is defined therein.

In this applicationUrl attribute or the applicationUrl element, a URL (an application URL) indicating the acquisition source of an application is specified. This application URL is the information for identifying the entry (index.html, for example) in a case where the application is formed with a plurality of files such as an HTML document file and an image file, for example. Also, in the client device 60 that has received this MPD metadata, the application is acquired in accordance with the application URL, and is instantly started.

In a case where an application URL is described with the use of the applicationUrl element, for example, the description can be conducted in the following structure. That is, in this example case, the application URL is stored in a content part as it is.

<ApplicationUrl>http://xxx.com/app.html</ApplicationUrl>

(Structure of Metadata in a Case Where an Application Entry Is Clearly Indicated in S-TSID)

Referring now to FIGS. 39 through 42, the structure of metadata in a case where an application entry is clearly indicated in S-TSID is described.

FIG. 39 is a diagram showing an example format of S-TSID metadata.

The S-TSID metadata in FIG. 39 differs from the S-TSID metadata shown in FIG. 37 in that the applicationUrl attribute is excluded. FIG. 40 shows the format of the SrcFlow element included in the S-TSID metadata of FIG. 39.

The SrcFlow element in FIG. 40 is a higher-order element of an rt attribute, a minBuffSize attribute, an EFDT element, ContentInfo element, and a Payload element.

In the minBuffSize attribute, the minimum buffer size required by the client device 40 is specified. In the EFDT element, information about an extended FDT (Extended FDT) is specified. In the ContentInfo element, Information about content is specified.

The Payload element is a higher-order element of a codePoint attribute, a formatID attribute, a frag attribute, an order attribute, an srcFecPayloadID attribute, and an FECParams attribute, and information about the payload of a ROUTE packet storing the object of the source flow is specified therein.

FIG. 41 shows the format of the EFDT element included in the SrcFlow element in FIG. 40. The EFDT element in FIG. 41 is a higher-order element of a tsi attribute, an idRef attribute, a version attribute, a maxExpiresDelta attribute, a maxTransportSize attribute, a FileTemplate attribute, and an FDTParameters attribute.

Figure 42:
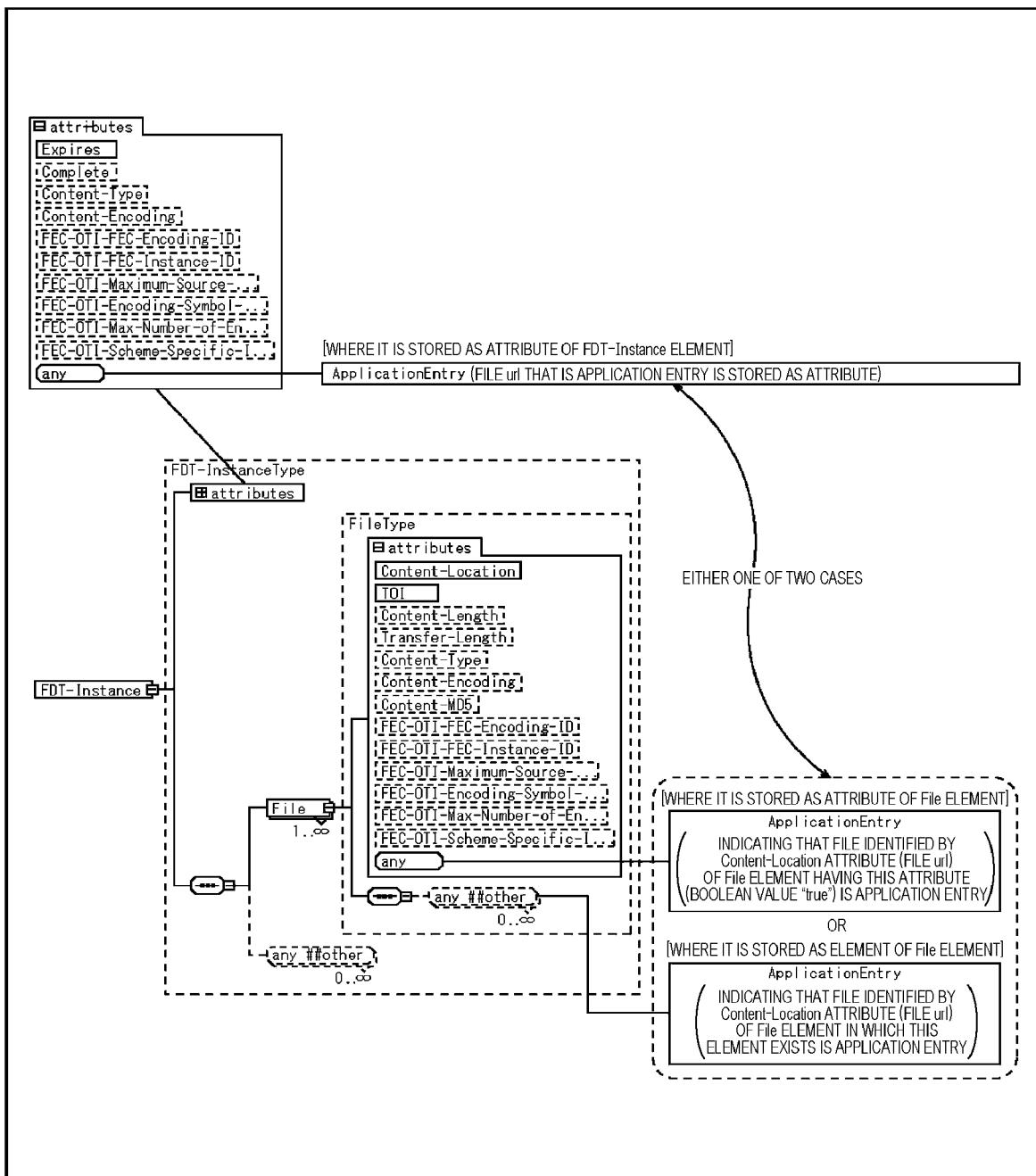
FIG. 42 is a diagram showing an example extension of an EFDT-Instance element or a File element.

In the FDTParameters attribute, the same type as FDT-Instance, which is the root element of FDT defined by Internet Engineering Task Force (IETF), is defined. FIG. 42 shows the structure of an FDT-Instance element. That is, among the attributes specified in the FDT-Instance element, "any" ("any ##other") indicates a freely expandable region, and an ApplicationEntry attribute can be defined therein. In this ApplicationEntry attribute, a file URL (that is, an application URL) that is the URL of a file for an application entry is described.

Also, a File element is defined under the FDT-Instance element. Among the attributes or elements in this File element, "any" ("any ##other") indicates a freely expandable region, and an ApplicationEntry attribute or an ApplicationEntry element is defined therein.

However, in a case where an ApplicationEntry attribute is defined in the File element, the file indicated by a Content-Location attribute (a file URL (an application URL)) in the File element having this attribute (the boolean value is "ture") is an application entry. In a case where an ApplicationEntry element is defined in the File element, on the other hand, the file indicated by a Content-Location attribute (a file URL (an application URL)) in the File element having this element therein is an application entry.

It should be noted that, in FIG. 42, either an ApplicationEntry attribute that can be defined in the FDT-Instance element, or an ApplicationEntry attribute or an ApplicationEntry element that can be defined in the File element under the FDT-Instance element is defined.

4. Modifications

In the above explanation, ATSC (particularly, ATSC 3.0), which is a system adopted in the United States and other countries, has been described as a standard for digital broadcasting. However, the present technology may be applied to Integrated Services Digital Broadcasting (ISDB), which is a system adopted in Japan and other countries, Digital Video Broadcasting (DVB), which is a system adopted in the countries and the like in Europe, and the like. Also, in the above description, ATSC 3.0, which adopts an IP transmission method, has been explained as an example. However, the present technology may be applied not only to an IP transmission method but also to some other method such as MPEG2-TS (Transport Stream), for example.

Also, as for digital broadcasting, the present technology can be applied not only to terrestrial broadcasting, but also to satellite broadcasting using a broadcasting satellite (BS), a communications satellite (CS), or the like, cable broadcasting such as cable television (CATV), and the like.

Also, the above mentioned names of signaling and the like are an example, and other names may be used in some cases. However, the differences between these names are formal differences, not differences in substantive contents of the current signaling and the like. For example, an application signaling table (AST) is referred to as an application information table (AIT) or the like, and locally cached content (LCC) is sometimes referred to as an NRT (Non Real Time) or the like. Further, in a case where signaling is described in a markup language such as XML, the names of the elements and attributes are merely an example, and other names may be adopted. However, the differences between these names are formal differences, not differences in substantive contents of those elements and attributes.

Also, in the above description, SLT metadata has been described as LLS signaling. However, LLS signaling may include metadata such as an emergency alerting table (EAT) and a region rating table (RRT). EAT metadata includes information about emergency information that needs to be delivered urgently. RRT metadata includes information about rating.

It should be noted that an application is not necessarily an application developed in a markup language such as HTML5 or a script language such as JavaScript (registered trademark), but may be an application developed in a programming language such as Java (registered trademark), for example. Furthermore, the above described content may include various kinds of content such as e-books, games, and music, for example, as well as videos and advertisements.

The present technology can also be applied to a predetermined standard (other than digital broadcasting standards) specified on the assumption that a transmission channel other than broadcasting network channels, a communication line (a communication network) such as the Internet or a telephone network, or the like, for example, is used as the transmission channel.

5. Configuration of a Computer

Figure 43:
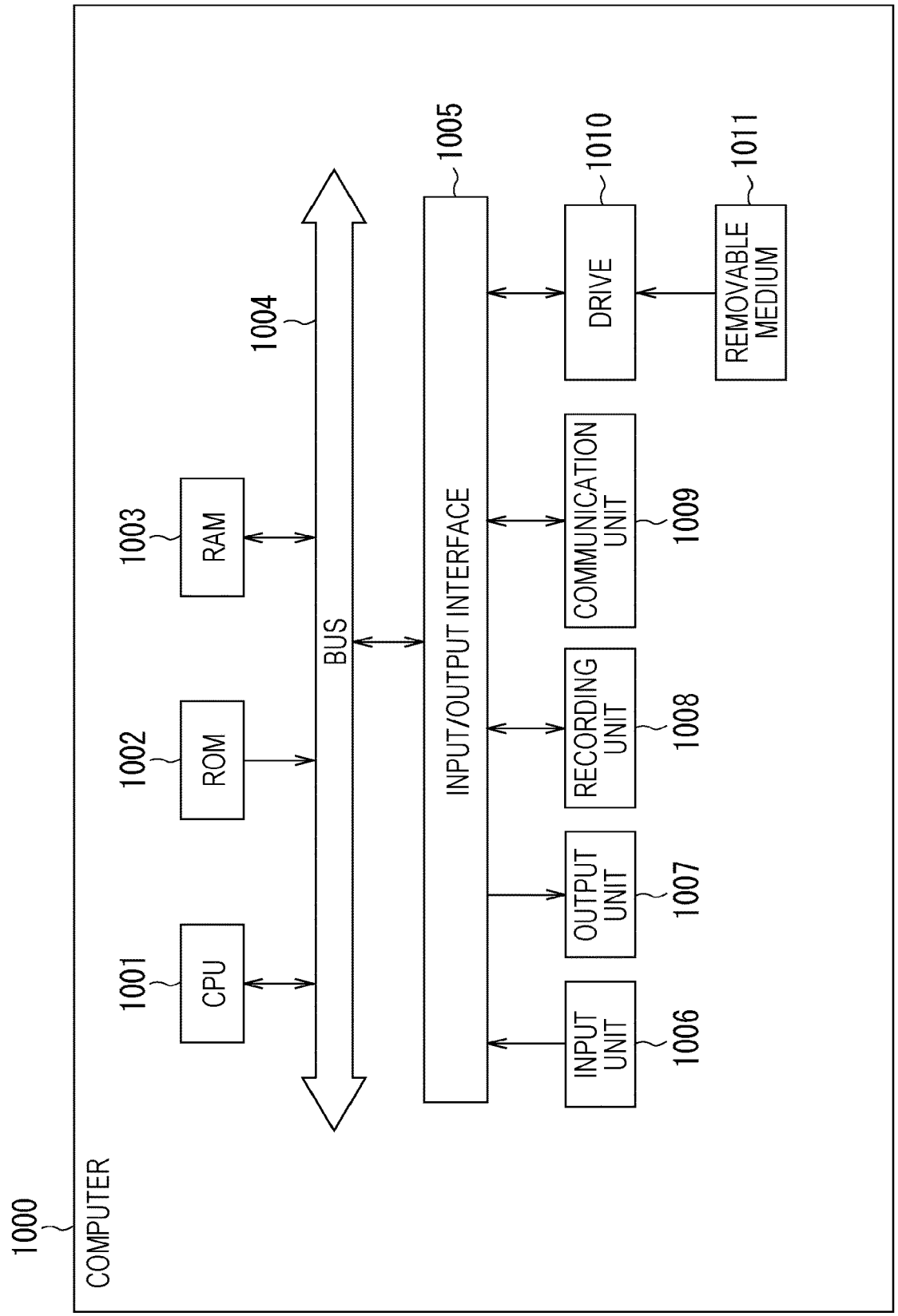
FIG. 43 is a diagram showing an example configuration of a computer.

The above described series of processes can be performed by hardware, and can also be performed by software. Where the series of processes are to be performed by software, the program that forms the software is installed into a computer. FIG. 43 is a diagram showing an example configuration of the hardware of a computer that performs the above described series of processes in accordance with a program.

In a computer 1000, a central processing unit (CPU) 1001, a read only memory (ROM) 1002, and a random access memory (RAM) 1003 are connected to one another through a bus 1004. An input/output interface 1005 is further connected to the bus 1004. An input unit 1006, an output unit 1007, a recording unit 1008, a communication unit 1009, and a drive 1010 are connected to the input/output interface 1005.

The input unit 1006 is formed with a keyboard, a mouse, a microphone, and the like. The output unit 1007 is formed with a display, a speaker, and the like. The recording unit 1008 is formed with a hard disk, a nonvolatile memory, or the like. The communication unit 1009 is formed with a network interface or the like. The drive 1010 drives a removable medium 1011 such as a magnetic disk, an optical disk, a magnetooptical disk, or a semiconductor memory.

In the computer 1000 having the above configuration, the CPU 1001 loads a program recorded on the ROM 1002 or the recording unit 1008 into the RAM 1003 via the input/ output interface 1005 and the bus 1004, for example, and executes the program, so that the above described series of processes are performed.

The program to be executed by the computer 1000 (the CPU 1001) may be recorded on the removable medium 1011 as a package medium or the like to be provided, for example. Alternatively, the program can be provided via a wired or wireless transmission medium such as a local area network, the Internet, or digital satellite broadcasting.

In the computer 1000, the program can be installed into the recording unit 1008 via the input/output interface 1005 when the removable medium 1011 is mounted on the drive 1010. Alternatively, the program may be received by the communication unit 1009 via a wired or wireless transmission medium, and be installed into the recording unit 1008. Alternatively, the program may be installed beforehand into the ROM 1002 or the recording unit 1008.

In this specification, the processes to be performed by the computer in accordance with the program are not necessarily performed in chronological order compliant with the sequences shown in the flowcharts. That is, the processes to be performed by the computer in accordance with the program include processes to be performed in parallel or independently of one another (such as parallel processes or object-based processes). In addition, the program may be executed by one computer (a processor), or may be executed in a distributive manner by more than one computer.

It should be noted that embodiments of the present technology are not limited to the above described embodiments, and various modifications may be made to them without departing from the scope of the present technology.

The present technology may also be embodied in the configurations described below.

(1)
A reception device including:
a reception unit that receives content;
an acquisition unit that acquires an application in accordance with acquisition source information indicating an acquisition source of the application accompanying the content, the acquisition source information being included in control information transmitted together with the content; and
a control unit that instantly starts the acquired application.

(2)
The reception device according to (1),
in which
the content and the control information are transmitted by broadcast waves,
the control information is signaling for providing a digital broadcasting service, and
the acquisition source information is a Uniform Resource Locator (URL).

(3)
The reception device according to (2), in which the control unit controls operation of the application in accordance with an event transmitted together with the content or the control information.

(4)
The reception device according to any of (1) to (3), in which
the acquisition unit acquires the application protected by digital rights management (DRM) of the content,
the reception device further includes a verification unit that verifies whether the acquired application is a legitimate application, and,
in a case where the application is recognized as a legitimate application, the control unit starts the application.

(5)
The reception device according to (4), in which the verification unit
extracts a first digest value corresponding to the application, the first digest value being included in a stream of the content,
generates a second digest value corresponding to the acquired application, and
verifies whether the acquired application is a legitimate application by comparing the first digest value with the second digest value.

(6)
The reception device according to (5), in which
video data of the content is coded according to a predetermined coding method, and
the first digest value is stored in a watermark inserted in a baseband frame included in an encrypted VCL-NAL (Video Coding Layer-Network Abstraction Layer) unit.

(7)
The reception device according to (5), in which
video data of the content is coded according to a predetermined coding method, and
the first digest value is stored in an encrypted non-VCL-NAL (Non Video Coding Layer-Network Abstraction Layer) unit.

(8)
A data processing method implemented in a reception device,
the data processing method including the steps of:
receiving content;
acquiring an application in accordance with acquisition source information indicating an acquisition source of the application accompanying the content, the acquisition source information being included in control information transmitted together with the content; and
instantly starting the acquired application,
the steps being carried out by the reception device.

(9)
A transmission device including:
a generation unit that generates control information for causing an acquired application to be instantly started, the control information including acquisition source information indicating an acquisition source of the application accompanying content; and
a transmission unit that transmits the control information together with the content.

(10)
A data processing method implemented in a transmission device,
the data processing method including the steps of:
generating control information for causing an acquired application to be instantly started, the control information including acquisition source information indicating an acquisition source of the application accompanying content; and
transmitting the control information together with the content,
the steps being carried out by the transmission device.

(11)
A reception device including:
a reception unit that receives content;
an acquisition unit that acquires an application accompanying the content, the application being protected by digital rights management (DRM) of the content;
a verification unit that verifies whether the acquired application is a legitimate application; and a control unit that starts the application in a case where the application is recognized as a legitimate application.

(12)

The reception device according to (11), in which the verification unit extracts a first digest value corresponding to the application, the first digest value being included in a stream of the content, generates a second digest value corresponding to the acquired application, and verifies whether the acquired application is a legitimate application by comparing the first digest value with the second digest value.

(13)

The reception device according to (12), in which video data of the content is coded according to a predetermined coding method, and the first digest value is stored in a watermark inserted in a baseband frame included in an encrypted VCL-NAL (Video Coding Layer-Network Abstraction Layer) unit.

(14)

The reception device according to (12), in which video data of the content is coded according to a predetermined coding method, and the first digest value is stored in an encrypted non-VCL-NAL (Non Video Coding Layer-Network Abstraction Layer) unit.

(15)

The reception device according to (12), in which the first digest value is included in a message and is transmitted together with identification information for identifying the application.

(16)

The reception device according to any of (11) to (15), in which the acquisition unit acquires the application in accordance with acquisition source information indicating an acquisition source of the application, the acquisition source information being included in control information transmitted together with the content, and, in a case where the acquired application is recognized as a legitimate application, the control unit instantly starts the application.

(17)

The reception device according to (16), in which the content and the control information are transmitted by broadcast waves, the control information is signaling for providing a digital broadcasting service, and the acquisition source information is a Uniform Resource Locator (URL).

(18)

A data processing method implemented in a reception device, the data processing method including the steps of:

receiving content;

acquiring an application accompanying the content, the application being protected by digital rights management (DRM) of the content;

a verification unit that verifies whether the acquired application is a legitimate application; and starting the application in a case where the application is recognized as a legitimate application, the steps being carried out by the reception device.

(19)

A transmission device including:

a protection unit that protects an application accompanying content by digital rights management (DRM) of the content; and a transmission unit that transmits the content and the application, the content and the application being protected by the same digital rights management (DRM).

(20)

A data processing method implemented in a transmission device, the data processing method including the steps of:

protecting an application accompanying content by digital rights management (DRM) of the content; and transmitting the content and the application, the content and the application being protected by the same digital rights management (DRM), the steps being carried out by the transmission device.

REFERENCE SIGNS LIST 1, 2 Transmission system
5, 7 Transmission-side system
10 DASH server
20 Signaling server
30 Application server
40 Broadcast server
50 Communication server
60 Client device
70 Stream server
80 Transmission channel
90 Internet
101 Reception unit
102 Processing unit
103 Transmission unit
111 MPD generation unit
112 DASH segment generation unit
113 Encryption unit
114 DRM protected file generation unit
115 Non-VCL-NAL unit generation unit
201 Reception unit
202 Processing unit
203 Transmission unit
211 Signaling generation unit
301 Reception unit
302 Processing unit
303 Transmission unit
311 Application URL generation unit
312 Application generation unit
313 Application control event generation unit
314 Application digest generation unit
401 Reception unit
402 Processing unit
403 Transmission unit
601 Processing unit
602 Input unit
603 Reception unit
604 Broadcast middleware
605 DASH client
606 Decoder
607 Output unit
608 Communication unit
611 Application control unit
612 Rendering engine
613 Watermark extractor
614 Application digest validator
701 Reception unit 702 Processing unit
703 Transmission unit
711 Stream generation unit
712 Watermark inserter
713 Encoder
1000 Computer
1001 CPU

The invention claimed is:

1. A reception device, comprising:
reception circuitry configured to receive a content stream and an application control event according to Dynamic Adaptive Streaming over HTTP (DASH); and
processing circuitry configured to:
play the content stream using a first application,
control operation of a second application, including passing event data included in the application control event to the second application, the second application including a plurality of files, the plurality of files being collectively signed,
obtain a signature associated with the collectively signed plurality of files,
determine whether the second application is legitimate based on the signature, and
in a case that the second application is determined to be legitimate, start the second application.

2. The reception device according to claim 1, wherein:
the reception circuitry is configured to receive control information that includes the application control event and acquisition source information, and
the processing circuitry is configured to acquire the second application in accordance with the acquisition source information included in the control information.

3. The reception device according to claim 2, wherein the acquisition source information includes a Uniform Resource Locator (URL) indicating an acquisition source of the second application.

4. The reception device according to claim 2, wherein the processing circuitry is configured to:
determine whether the second application is legitimate, and
in the case that the second application is determined to be legitimate, start the second application after the second application is acquired.

5. The reception device according to claim 1, wherein the application control event is a Media Presentation Description (MPD) event or an in-band event.

6. The reception device according to claim 1, wherein:
the content stream is protected by digital rights management (DRM) of the content, and
the processing circuitry is configured to:
determine whether the second application is legitimate according to information that is protected by the DRM of the content, and
in a case that the second application is determined to be legitimate, start the second application.

7. The reception device according to claim 1, wherein the processing circuitry is configured to:
obtain a first digest value corresponding to the second application, the first digest value being included in the content stream,
generate a second digest value corresponding to the second application,
determine whether the second application is legitimate by comparing the first digest value with the second digest value, and
in a case that the second application is determined to be legitimate, start the second application.

8. The reception device according to claim 7, wherein:
video data of the content is coded according to a predetermined coding method, and
the first digest value is in an encrypted non Video Coding Layer Network Abstraction Layer (VCL-NAL) unit, or in a watermark in a baseband frame included in an encrypted VCL-NAL unit.

9. The reception device according to claim 7, wherein the first digest value is included in a message which includes identification information for identifying the second application.

10. The reception device according to claim 7, wherein the second digest value is generated using a SHA-256 algorithm.

11. A method of a reception device, the method comprising:
receiving a content stream and an application control event according to Dynamic Adaptive Streaming over HTTP (DASH);
playing the content stream using a first application;
controlling operation of a second application, including passing event data included in the application control event to the second application, the second application including a plurality of files, the plurality of files being collectively signed,
obtaining a signature associated with the collectively signed plurality of files,
determining whether the second application is legitimate based on the signature, and
in a case that the second application is determined to be legitimate, starting the second application.

12. The method according to claim 11, comprising:
receiving control information that includes the application control event and acquisition source information, and
acquiring the second application in accordance with the acquisition source information included in the control information.

13. The method according to claim 12 comprising:
determining whether the second application is legitimate, and
in the case that the second application is determined to be legitimate, starting the second application after acquiring the second application.

14. The method according to claim 11, wherein the application control event is a Media Presentation Description (MPD) event or an in-band event.

15. The method according to claim 11, wherein:
the content stream is protected by digital rights management (DRM) of the content, and
the method comprises:
determining whether the second application is legitimate according to information that is protected by the DRM of the content, and
in a case that the second application is determined to be legitimate, starting the second application.

16. The method according to claim 11 comprising:
obtaining a first digest value corresponding to the second application, the first digest value being included in the content stream,
generating a second digest value corresponding to the second application,
determining whether the second application is legitimate by comparing the first digest value with the second digest value, and
in a case that the second application is determined to be legitimate, starting the second application.

17. The method according to claim 16, wherein the first digest value is included in a message which includes identification information for identifying the second application.

18. The method according to claim 16, wherein the second digest value is generated using a SHA-256 algorithm.

* * * * *